(12) United States Patent
Maejima

(10) Patent No.: US 12,475,955 B2
(45) Date of Patent: Nov. 18, 2025

(54) MEMORY DEVICE

(71) Applicant: Kioxia Corporation, Tokyo (JP)

(72) Inventor: Hiroshi Maejima, Tokyo (JP)

(73) Assignee: Kioxia Corporation, Tokyo (JP)

( * ) Notice: Subject to any disclaimer, the term of this patent is extended or adjusted under 35 U.S.C. 154(b) by 224 days.

(21) Appl. No.: 18/336,043

(22) Filed: Jun. 16, 2023

(65) Prior Publication Data

US 2024/0257883 A1 Aug. 1, 2024

(30) Foreign Application Priority Data

Jan. 31, 2023 (JP) .................................. 2023-013009

(51) Int. Cl.
*G11C 16/26* (2006.01)
*G11C 16/04* (2006.01)
(Continued)

(52) U.S. Cl.
CPC .......... *G11C 16/26* (2013.01); *G11C 16/0483* (2013.01); *G11C 16/08* (2013.01); *H01L 24/08* (2013.01); *H01L 25/0657* (2013.01); *H01L 25/18* (2013.01); *H10B 41/35* (2023.02); *H10B 41/40* (2023.02); *H10B 41/50* (2023.02); *H10B 43/35* (2023.02); *H10B 43/40* (2023.02); *H10B 80/00* (2023.02); *H01L 2224/08135* (2013.01);
(Continued)

(58) Field of Classification Search
CPC ..... G11C 16/26; G11C 16/0483; G11C 16/08; H01L 24/08; H01L 25/0657; H01L 25/18; H01L 2224/08135; H01L 2224/08145; H01L 2924/1431; H01L 2924/14511; H10B 41/35; H10B 41/40; H10B 41/50; H10B 43/35; H10B 43/40; H10B 80/00; H10B 43/27; H10B 99/00

See application file for complete search history.

(56) References Cited

U.S. PATENT DOCUMENTS 11,081,186 B2 * 8/2021 Lee .......................... H01L 24/08
11,158,379 B2 * 10/2021 Choi .................... H01L 25/0657
(Continued)

FOREIGN PATENT DOCUMENTS

| JP | 2021064731 A | 4/2021 |
|----|--------------|--------|
| JP | 2021153080 A | 9/2021 |

OTHER PUBLICATIONS

U.S. Appl. No. 18/203,952, First Named Inventor: Hiroshi Maejima; Title: "Semiconductor Memory Device"; Filed: October May 31, 2023.

*Primary Examiner* — Amir Zarabian
*Assistant Examiner* — Justin Bryce Heisterkamp
(74) *Attorney, Agent, or Firm* — Holtz, Holtz & Volek PC

(57) ABSTRACT

According to one embodiment, a memory device includes a substrate, a memory layer, and a circuit layer. The memory layer includes first to third regions arranged in a first direction. The circuit layer includes first and second transfer regions, and first and second sense amplifier regions. The first and second transfer regions are shifted in the first direction and arranged in a second direction. In a third direction, the first sense amplifier region overlaps the first region, and the second sense amplifier region overlaps the second region. The first sense amplifier region and the first transfer region are arranged in the first direction, and the second sense amplifier region and the second transfer region are arranged in the first direction.

20 Claims, 29 Drawing Sheets

(51) Int. Cl.
  *G11C 16/08* (2006.01)
  *H01L 23/00* (2006.01)
  *H01L 25/065* (2023.01)
  *H01L 25/18* (2023.01)
  *H10B 41/35* (2023.01)
  *H10B 41/40* (2023.01)
  *H10B 41/50* (2023.01)
  *H10B 43/35* (2023.01)
  *H10B 43/40* (2023.01)
  *H10B 80/00* (2023.01)

(52) U.S. Cl.
  CPC ............... *H01L 2224/08145* (2013.01); *H01L 2924/1431* (2013.01); *H01L 2924/14511* (2013.01)

(56) References Cited

U.S. PATENT DOCUMENTS

| | | | |
|---|---|---|---|
| 11,238,933 B2* | 2/2022 | Joe | G11C 16/10 |
| 11,594,546 B2 | 2/2023 | Morozumi et al. | |
| 2020/0350024 A1* | 11/2020 | Kwak | G11C 16/3459 |
| 2021/0005268 A1* | 1/2021 | Kim | G11C 11/5671 |
| 2021/0118862 A1* | 4/2021 | Maejima | H01L 25/18 |
| 2021/0305268 A1 | 9/2021 | Sato | |
| 2021/0366539 A1* | 11/2021 | Kim | H01L 24/08 |
| 2022/0052066 A1* | 2/2022 | Kim | H01L 24/08 |
| 2022/0085048 A1* | 3/2022 | Lee | H01L 24/08 |
| 2022/0199174 A1* | 6/2022 | Song | H01L 25/18 |
| 2022/0301615 A1 | 9/2022 | Maejima | |
| 2023/0125995 A1* | 4/2023 | Kim | H10B 43/10 257/314 |
| 2023/0162791 A1* | 5/2023 | Jeon | G11C 16/0433 365/185.05 |
| 2023/0165010 A1 | 5/2023 | Morozumi et al. | |
| 2023/0197117 A1* | 6/2023 | Takekida | G11C 8/12 365/63 |
| 2023/0205423 A1* | 6/2023 | Tak | G11C 7/1039 711/103 |
| 2023/0307010 A1* | 9/2023 | Takasu | G11C 16/0483 |
| 2023/0410908 A1* | 12/2023 | Ako | H10B 41/40 |
| 2024/0107765 A1* | 3/2024 | Fujise | H10B 43/10 |

* cited by examiner

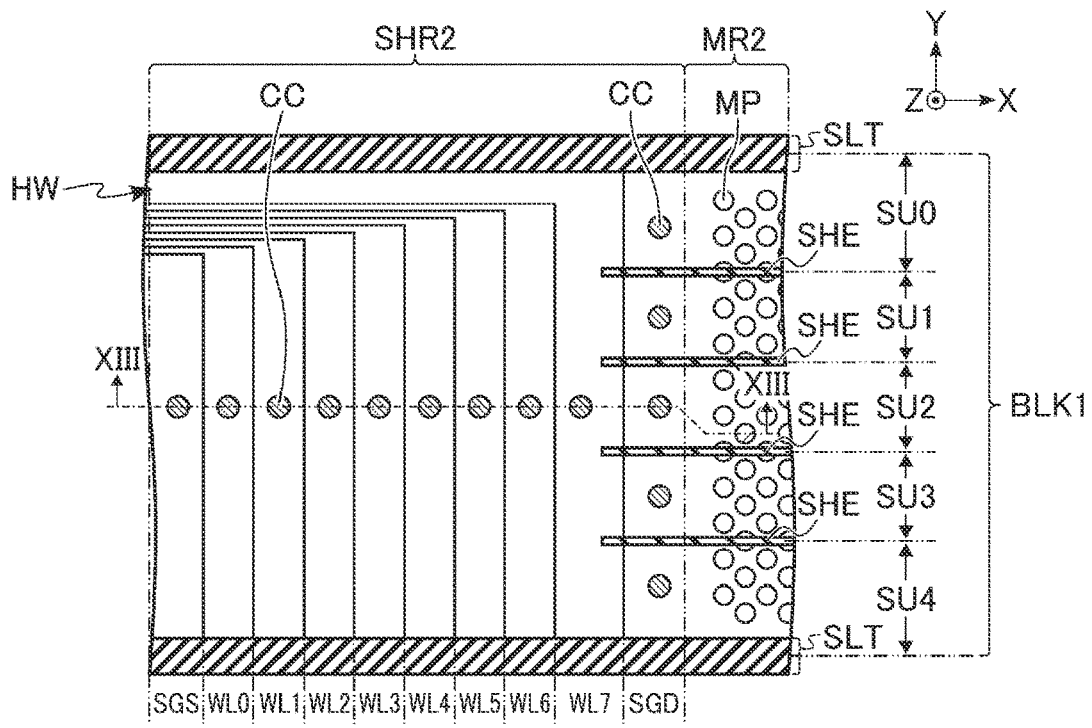
F I G. 12
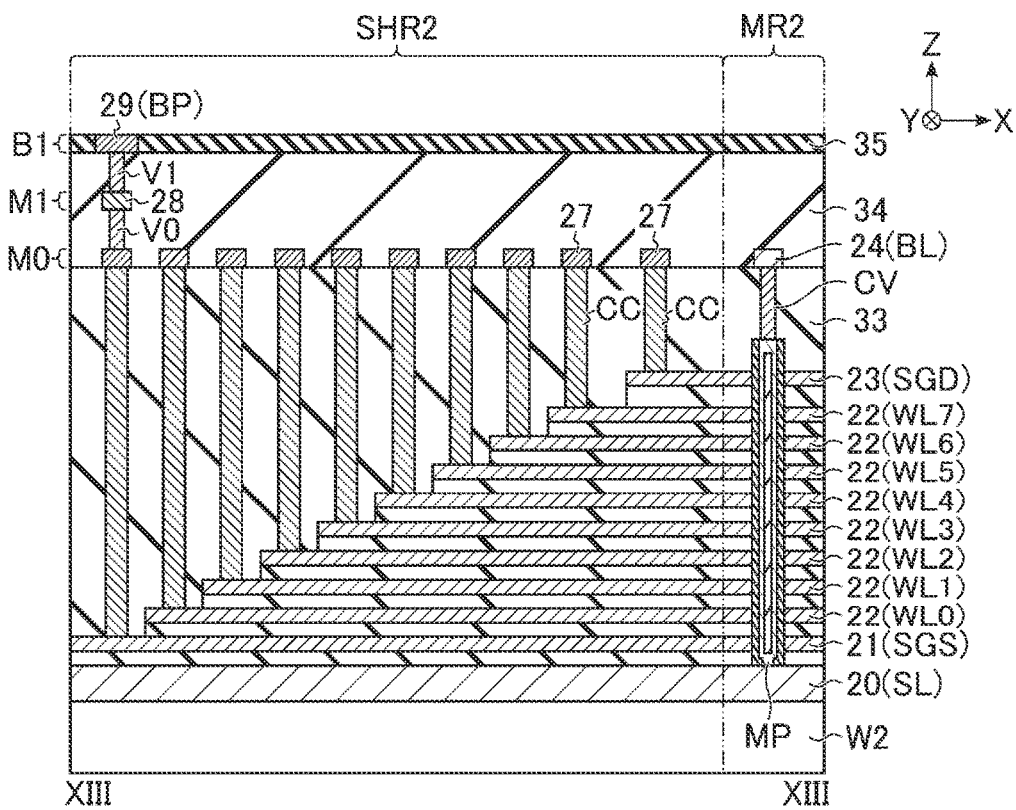
F I G. 13

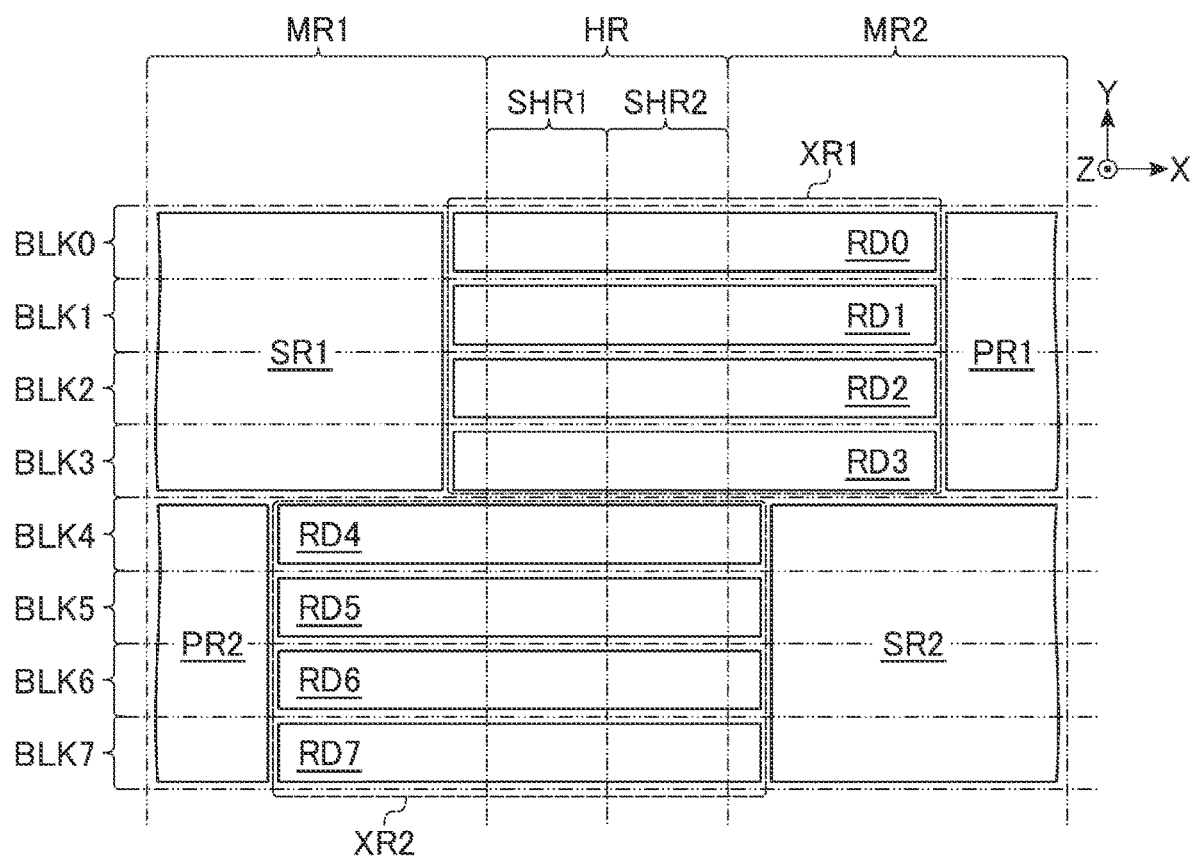
F I G. 16

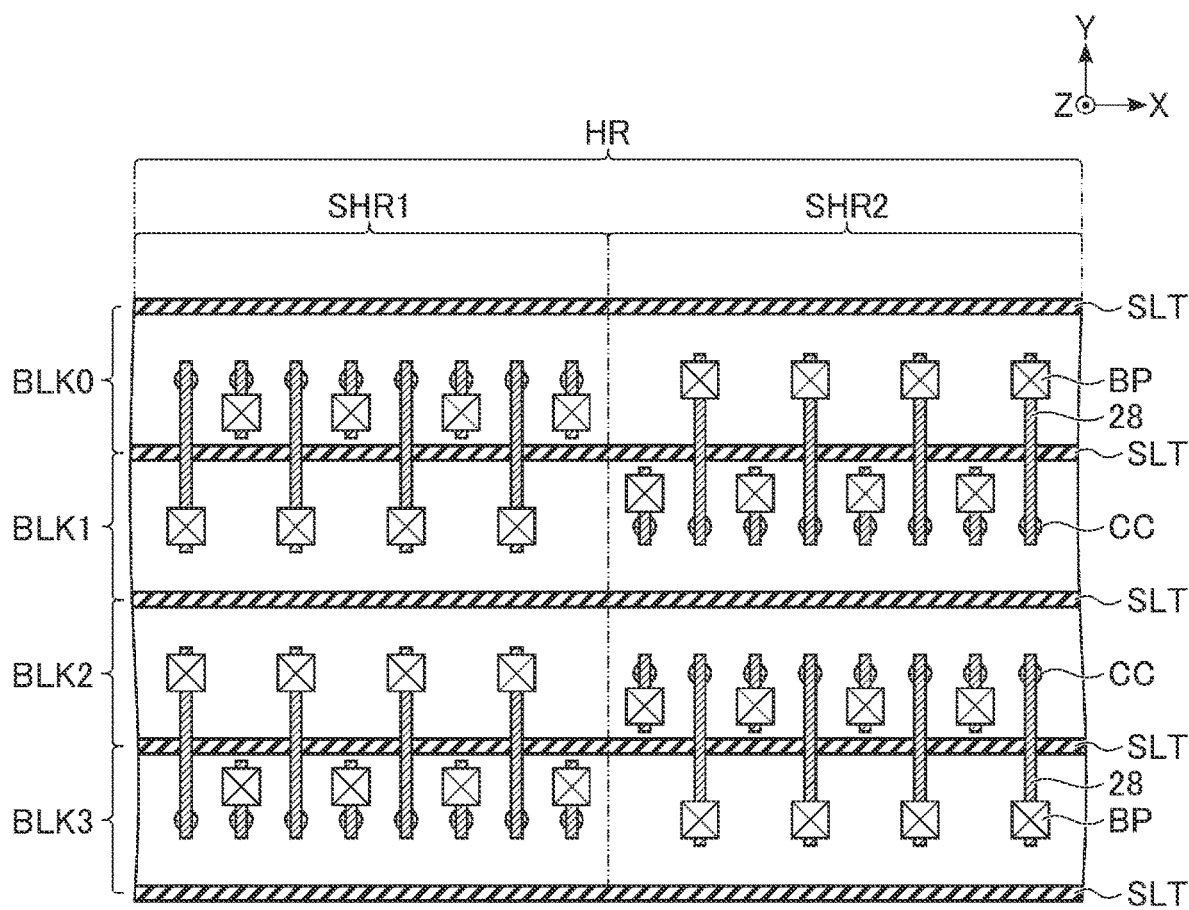
F I G. 17

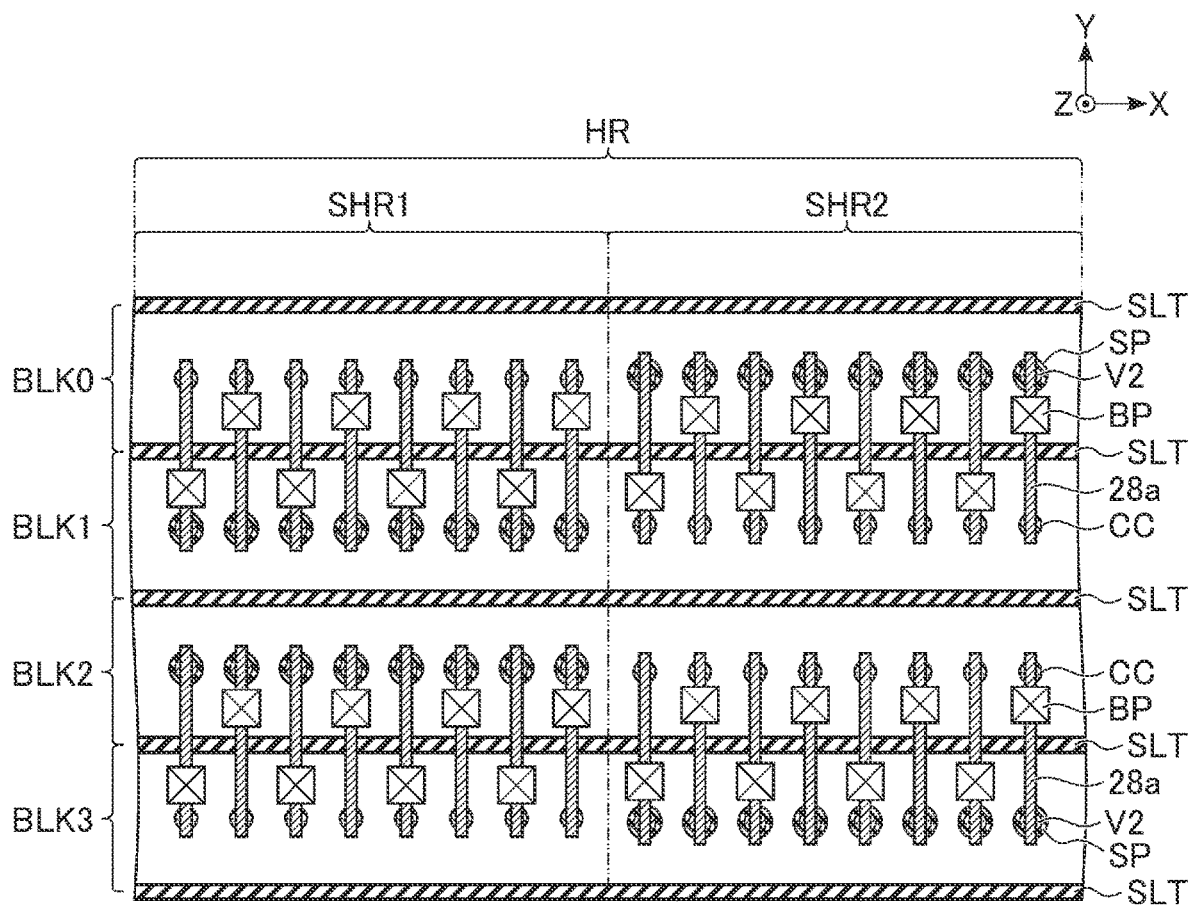
F I G. 30

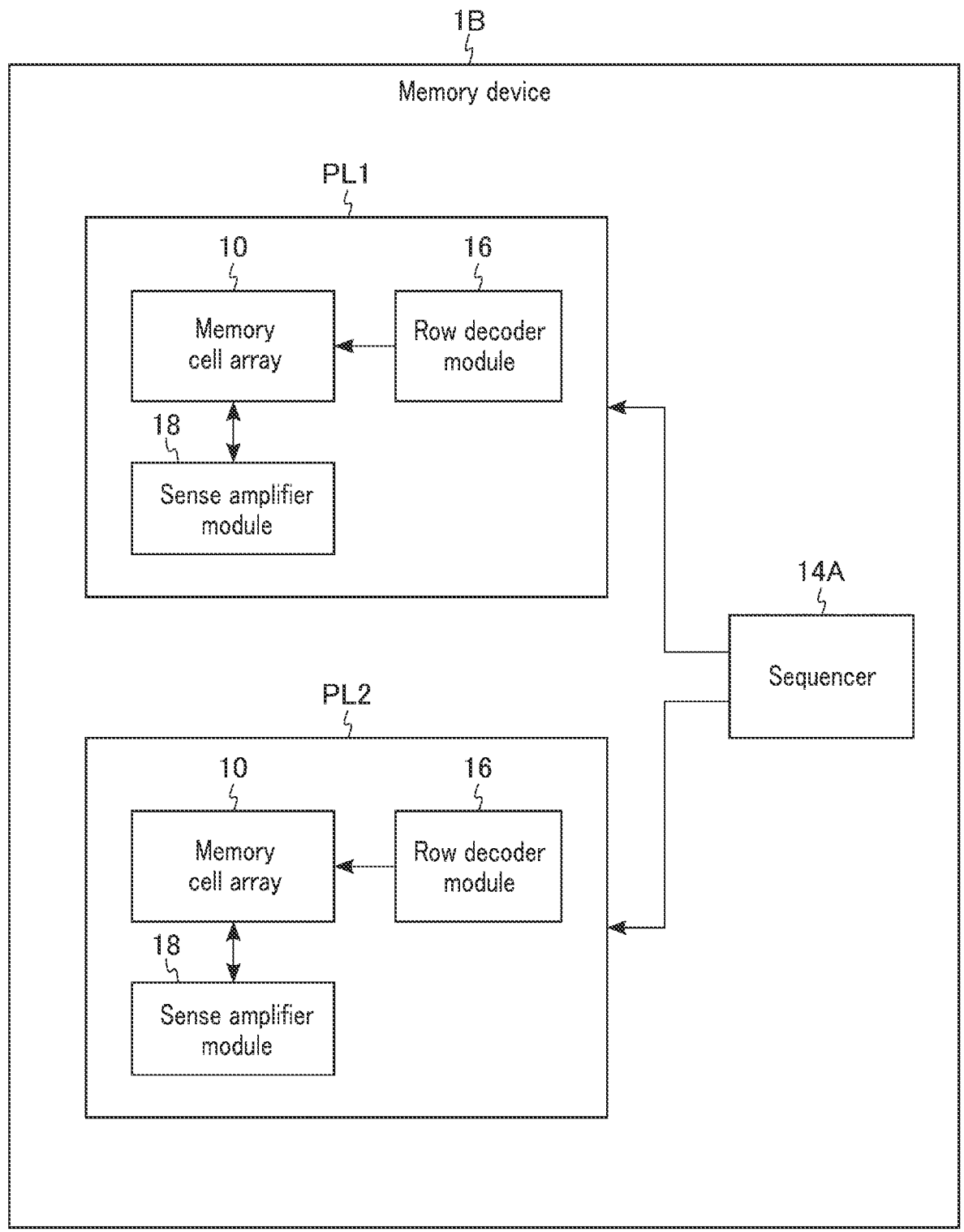
F I G. 31

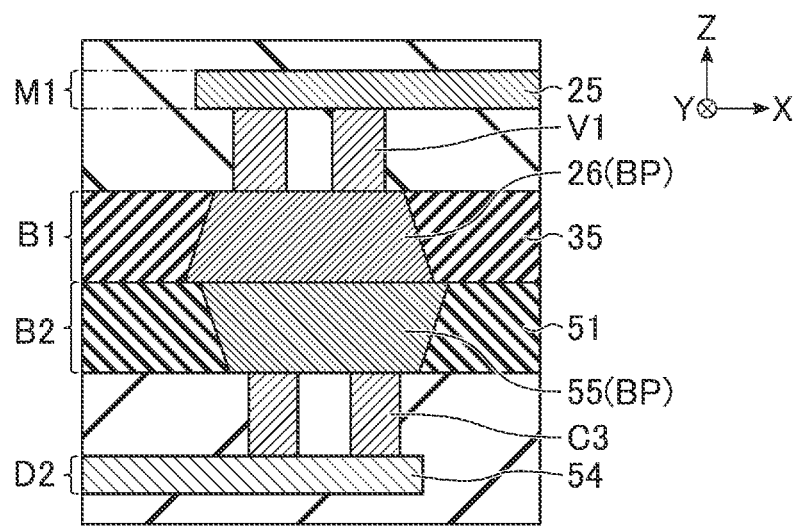
F I G. 37

MEMORY DEVICE

CROSS-REFERENCE TO RELATED APPLICATIONS

This application is based upon and claims the benefit of priority from Japanese Patent Application No. 2023-013009, filed Jan. 31, 2023, the entire contents of which are incorporated herein by reference.

FIELD

Embodiments described herein relate generally to a memory device.

BACKGROUND

A NAND flash memory capable of storing data in a nonvolatile manner is known in the art.

BRIEF DESCRIPTION OF THE DRAWINGS

FIG. 12 is a plan view showing an example of a planar layout of a hookup region of a memory layer included in the memory device according to the first embodiment.

FIG. 13 is a cross-sectional view taken along line XIII-XIII of FIG. 12 and showing an example of a cross-sectional structure of a hookup region of a memory layer included in the memory device according to the first embodiment.

FIG. 16 is a plan view showing an example of a layout of a row decoder module included in the memory device according to the first embodiment.

FIG. 17 is a plan view showing an example of the layout in which bonding pads used for coupling stacked wirings and row decoder modules are arranged in the memory device according to the first embodiment.

FIG. 30 is a plan view showing an example of how the bonding pads used for coupling stacked wirings and a row decoder module are arranged in the memory device according to the second embodiment.

FIG. 31 is a block diagram showing an example of the overall configuration of a memory device according to a third embodiment.

FIG. 37 is a cross-sectional view showing an example of a detailed cross-sectional structure of a bonding portion of a bonding pad.

DETAILED DESCRIPTION

Figure 1:
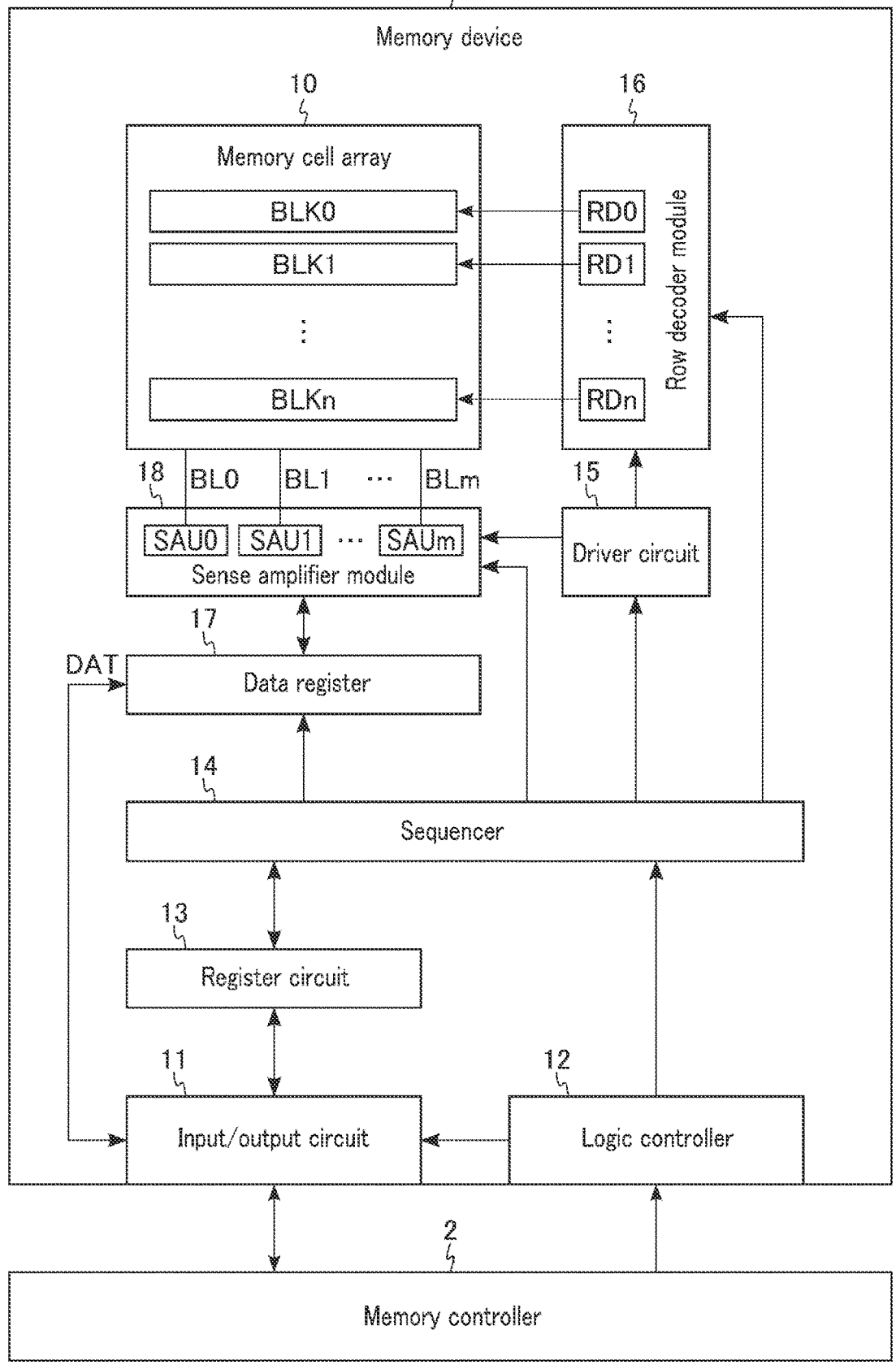
FIG. 1 is a block diagram showing an example of the overall configuration of a memory device according to a first embodiment.

In general, according to one embodiment, a memory device includes a substrate, a memory layer, and a circuit layer. The circuit layer includes a sense amplifier module provided between the substrate and the memory layer. The memory layer includes a first region, a second region, and a third region arranged in a first direction. The third region is located between the first region and the second region. Each of the first region and the second region includes a plurality of memory cells. The circuit layer includes a first transfer region, a second transfer region, a first sense amplifier region, and a second sense amplifier region. The first transfer region includes a first row decoder coupled to part of the plurality of memory cells via contacts provided in the third region. The first row decoder is configured to apply a voltage to part of the plurality of memory cells. The second transfer region includes a second row decoder coupled to another part of the plurality of memory cells via the contacts. The second row decoder is configured to apply a voltage to said another part of the plurality of memory cells. The sense amplifier module is configured to read data from the plurality of memory cells. The sense amplifier module includes a first sense amplifier unit and a second sense amplifier unit. The first sense amplifier region includes the first sense amplifier unit. The second sense amplifier region includes the second sense amplifier unit. The first transfer region and the second transfer region are shifted in the first direction and arranged in a second direction intersecting the first direction. In a third direction intersecting both the first direction and the second direction, the first sense amplifier region overlaps the first region, and the second sense amplifier region overlaps the second region. The first sense amplifier region and the first transfer region are arranged in the first direction, and the second sense amplifier region and the second transfer region are arranged in the first direction.

Hereinafter, embodiments will be described with reference to the accompanying drawings. Each embodiment illustrates a device and a method for embodying the technical idea of the invention. The drawings are schematic or conceptual. The dimensions and scales of the drawings are not necessarily the same as those of actual products. The illustration of a configuration is omitted as appropriate. The hatching added to the drawings is not necessarily related to the materials or characteristics of the structural components. The same reference numerals are added to the components having substantially the same function and configuration. Numbers etc. added to the reference symbols are referred to by the same reference symbols and are used to distinguish between similar components.

<1> First Embodiment

The first embodiment relates to the architecture of a memory device 1 having a configuration in which a substrate on which memory cells are formed and a substrate on which a CMOS circuit for accessing the memory cells is formed are bonded to each other. Details of the first embodiment will be described below.

<1-1> Overall Configuration of Memory Device 1

First, the overall configuration of the memory device 1 will be described. The memory device 1 is a type of NAND flash memory that can store data in a nonvolatile manner.

FIG. 1 is a block diagram showing an example of the overall configuration of the memory device 1 according to the first embodiment. As shown in FIG. 1, the memory device 1 is controlled by an external memory controller 2. The memory device 1 includes, for example, a memory cell array 10, an input/output circuit 11, a logic controller 12, a register circuit 13, a sequencer 14, a driver circuit 15, a row decoder module 16, a data register 17, and a sense amplifier module 18.

The memory cell array 10 is a set of memory cells. The memory cell array 10 includes a plurality of blocks BLK0 to BLKn ("n" is an integer equal to or larger than 1). For example, a block BLK corresponds to a data erase unit and includes a plurality of pages. A page corresponds to a unit in which data is read and written. The memory cell array 10 is provided with a plurality of bit lines BL0 to BLm ("m" is an integer equal to or larger than 1) and a plurality of word lines WL (not shown). Each memory cell is associated with a set consisting of a bit line BL and a word line WL. Where a plurality of memory cells are associated with a set consisting of the bit line BL and the word line WL, these memory cells are configured such that they can be individually accessed by select transistors.

The input/output circuit 11 is an interface circuit that controls transmission/reception (input/output) of input/output signals transmitted to/from the memory controller 2. The input/output signals include, for example, data DAT, status information, addresses, commands, and the like. The input/output circuit 11 can input/output the data DAT between the data register 17 and the memory controller 2. The input/output circuit 11 can output the status information transferred from the register circuit 13 to the memory controller 2. The input/output circuit 11 can output each of the address and the command, which are transferred from the memory controller 2, to the register circuit 13.

The logic controller 12 is a circuit that controls each of the input/output circuit 11 and the sequencer 14, based on a control signal input from the memory controller 2. The logic controller 12 commands the input/output circuit 11 to input a signal from the memory controller 2 or output a signal to the memory controller 2. In addition, the logic controller 12 notifies the input/output circuit 11 that the input/output signal received by the input/output circuit 11 is data DAT, a command, or an address.

The register circuit 13 is a circuit that temporarily stores a status, an address, and a command. The status is updated under control of the sequencer 14 and transferred to the memory controller 2 via the input/output circuit 11. The address can include a block address, a page address, a column address, etc. The command includes a command related to various operations of the memory device 1.

The sequencer 14 is a controller that controls the overall operation of the memory device 1. The sequencer 14 executes a read operation, a write operation, an erase operation, and the like, based on the command and the address stored in the register circuit 13.

The driver circuit 15 is a circuit that generates voltages used in a read operation, a write operation, an erase operation, and the like. The driver circuit 15 supplies the generated voltages to the row decoder module 16, the sense amplifier module 18, and the like.

The row decoder module 16 is a circuit used for selecting a block BLK to be operated and transferring a voltage to such a wiring as a word line WL. The row decoder module 16 includes a plurality of row decoders RD0 to RDn. The row decoders RD0 to RDn are associated with the blocks BLK0 to BLKn, respectively. The detailed configuration of the row decoders RD will be described later.

The data register 17 is a circuit that temporarily stores data DAT. The data register 17 can input/output data DAT between the input/output circuit 11 and the sense amplifier module 18. The data register 17 may referred to as a cache memory.

The sense amplifier module 18 is a circuit used for transferring a voltage to each bit line BL and for reading data. The sense amplifier module 18 includes a plurality of sense amplifier units SAU0 to SAUm. The sense amplifier units SAU0 to SAUm are associated with a plurality of bit lines BL0 to BLm, respectively. A detailed configuration of the sense amplifier unit SAU will be described later.

The combination of the memory device 1 and the memory controller 2 may constitute one semiconductor device. Examples of such a semiconductor device include a memory card such as an SD™ card, and an SSD (solid state drive). A set consisting of the memory cell array 10, the row decoder module 16 and the sense amplifier module 18 is referred to as "plane PL," for example. The memory device 1 may include a plurality of planes PL.

<1-2> Circuit Configuration of Memory Device

Next, a description will be given of the circuit configuration of the memory device 1 according to the first embodiment. In the descriptions below, a MOS transistor having a high breakdown voltage will be referred to as an "HV (High-Voltage) transistor." A MOS transistor having a breakdown voltage lower than that of the HV transistor will be referred to as an "LV (Low-Voltage) transistor." The LV transistor includes, for example, a gate insulating film thinner than that of the HV transistor and can operate faster than the HV transistor.

<1-2-1> Circuit Configuration of Memory Cell Array 10

Figure 2:
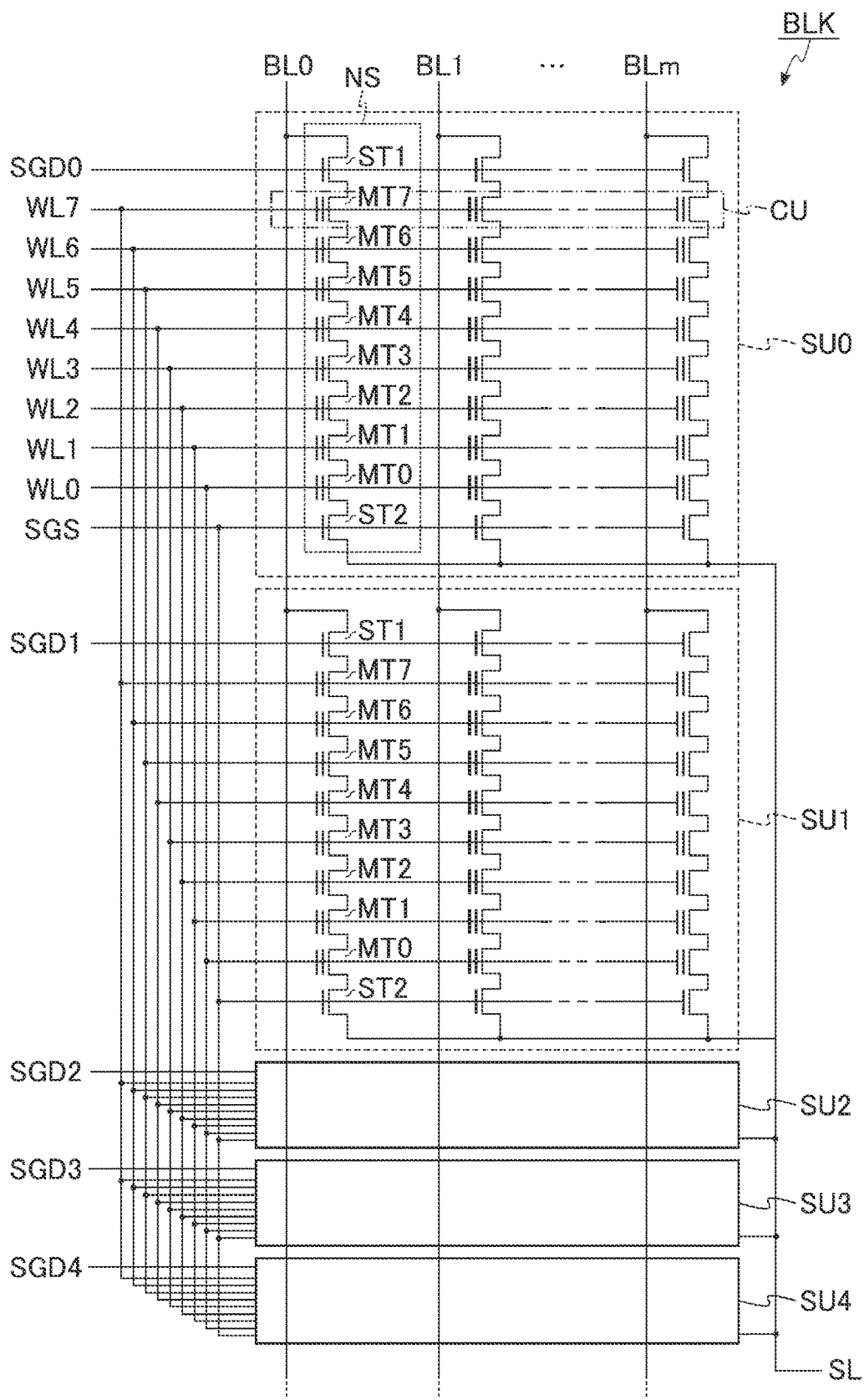
FIG. 2 is a circuit diagram showing an example of the circuit configuration of a memory cell array included in the memory device according to the first embodiment.

FIG. 2 is a circuit diagram showing an example of the circuit configuration of the memory cell array 10 included in the memory device 1 according to the first embodiment. FIG. 2 shows one block BLK that is among a plurality of blocks BLK included in the memory cell array 10. As shown in FIG. 2, the block BLK includes select gate lines SGD0 to SGD4, a select gate line SGS, word lines WL0 to WL7, bit lines BL0 to BLm, and a source line SL. The select gate lines SGD0 to SGD4, the select gate line SGS and the word lines WL0 to WL7 are provided for each block BLK. Each of the bit lines BL0 to BLm and the source line SL are shared by a plurality of blocks BLK.

The block BLK includes, for example, five string units SU0 to SU4. Each string unit SU includes a plurality of NAND strings NS. The plurality of NAND strings NS are associated with bit lines BL0 to BLm, respectively. Each NAND string NS is coupled between the associated bit line BL and the source line SL. Each bit line BL is shared by the NAND strings NS which are included in the plurality of blocks BLK and to which the same column address is assigned.

Each NAND string NS includes, for example, memory cell transistors MT0 to MT7, and select transistors ST1 and ST2. Each memory cell transistor MT is a memory cell having a control gate and a charge storage layer, and holds (stores) data in a nonvolatile manner. The memory cell transistor MT may be either a charge trap type memory cell or a floating gate type memory cell. Each of the select transistors ST1 and ST2 is used to select a string unit SU.

In each NAND string NS, the select transistor ST1, the memory cell transistors MT7 to MT0, and the select transistor ST2 are coupled in series from the bit line BL to the source line SL in the order mentioned. Specifically, the drain and source of the select transistor ST1 are respectively coupled to the associated bit line BL and one end of the memory cell transistors MT7 to MT0 coupled in series (that is, the drain of the memory cell transistor MT7). The drain and source of the select transistor ST2 are respectively coupled to the other end of the memory cell transistors MT7 to MT0 coupled in series (that is, the source of the memory cell transistor MT0) and the source line SL.

The select gate lines SGD0 to SGD4 are associated with string units SU0 to SU4, respectively. Each select gate line SGD is coupled to respective gates of a plurality of select transistors ST1 included in the associated string unit SU. The select gate line SGS is coupled to each of the gates of a plurality of select transistors ST2 included in the associated block BLK. The word lines WL0 to WL7 are respectively coupled to the control gates of the memory cell transistors MT0 to MT7 included in the associated block BLK.

A set of memory cell transistors MT included in the same string unit SU and coupled to the same word line WL is referred to as "cell unit CU," for example. For example, the storage capacity which the cell unit CU has when each memory cell transistor MT stores 1-bit data is defined as "1 page data." A cell unit CU can store two or more pages of data according to the number of bits of data stored in each memory cell transistor MT.

It should be noted that the memory cell array 10 may have other circuit configurations. For example, the number of string units SU included in the block BLK, and the numbers of memory cell transistors MT and select transistors ST1 and ST2 included in the NAND string NS can be designed to be any number.

<1-2-2> Circuit Configuration of Row Decoder Module 16

Figure 3:
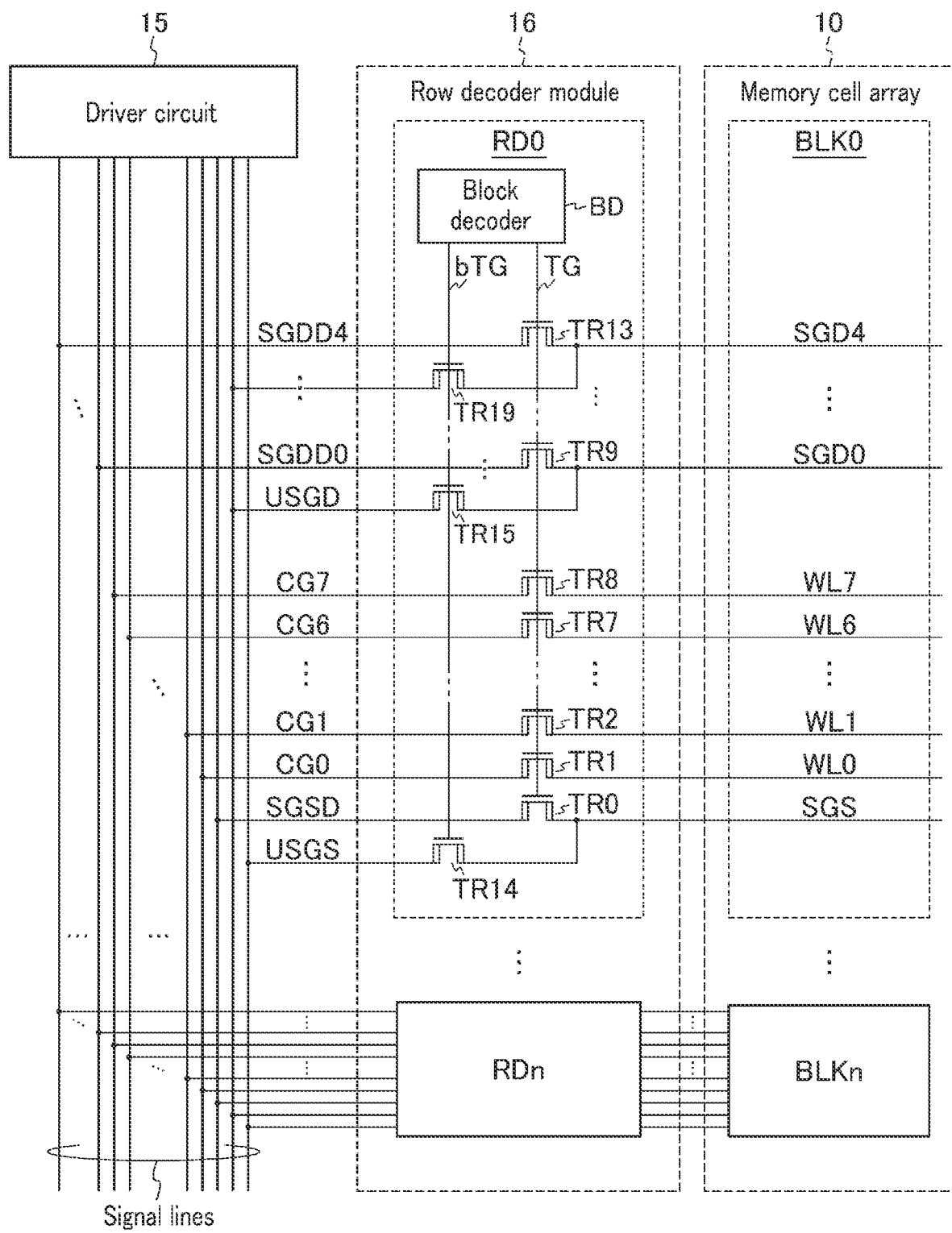
FIG. 3 is a circuit diagram showing an example of the circuit configuration of a row decoder module included in the memory device according to the first embodiment.

FIG. 3 is a circuit diagram showing an example of the circuit configuration of a row decoder module 16 included in the memory device 1 according to the first embodiment. FIG. 3 shows how the driver circuit 15, the memory cell array 10 and the row decoder module 16 are coupled to each other, and also shows a detailed circuit configuration of the row decoder RD0. As shown in FIG. 3, each row decoder RD included in the row decoder module 16 is coupled to signal lines CG0 to CG7, SGDD0 to SGDD4, SGSD, USGD, and USGS that are coupled to the driver circuit 15. Each row decoder RD is also coupled to the word lines WL0 to WL7 of the associated block BLK in the memory cell array 10, and to the select gate lines SGS and SGD0 to SGD4.

The row decoder RD0 includes, for example, transistors TR0 to TR19, transfer gate lines TG and bTG, and a block decoder BD. The circuit configurations of the row decoders RD other than the row decoder RD0 are similar to the circuit configuration of the row decoder RD0, except that the associated blocks BLK are different.

Each of the transistors TR0 to TR19 is an n-type HV transistor. The drains of the transistors TR0 to TR13 are respectively coupled to signal lines SGSD, CG0 to CG7 and SGDD0 to SGDD4. The sources of the transistors TR0 to TR13 are respectively coupled to the select gate line SGS, the word lines WL0 to WL7, and the select gate lines SGD0 to SGD4 of the block BLK0. The drain and source of the transistor TR14 are respectively coupled to the signal line USGS and the select gate line SGS of the block BLK0. The drains of the transistors TR15 to TR19 are coupled to the signal line USGD. The sources of the transistors TR15 to TR19 are coupled to the select gate lines SGD0 to SGD4 of the block BLK0, respectively. The gates of the transistors TR0 to TR13 are coupled to the transfer gate line TG. The gates of the transistors TR14 to TR19 are coupled to a transfer gate line bTG.

The block decoder BD is a circuit having a function of decoding a block address. The block decoder BD applies one of an "H" level voltage and an "L" level voltage to the transfer gate line TG and applies the other one of the "H" level voltage and the "L" level voltage to the transfer gate line bTG, based on the decoding result of the block address. Specifically, the block decoder BD corresponding to the selected block BLK applies "H" level and "L" level voltages to the transfer gate lines TG and bTG, respectively. The block decoder BD corresponding to a non-selected block BLK applies "L" level and "H" level voltages to the transfer gate lines TG and bTG, respectively. As a result, the voltages of the signal lines CG0 to CG7 are transferred to the word lines WL0 to WL7 of the selected block BLK, respectively, the voltages of the signal lines SGDD0 to SGDD4 and SGSD are transferred to the select gate lines SGD0 to SGD4 and SGS of the selected block BLK, respectively, and the voltages of the signal lines USGD and USGS are transferred to the select gate lines SGD and SGS of the non-selected blocks BLK, respectively.

The row decoder module 16 may have other circuit configurations. For example, the number of transistors TR included in the row decoder module 16 can be changed in accordance with the number of wirings provided in each block BLK. Since the signal line CG is shared by a plurality of blocks BLK, it may be referred to as a "global word line." Since the word line WL is provided for each block, it may be referred to as a "local word line." Since each of the signal lines SGDD and SGSD is shared by a plurality of blocks BLK, it may be referred to as a "global transfer gate line." Since each of the select gate lines SGD and SGS is provided for each block, it may be referred to as a "local transfer gate line."

<1-2-3> Circuit Configuration of Data Register 17 and Sense Amplifier Module 18

Figure 4:
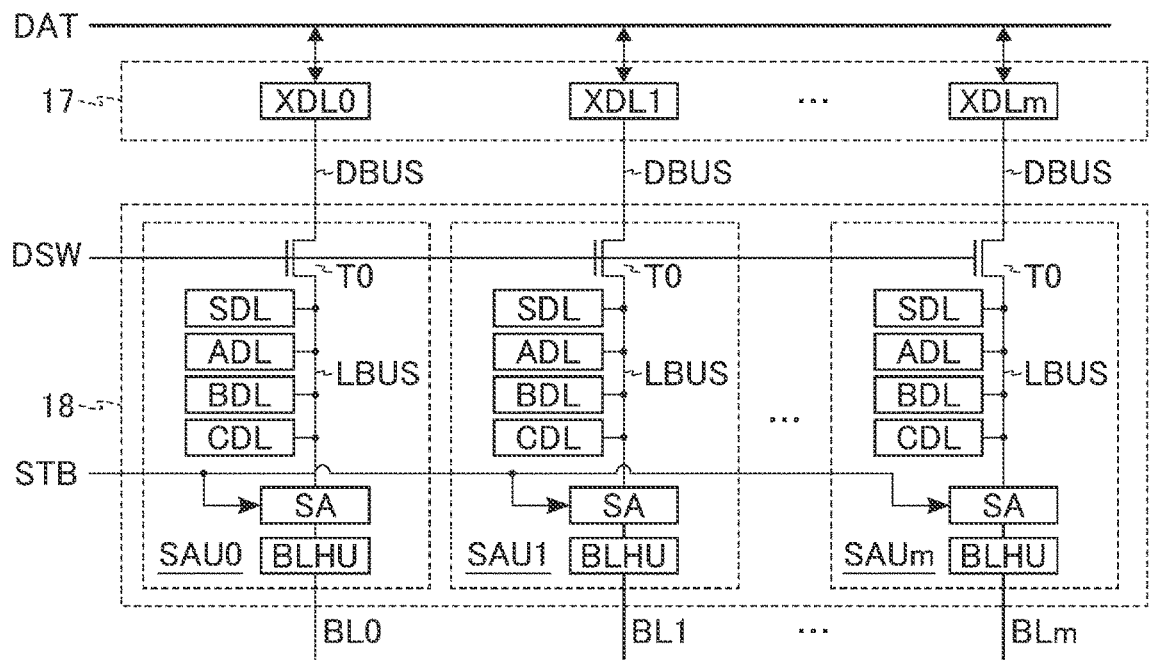
FIG. 4 is a circuit diagram showing an example of circuit configurations of a data register and a sense amplifier module included in the memory device according to the first embodiment.

FIG. 4 is a circuit diagram showing an example of circuit configurations of a data register 17 and a sense amplifier module 18 included in the memory device 1 according to the first embodiment. As shown in FIG. 4, the data register 17 includes, for example, a plurality of latch circuits XDL0 to XDLm. Each sense amplifier unit SAU includes, for example, buses DBUS and LBUS, a transistor T0, latch circuits SDL, ADL, BDL and CDL, a sense amplifier unit SA, and a bit line connection unit BLHU.

Each latch circuit XDL is a circuit capable of temporarily holding data. Each latch circuit XDL is used to input/output data DAT between the sense amplifier module 18 and the input/output circuit 11. The plurality of latch circuits XDL0 to XDLm are associated with a plurality of sense amplifier units SAU0 to SAUm, respectively. Each latch circuit XDL may be shared by the plurality of sense amplifier units SAU. Each of the plurality of latch circuits XDL0 to XDLm is coupled to the associated sense amplifier unit SAU via the bus DBUS. Each latch circuit XDL is configured such that it can transmit and receive data to and from the associated sense amplifier unit SAU via the DBUS.

The transistor T0 of each sense amplifier unit SAU controls transfer of signals between associated DBUS and LBUS. One end of the transistor T0 of each sense amplifier unit SAU is coupled to the associated DBUS. The other end of the transistor T0 of each sense amplifier unit SAU is coupled to the associated LBUS. A control signal DSW is input to the gate of the transistor T0 of each sense amplifier unit. The control signal DSW is generated by the sequencer 14, for example.

The LBUS of each sense amplifier unit SAU is coupled to each of the latch circuits SDL, ADL, BDL and CDL and the sense amplifier unit SA. Each of the latch circuits SDL, ADL, BDL and CDL is a circuit capable of temporarily holding data. The sense amplifier unit SA is a circuit used for determining data, based on the voltage of the bit line BL, and for applying a voltage to the bit line BL. Where the control signal STB is asserted during the read operation, the sense amplifier unit SA determines whether the data read from the selected memory cell transistor MT is "0" or "1," based on the voltage of the associated bit line BL. The latch circuits SDL, ADL, BDL and CDL, and the sense amplifier unit SA are configured such that they can transmit and receive data via the LBUS. Each sense amplifier section SA is coupled to the associated bit line BL via the bit line connection unit BLHU. The bit line connection unit BLHU is, for example, a protection circuit for preventing a high voltage, which is applied to the channel of the NAND string NS in an erase operation, from being applied to the sense amplifier unit SA.

(Circuit Configuration of Sense Amplifier Unit SAU)

Figure 5:
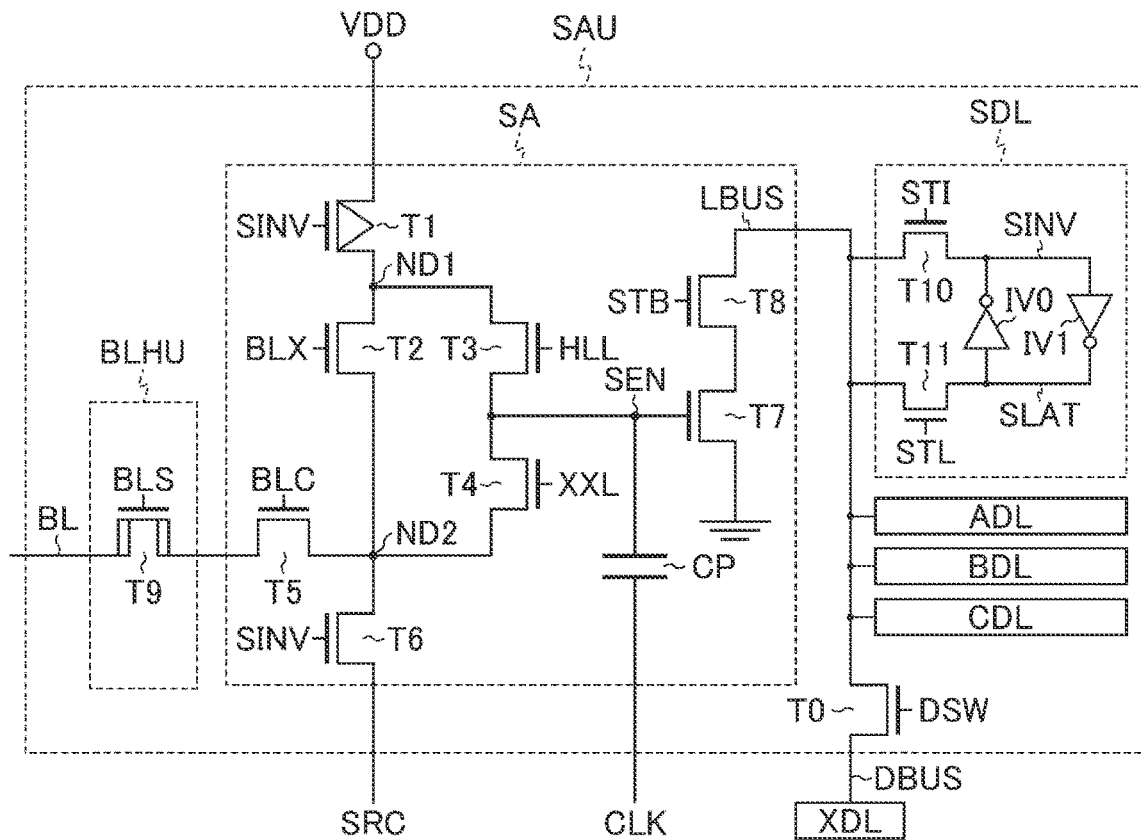
FIG. 5 is a circuit diagram showing an example of a circuit configuration of a sense amplifier unit included in a sense amplifier module provided in the memory device according to the first embodiment.

FIG. 5 is a circuit diagram showing an example of a circuit configuration of the sense amplifier unit SAU included in the sense amplifier module 18 of the memory device 1 according to the first embodiment. As shown in FIG. 5, the sense amplifier unit SA includes, for example, transistors T1 to T8, a capacitor CP, and nodes ND1, ND2, SEN and SRC. The bit line connection unit BLHU includes, for example, a transistor T9. The latch circuit SDL includes, for example, inverters IV0 and IV1, transistors T10 and T11, and nodes SINV and SLAT. The transistor T1 is a p-type LV transistor. Each of the transistors T2 to T8, T10 and T11 is an n-type LV transistor. The transistor T9 is an n-type HV transistor.

The source, drain, and gate of the transistor T1 are coupled to a power supply line, the node ND1, and the node SINV, respectively. A power supply voltage VDD, for example, is applied to the power supply line. The drain and source of the transistor T2 are coupled to the nodes ND1 and ND2, respectively. A control signal BLX is input to the gate of the transistor T2. The drain and source of the transistor T3 are coupled to the nodes ND1 and SEN, respectively. A control signal HLL is input to the gate of the transistor T3. The drain and source of the transistor T4 are coupled to the nodes SEN and ND2, respectively. A control signal XXL is input to the gate of the transistor T4. The drain of the transistor T5 is coupled to the node ND2. A control signal BLC is input to the gate of the transistor T5. The drain, source, and gate of the transistor T6 are coupled to the nodes ND2, SRC and SINV, respectively. For example, a ground voltage VSS is applied to the node SRC. The source and gate of the transistor T7 are coupled to a ground node and the node SEN, respectively. A ground voltage VSS, for example, is applied to the ground node. The drain and source of the transistor T8 are coupled to the bus LBUS and the drain of the transistor T7, respectively. A control signal STB is input to the gate of the transistor T8. One electrode of the capacitor CP is coupled to the node SEN. The other electrode of the capacitor CP is supplied with a clock signal CLK.

The drain and source of the transistor T9 are respectively coupled to the source of the transistor T8 and the associated bit line BL. A control signal BLS is input to the gate of the transistor T9.

One end and the other end of the transistor T10 are coupled to the bus LBUS and the node SINV, respectively. A control signal STI is input to the gate of the transistor T10. One end and the other end of the transistor T11 are coupled to the bus LBUS and the node SLAT, respectively. A control signal STL is input to the gate of the transistor T11. The input node and output node of the inverter IV0 are coupled to the nodes SLAT and SINV, respectively. The input node and output node of the inverter IV1 are coupled to the nodes SINV and SLAT, respectively. The latch circuit SDL holds data at the node SLAT, and holds the inverted data of the data of the node SLAT at the node SINV. Each of the latch circuits ADL, BDL, and CDL has a configuration similar that of the latch circuit SDL, except that control signals supplied to a data holding node, an inverted data holding node, and the transistors T10 and T11 are prepared independently of the latch circuit SDL.

It should be noted that each of the control signals BLX, HLL, XXL, BLC, STB, BLS, STI and STL and the clock signal CLK is generated by the sequencer 14, for example. The sense amplifier module 18 may have other circuit configurations. For example, the number of latch circuits provided in each sense amplifier unit SAU can be changed in accordance with the number of bits stored in the memory cell transistor MT. The sense amplifier unit SAU may have an arithmetic circuit capable of executing a simple logic operation. In a read operation of each page, the sense amplifier module 18 can determine (finalize) the data stored in the memory cell transistor MT by appropriately executing arithmetic processing using the latch circuits.

<1-3> Structure of Memory Device

Next, a description will be given of the structure of the memory device 1 according to the first embodiment. In the drawings referenced below, a three-dimensional Cartesian coordinate system is used. The X direction corresponds to the direction in which the word line WL extends. The Y direction corresponds to the direction in which the bit line BL extends. The Z direction corresponds to the vertical direction with respect to the surface of a reference substrate. The XZ plane corresponds to a plane parallel to each of the X and Z directions. The "up" or "down" in the present specification is defined based on the Z direction, and the direction away from the reference substrate is defined as a positive direction (upward). As a reference substrate, for example, the substrate depicted at the lowermost position in the drawings is used. The front surface of the substrate corresponds to the surface on which transistors (CMOS circuits) are formed. The back surface of the substrate corresponds to the surface opposite to the front surface.

<1-3-1> Appearance of Memory Device 1

Figure 6:
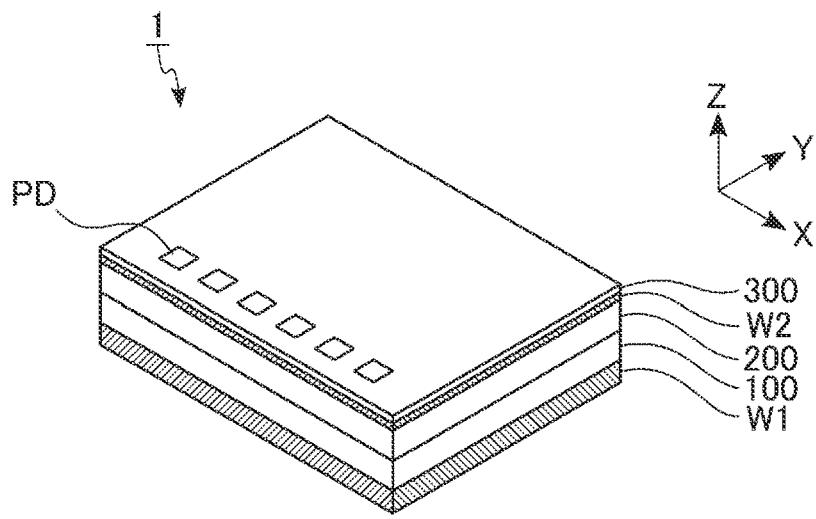
FIG. 6 is a perspective view showing an example of an appearance of the memory device according to the first embodiment.

FIG. 6 is a perspective view showing an example of an appearance of the memory device 1 according to the first embodiment. As shown in FIG. 6, the memory device 1 has a structure in which, for example, a first substrate W1, a CMOS layer 100, a memory layer 200, a second substrate W2, and a wiring layer 300 are stacked in this order from below.

The CMOS layer 100 includes CMOS circuits formed using the first substrate W1. The CMOS layer 100 includes, for example, an input/output circuit 11, a logic controller 12, a register circuit 13, a sequencer 14, a driver circuit 15, a row decoder module 16, a data register 17, and a sense amplifier module 18. The memory layer 200 includes a memory cell array 10 formed using the second substrate W2. The wiring layer 300 includes, for example, a plurality of pads PD exposed on the surface of the memory device 1. The plurality of pads PD are used for coupling the memory device 1 and the memory controller 2 to each other.

Each of the first substrate W1 and the second substrate W2 is a silicon substrate. The first substrate W1 includes an impurity diffusion region formed in accordance with the circuit design of the memory device 1. The memory device 1 has a bonding surface between CMOS layer 100 and the memory layer 200. The bonding surface corresponds to the boundary portion of the two bonded substrates. In this example, the surface of the CMOS layer 100 on the first substrate W1 and the surface of the memory layer 200 on the second substrate W2 are bonded by the bonding process of the first substrate W1 and the second substrate W2. The second substrate W2 may be removed after the first substrate W1 and the second substrate W2 are bonded. In this case, the memory device 1 does not include the second substrate W2.

<1-3-2> Planar Layout of Bonding Surface

Figure 7:
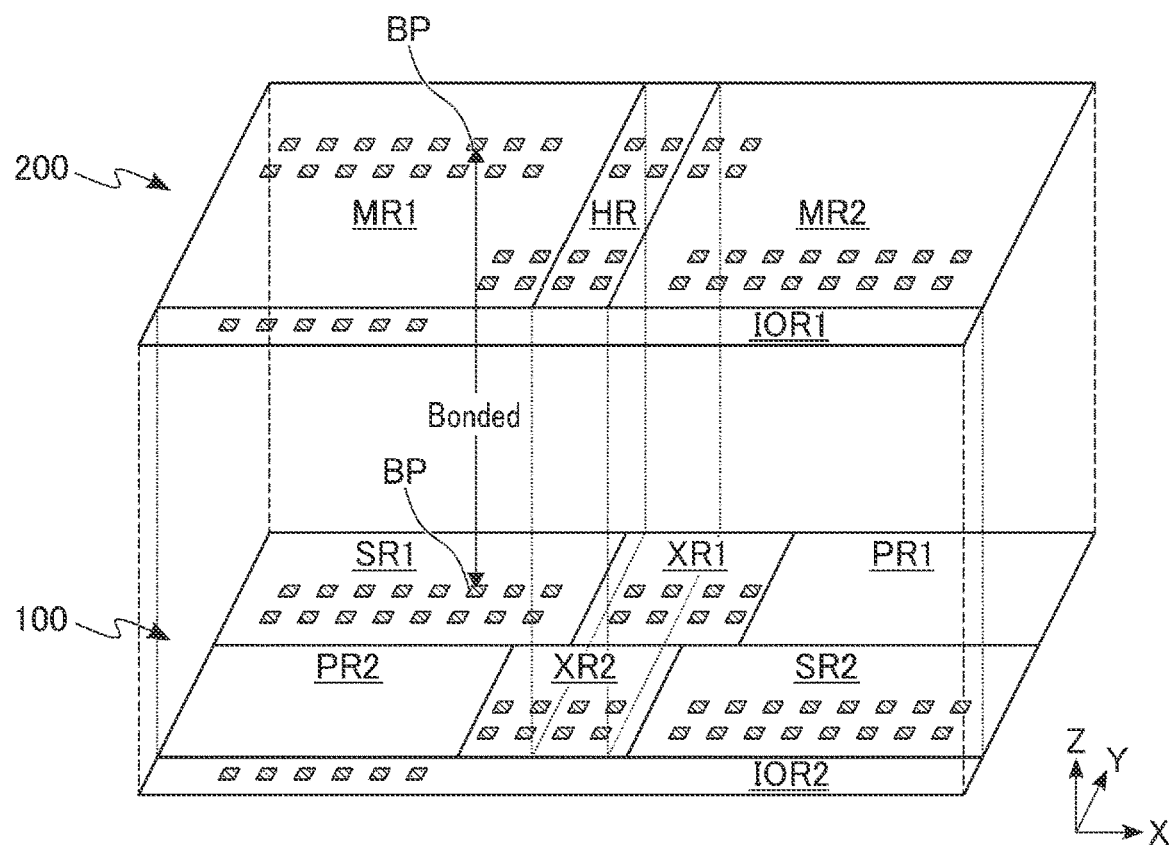
FIG. 7 is a schematic diagram showing an example of a planar layout of bonding surfaces provided in the memory device according to the first embodiment.

FIG. 7 is a schematic diagram showing an example of a planar layout of a bonding surface provided in the memory device 1 according to the first embodiment. FIG. 7 shows a layout of the bonding surface between the CMOS layer 100 and the memory layer 200, and shows coordinate axes using the first substrate W1 as a reference. As shown in FIG. 7, the memory layer 200 includes, for example, memory regions MR1 and MR2, a hookup region HR, and an input/output region IOR1. The CMOS layer 100 includes, for example, transfer regions XR1 and XR2, sense amplifier regions SR1 and SR2, peripheral circuit regions PR1 and PR2, and an input/output region IOR2.

The memory regions MR1 and MR2 are used for data storage and include a plurality of NAND strings NS. The memory regions MR1 and MR2 are arranged in the X direction. The hookup region HR is arranged between the memory regions MR1 and MR2. The hookup region HR is a region used for coupling between the stacked wirings provided in the memory regions MR1 and MR2 and the transistors provided in the transfer regions XR1 and XR2. The input/output region IOR1 includes a circuit related to the input/output circuit 11, etc. The input/output region IOR1 is adjacent to each of the memory regions MR1 and MR2 and the hookup region HR in the Y direction.

The transfer regions XR1 and XR2 include a row decoder module 16. The sense amplifier regions SR1 and SR2 include, for example, a data register 17 and a sense amplifier module 18. The peripheral circuit regions PR1 and PR2 include a sequencer 14, etc. The input/output region IOR2 includes a circuit related to the input/output circuit 11. The sense amplifier region SR1, the transfer region XR1, and the peripheral circuit region PR1 are arranged in this order in the X direction. The peripheral circuit region PR2, the transfer region XR2, and the sense amplifier region SR2 are arranged in this order in the X direction. The set consisting of the sense amplifier region SR1, the transfer region XR1 and the peripheral circuit region PR1 is adjacent in the Y direction to the set consisting of the sense amplifier region SR2, the transfer region XR2 and the peripheral circuit region PR2. The sense amplifier regions SR1 and SR2 are spaced apart and do not include portions adjacent in the X direction, for example. The sense amplifier region SR1 is adjacent to the peripheral circuit region PR2 and a portion of the transfer region XR2 in the Y direction. The sense amplifier region SR2 is adjacent to the peripheral circuit region PR1 and a portion of the transfer region XR1 in the Y direction. The transfer regions XR1 and XR2 include portions adjacent to each other in the Y direction.

The sense amplifier region SR1, the peripheral circuit region PR2, and a portion of each of the transfer regions XR1 and XR2 overlap the memory region MR1 in the Z direction. The sense amplifier region SR2, the peripheral circuit region PR1, and a portion of each of the transfer regions XR1 and XR2 overlap the memory region MR2 in the Z direction. The portion of each of the transfer regions XR1 and XR2 overlaps the hookup region HR in the Z direction. The input/output region IOR2 overlaps the input/output region IOR1 in the Z direction. The area of the portion where the memory region MR1 and the transfer region XR1 overlap is smaller than the area of the portion where the memory region MR1 and the transfer region XR2 overlap. The area of the portion where the memory region MR2 and the transfer region XR2 overlap is smaller than the area of the portion where the memory region MR2 and the transfer region XR1 overlap. As viewed in the X direction, the width of the region where the transfer region XR1 and the memory region MR1 overlap is narrower than the width of the region where the transfer region XR1 and the memory region MR2 overlap. As viewed in the X direction, the width of the region where the transfer region XR2 and the memory region MR1 overlap is wider than the width of the region where the transfer region XR2 and the memory region MR2 overlap.

That is, the transfer region XR1 includes a first overlap region overlapping the memory region MR2 in the Z direction and a first adjacent region aligned with the sense amplifier region SR2 in the Y direction. The transfer region XR2 includes a second overlap region overlapping the memory region MR1 in the Z direction and a second adjacent region aligned with the sense amplifier region SR1 in the Y direction. The transfer region XR1 further includes a third overlap region overlapping the memory region MR1 in the Z direction. The transfer region XR2 further includes a fourth overlap region overlapping the memory region MR2 in the Z direction. The width of the third overlap region as viewed in the X direction is narrower than the width of the first overlap region as viewed in the X direction. The width of the fourth overlap region as viewed in the X direction is narrower than the width of the second overlap region as viewed in the first direction.

The memory layer 200 includes a plurality of bonding pads BP on its bonding surface with the CMOS layer 100. Each of the memory regions MR1 and MR2, the hookup region HR, and the input/output region IOR1 includes at least one bonding pad BP. The bonding pads BP of the memory regions MR1 and MR2 are coupled to bit lines BL, for example. The bonding pads BP of the hookup region HR are coupled to, for example, one of the stacked wirings (e.g., word line WL) provided in the memory regions MR1 and MR2. The bonding pads BP of the input/output region IOR1 are electrically coupled to the pads PD via the wiring layer 300, for example.

The CMOS layer 100 includes a plurality of bonding pads BP on its bonding surface with the memory layer 200. Each of the sense amplifier regions SR1 and SR2, the transfer regions XR1 and XR2, and the input/output region IOR2 includes at least one bonding pad BP. Bonding pads BP may be provided in the peripheral circuit regions PR1 and PR2. The bonding pads BP of the transfer regions XR1 and XR2 are coupled to transistors TR of the row decoder RD, for example. The bonding pads BP of the sense amplifier regions SR are coupled to the transistor T9 of the sense amplifier unit SAU, for example. The bonding pads BP of the input/output region IOR2 are coupled to the transistors of the input/output circuit 11, for example.

At the bonding surfaces of the CMOS layer 100 and the memory layer 200, the plurality of bonding pads BP provided on the memory layer 200 are arranged opposite to the plurality of bonding pads BP provided on the CMOS layer 100. In the memory device 1, a pair consisting of two bonding pads BP arranged opposite to each other are bonded ("bonded" indicated in FIG. 7). Thus, the two bonding pads BP arranged opposite to each other are electrically coupled, and the circuits between the CMOS layer 100 and the memory layer 200 are electrically coupled thereby. It should be noted that each of the bonding pads BP may be referred to as a bonding metal.

As described above, in a plan view, the CMOS layer 100 of the memory device 1 includes two sense amplifier regions SR1 and SR2 that are divided in the X direction, with the hookup region HR interposed therebetween, and also includes two transfer regions XR1 and XR2 divided in the Y direction. The sense amplifier regions SR1 and SR2 are arranged to be shifted in the Y direction, and the transfer regions XR1 and XR2 are arranged to be shifted in the X direction. That is, in a plan view, the two sense amplifier regions SR and the two transfer regions XR are arranged point-symmetrically. Specifically, the sense amplifier regions SR1 and SR2 are arranged point-symmetrically with respect to, for example, the central portion of the hookup region HR as viewed in a plan view. The transfer regions XR1 and XR2 are arranged point-symmetrically with respect to, for example, the central portion of the hookup region HR as viewed in a plan view.

It should be noted that the arrangement of the memory regions MR1 and MR2, the hookup region HR, the transfer regions XR1 and XR2, the sense amplifier regions SR1 and SR2, and the peripheral circuit regions PR1 and PR2 can be changed as appropriate. The input/output region IOR and the peripheral circuit region PR may share each other's regions.

<1-3-3> Structure of Memory Layer 200

Next, a detailed structure of the memory layer 200 will be described. In the descriptions below, an example will be given in which the memory cell array 10 includes eight blocks BLK0 to BLK7. Structures common to the memory regions MR1 and MR2 will be described as the structure of the memory region MR.

(1: Planar Layout of Memory Layer 200)

Figure 8:
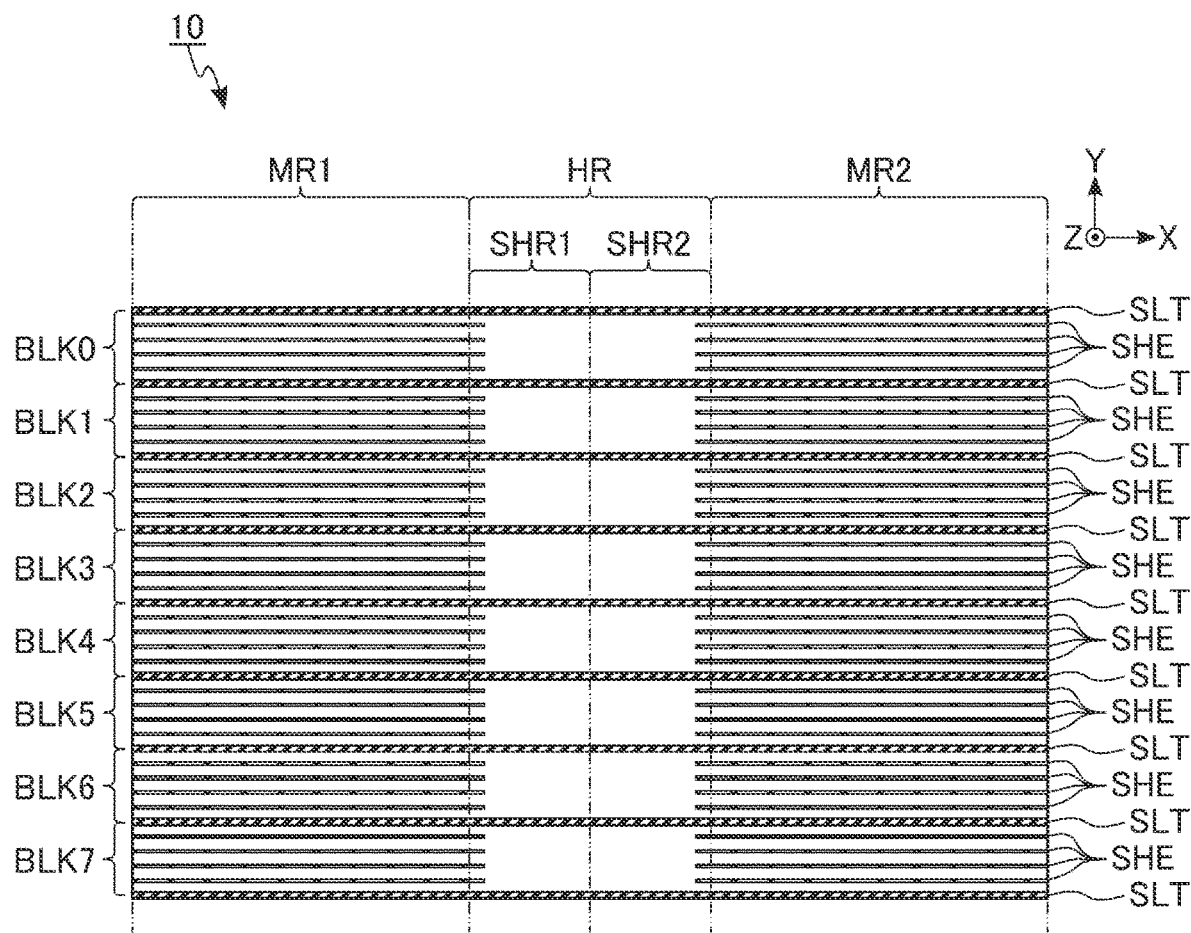
FIG. 8 is a plan view showing an example of a planar layout of a memory layer included in the memory device according to the first embodiment.

FIG. 8 is a plan view showing an example of a planar layout of the memory layer 200 included in the memory device according to the first embodiment. In FIG. 8, memory regions MR1 and MR2 and a hookup region HR are extracted and shown. As shown in FIG. 8, each of the plurality of blocks BLK extends in the X direction. A plurality of blocks BLK are arranged in the Y direction. The memory cell array 10 includes, for example, a plurality of slits SLT and a plurality of slits SHE.

Each slit SLT includes a portion extending along the X direction, and crosses the memory region MR1, the hookup region HR, and the memory region MR2 along the X direction. The plurality of slits SLT are arranged in the Y direction. Each slit SLT has, for example, a structure in which an insulator is embedded. Each slit SLT divides adjacent wirings (e.g., word lines WL0 to WL7 and select gate lines SGD and SGS), which are adjacent to each other, with the slit SLT interposed. In the memory cell array 10, each of the regions partitioned by the slits SLT corresponds to one block BLK.

The plurality of slits SHE include a plurality of slits SHE aligned in the Y direction in the memory region MR1, and a plurality of slits SHE aligned in the Y direction in the memory region MR2. Each slit SHE includes a portion extending along the X direction and crosses the memory region MR1 and MR2 along the X direction. In this example, in each of the memory regions MR1 and MR2, four slits SHE are arranged between two slits SLT that are adjacent to each other in the Y direction. Each slit SHE has, for example, a structure in which an insulator is embedded. Each slit SHE divides wirings (at least the select gate line SGD), which are adjacent to each other with the slit SHE interposed. In the memory cell array 10, each of the regions partitioned by a pair of adjacent slits SLT and SHE or by a pair of two adjacent slits SHE corresponds to one string unit SU.

The hookup region HR includes sub hookup regions SHR1 and SHR2 that are divided into two in the X direction. The sub hookup region SHR1 is adjacent to the memory region MR1. The sub hookup region SHR2 is adjacent to the memory region MR2. The stacked wirings of each block BLK are coupled to the row decoder module 16, for example, via contacts arranged in the sub hookup region SHR1 or SHR2. In the descriptions below, an example will be given in which each of stacked wirings of blocks BLK(i*4) and BLK(i*4+3) ("i" is an integer equal to or larger than 0) is coupled to a contact provided in the sub hookup region SHR1, and in which each of wirings of blocks BLK(i*4+1) and BLK(i*4+2) is coupled to a contact provided in the sub hookup region SHR2. In this case, in the hookup region HR, the structure of the portions corresponding to the blocks BLK0 to BLK3 is repeatedly arranged in the Y direction.

It should be noted that the planar layout of the memory cell array 10 may be another layout. For example, the number of slits SHE arranged between two adjacent slits SLT can be designed to be any number. The number of string units SU included in each block BLK can be changed based on the number of slits SHE arranged between two adjacent slits SLT.

(2: Planar Layout of Memory Region MR)

Figure 9:
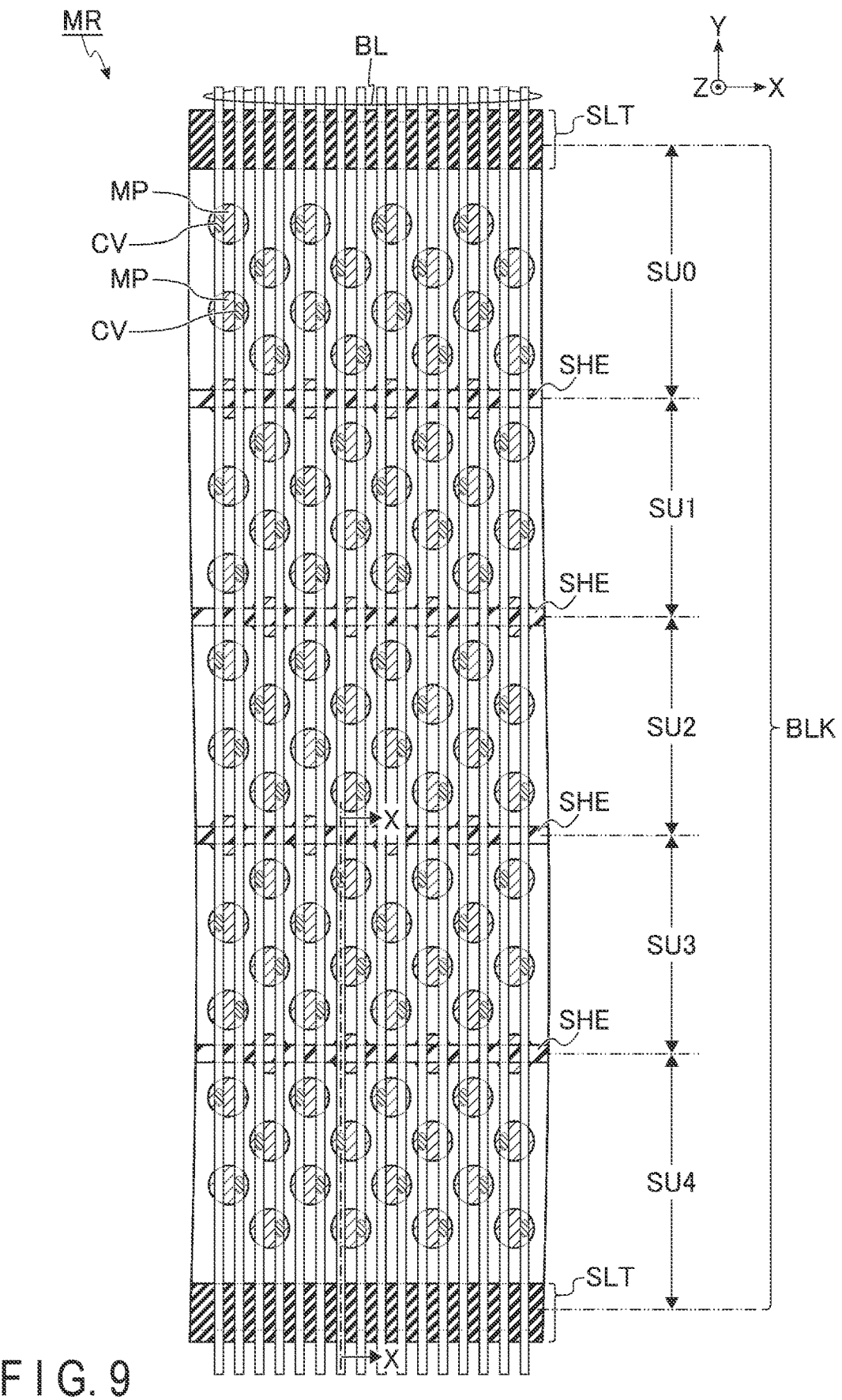
FIG. 9 is a plan view showing an example of a planar layout of a memory region of a memory layer included in the memory device according to the first embodiment.

FIG. 9 is a plan view showing an example of a planar layout of the memory region MR of the memory layer 200 included in the memory device 1 according to the first embodiment. FIG. 9 shows a region including one block BLK (string units SU0 to SU4). As shown in FIG. 9, in the memory region MR, the memory device 1 includes, for example, a plurality of memory pillars MP, a plurality of contacts CV, and a plurality of bit lines BL.

Each memory pillar MP functions as one NAND string NS. In the region between two adjacent slits SLT, the plurality of memory pillars MP are arranged, for example, in 24 rows and in a staggered fashion. For example, slits SHE are arranged such that one overlaps the memory pillars MP in the 5th row from the upper side of the drawing sheet, one overlaps the memory pillars MP in the 10th row, one overlaps the memory pillars MP in the 15th row, and one overlaps the memory pillars MP in the 20th row.

Each bit line BL includes a portion extending in the Y direction. The plurality of bit lines BL are arranged in the X direction. Each bit line BL is arranged such that it overlaps at least one memory pillar MP in each string unit SU. In this example, the bit lines BL are arranged such that two bit lines overlap one memory pillar MP. The memory pillar MP is electrically coupled to one of the plurality of overlapping bit lines BL via the contacts CV. It should be noted that the contact CV between the memory pillar MP in contact with two different select gate lines SGD and the bit line BL may be omitted.

It should be noted that the planar layout of the memory region MR may be another layout. For example, the numbers of memory pillars MP and slits SHE arranged between two adjacent slits SLT, and how they are arranged can be changed as appropriate. The number of bit lines BL overlapping each memory pillar MP can be designed to be any number.

(3. Cross-Sectional Structure of Memory Region MR)

Figure 10:
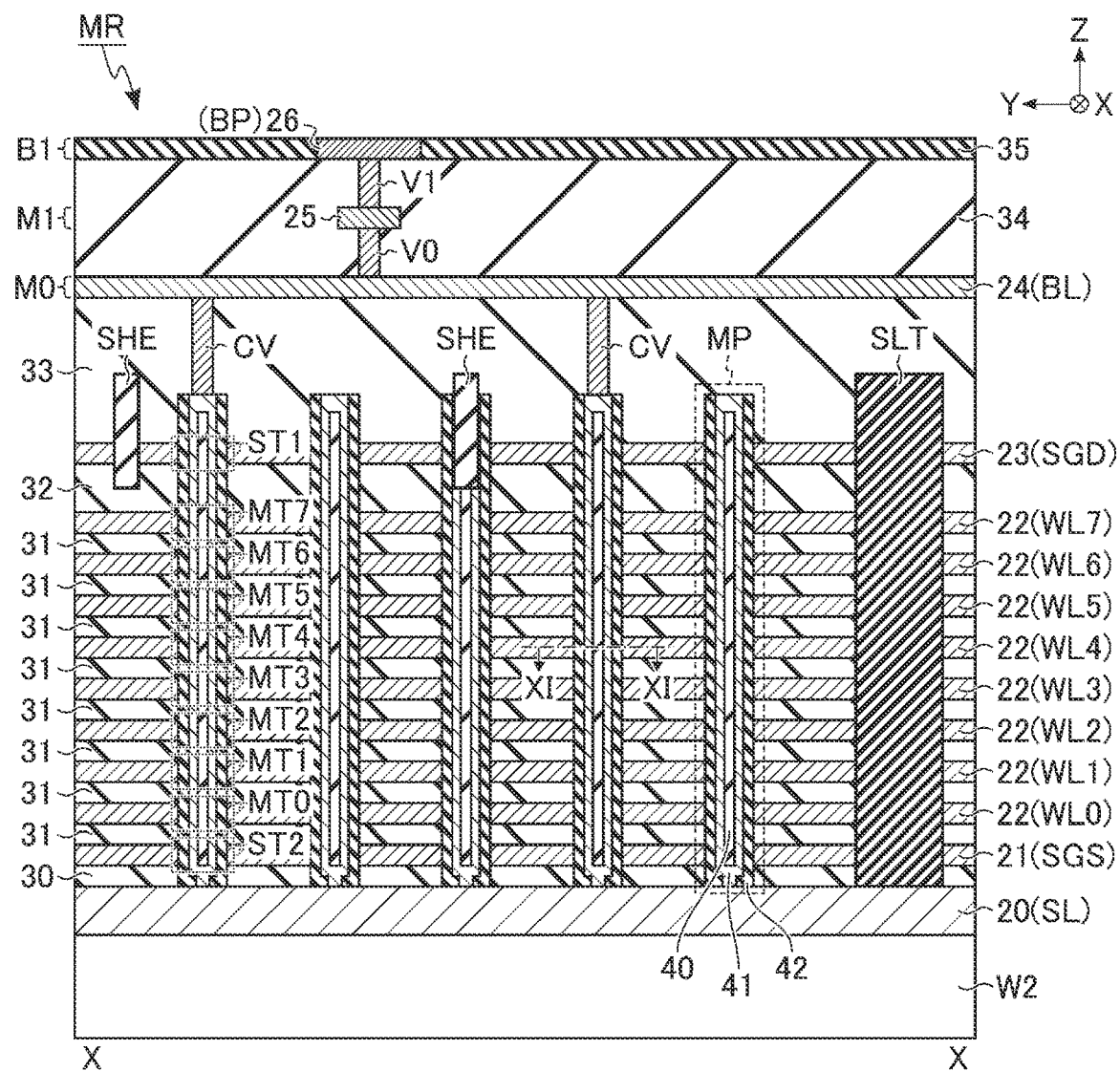
FIG. 10 is a cross-sectional view taken along line X-X of FIG. 9 and showing an example of the cross-sectional structure of the memory region of the memory layer included in the memory device according to the first embodiment.

FIG. 10 is a cross-sectional view taken along line X-X of FIG. 9 and showing an example of the cross-sectional structure of the memory region MR of the memory layer 200 included in the memory device 1 according to the first embodiment. FIG. 10 shows an example of how the structure of the memory cell array 10 formed on the second substrate W2 is before bonding to the first substrate W1, and shows coordinate axes using the second substrate W2 as a reference. As shown in FIG. 10, in the memory region MR, the memory layer 200 includes, for example, conductive layers 20 to 26, insulating layers 30 to 35, and contacts V0 and V1.

The conductive layer 20 is provided on the second substrate W2. The insulating layer 30 is provided on the conductive layer 20. The conductive layers 21 and the insulating layers 31 are alternately provided on the insulating layer 30. The insulating layer 32 is provided on the uppermost conductive layer 22. The conductive layer 23 is provided on the insulating layer 32. The insulating layer 33 is provided on the conductive layer 23. The conductive layer 24 is provided on the insulating layer 33. The contact V0 is provided on the conductive layer 24. The conductive layer 25 is provided on the contact V0. The contact V1 is provided on the conductive layer 25. The conductive layer 26 is provided on the contact V1. The contact V0, the conductive layer 25 and the contact V1 are covered with the insulating layer 34. The insulating layer 34 may be composed of a plurality of insulating layers. The insulating layer 35 is provided on the insulating layer 34. In the descriptions below, the layers that are provided at the heights of the conductive layers 24 and 25 will be referred to as wiring layers M0 and M1, respectively. The layer having the height where the conductive layer 26 and the insulating layer 35 are provided will be referred to as a "bonding layer B1."

Each of the conductive layers 21, 22, and 23 is formed, for example, as a plate spreading along the XY plane. The conductive layer 24 is formed, for example, as a line extending in the Y direction. The conductive layers 20, 21 and 23 are used as a source line SL, a select gate line SGS and a select gate line SGD, respectively. The plurality of conductive layers 22 are respectively used as word lines WL0 to WL7 in this order from below. The conductive layer 24 is used as a bit line BL. The contacts V0 and V1 are provided as having a columnar shape. The conductive layers 24 and 25 are coupled to each other via the contact V0. The conductive layer 25 and the conductive layer 26 are coupled to each other via the contact V1. The conductive layer 26 is included in the bonding layer B1 and corresponds to the bonding pad BP used for bonding the first substrate W1 and the second substrate W2. The conductive layer 26 contains, for example, copper.

The slit SLT includes a plate-like portion spreading along the XZ plane, and divides the insulating layers 30 to 32 and the conductive layers 21 to 23. Each memory pillar MP is provided to extend in the Z direction and penetrates the insulating layers 30 to 32 and the conductive layers 21 to 23. Each memory pillar MP includes, for example, a core member 40, a semiconductor layer 41, and a stacked film 42. The core member 40 is an insulator extending along the Z direction. The semiconductor layer 41 covers the core member 40. A lower portion of the semiconductor layer 41 is in contact with the conductive layer 20. The stacked film 42 covers the side surface of the semiconductor layer 41. A contact CV is provided on the semiconductor layer 41. The semiconductor layer 41 and the conductive layer 24 are coupled to each other via the contact CV.

In the illustrated region, the contact CV corresponding to one memory pillar MP of the two memory pillars MP is shown. In a region that is not illustrated, the contact CV is coupled to the memory pillar MP to which the contact CV is not coupled in the illustrated region. The portion where the memory pillar MP and the conductive layer 21 intersect functions as a select transistor ST2. The portion where the memory pillar MP and the conductive layer 22 intersect functions as a memory cell transistor MT. The portion where the memory pillar MP and the conductive layer 23 intersect functions as a select transistor ST1.

(4: Cross-Sectional Structure of Memory Pillar MP)

Figure 11:
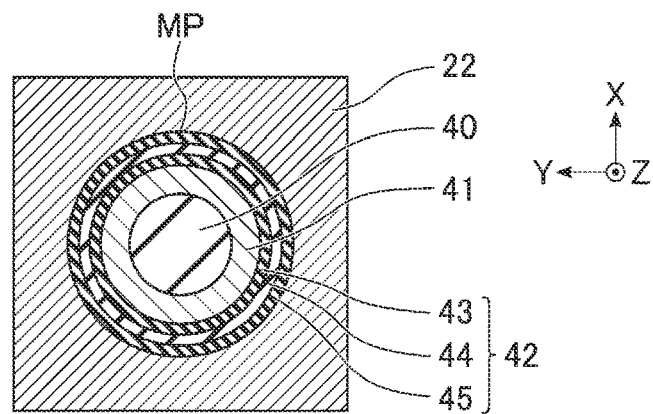
FIG. 11 is a cross-sectional view taken along line XI-XI of FIG. 10 and showing an example of a cross-sectional structure of a memory pillar included in the memory layer of the memory device according to the first embodiment.

FIG. 11 is a cross-sectional view taken along line XI-XI of FIG. 10 and showing an example of a cross-sectional structure of a memory pillar MP included in the memory layer 200 of the memory device 1 according to the first embodiment. FIG. 11 shows a cross section that includes the memory pillar MP and the conductive layer 22 and that is parallel to the surface of the source line SL. As shown in FIG. 11, the stacked film 42 includes, for example, a tunnel insulating film 43, an insulating film 44, and a block insulating film 45.

The core member 40 is provided, for example, in the central portion of the memory pillar MP. The semiconductor layer 41 surrounds the side surface of the core member 40. The tunnel insulating film 43 surrounds the side surface of the semiconductor layer 41. The insulating film 44 covers the side surface of the tunnel insulating film 43. The block insulating film 45 surrounds the side surface of the insulating film 44. The conductive layer 22 surrounds the side surface of the block insulating film 45. The semiconductor layer 41 is used as channels (current paths) of the memory cell transistors MT0 to MT7 and the select transistors ST1 and ST2. Each of the tunnel insulating film 43 and the block insulating film 45 contains silicon oxide, for example. The insulating film 44 is used as a charge storage layer of the memory cell transistor MT, and contains silicon nitride, for example. Thus, each memory pillar MP functions as one NAND string NS.

(5: Planar Layout of Hookup Region HR)

FIG. 12 is a plan view showing an example of the planar layout of the hookup region HR of the memory layer 200 included in the memory device 1 according to the first embodiment. FIG. 12 shows a portion corresponding to the block BLK1 and the sub hookup region SHR2 of the hookup region HR and a portion of the memory region MR2. As shown in FIG. 12, in the sub hookup region SHR2, the end portion of each of the select gate line SGS, the word lines WL0 to WL7, and the select gate line SGD of the block BLK1 includes a terrace portion. The memory layer 200 includes a plurality of contacts CC in the hookup region HR.

The terrace portion corresponds to that portion of the stacked wiring that does not overlap a wiring layer (conductive layer) located above. The structure formed by a plurality of terraces is similar to steps, terraces, rimstones, etc. In this example, a staircase structure having steps in the X direction is formed by an end portion of the select gate line SGS, end portions of the word lines WL0 to WL7, and an end portion of the select gate line SGD. In other words, in the hookup region HR, a step is formed between the select gate line SGS and the word line WL0, between the word line WL0 and the word line WL1, . . . , between the word line WL6 and the word line WL7, and between the word line WL7 and the select gate line SGD. The select gate line SGS and word lines WL0 to WL7 of the memory regions MR1 and MR2 are provided continuously through a highway portion HW of the hookup region HR. The highway portion HW corresponds to a portion of the conductive layer that is provided continuously along the slit SLT between the memory regions MR1 and MR2.

The contacts CC are conductors used for coupling between the row decoder module 16 and stacked wirings. A plurality of contacts CC associated with the block BLK2 are coupled to the select gate lines SGS and SGD provided in the sub hookup region SHR2 and the terrace portions of the word lines WL0 to WL7. Where the select gate line SGD of the memory region MR1 and the select gate line SGD of the memory region MR2 are associated with the same string unit SU, they are short-circuited, for example, via the contact CC and the wiring layer M1.

In this example, the layout of the portion where the sub hookup region SHR1 and the block BLK0 overlap is similar to the layout of the portion where the sub hookup region SHR2 and the block BLK1 overlap, except that the layout is inverted with respect to the X direction and the Y direction. The layout of the portion where the hookup region HR and the blocks BLK2 and BLK3 overlap is similar to the layout of the portion where the hookup region HR and the blocks BLK0 and BLK1 overlap, except that the layout is inverted with respect to the Y direction. The planar layout of the hookup region HR is not limited to this, and can be changed as appropriate.

(6. Cross-Sectional Structure of Hookup Region HR)

FIG. 13 is a cross-sectional view taken along line XIII-XIII of FIG. 12 and showing an example of a cross-sectional structure of a hookup region HR of a memory layer 200 included in the memory device 1 according to the first embodiment. FIG. 13 shows an example of how the structure of the memory cell array 10 formed on the second substrate W2 is before bonding to the first substrate W1, and shows coordinate axes using the second substrate W2 as a reference. As shown in FIG. 13, in the sub hookup region SHR2, the memory layer 200 includes, for example, a plurality of contacts CC, a plurality of contacts V0 and V1, and a plurality of conductive layers 27, 28 and 29. In the sub hookup region SHR2, the end portions of the conductive layers 21 to 23 are provided in a staircase pattern and are covered with an insulating layer 33. Insulating layers 34 and 35 are also provided in the sub hookup region SHR2 in the same manner as in the memory region MR.

A plurality of contacts CC are provided on the terrace portions of the select gate line SGS, the word lines WL0 to WL7 and the select gate line SGD, respectively. Each contact CC penetrates the insulating layer 33. One conductive layer 27 is provided on each of the plurality of contacts CC. The conductive layer 27 is included in the wiring layer M0. A contact V0 is provided on each conductive layer 27. In FIG. 13, the contact V0 corresponding to the select gate line SGS is shown from among the plurality of contacts V0. A conductive layer 28 is provided on the contact V0. The conductive layer 28 is included in the wiring layer M1. A contact V1 is provided on the conductive layer 28. The conductive layers 27 and 28 and the plurality of contacts V0 and V1 are covered with an insulating layer 34. The conductive layer 29 is provided on the contact V1. The conductive layer 29 is provided in such a manner as to penetrate the insulating layer 35. The conductive layer 29 is included in the bonding layer B1 and corresponds to the bonding pad BP used for bonding the first substrate W1 and the second substrate W2.

The set consisting of the conductive layers 27, 28 and 29 and the contacts CC, V0 and V1 corresponds to the wirings and contacts for coupling one of the conductive layers 21 to 23 to the row decoder module 16. Although not shown, each of the conductive layers 22 and 23 is similarly coupled to the row decoder module 16 via the set consisting of the associated conductive layers 27, 28 and 29 and the contacts CC, V0 and V1.

<1-3-4> Cross-Sectional Structure of Memory Device 1

Figure 14:
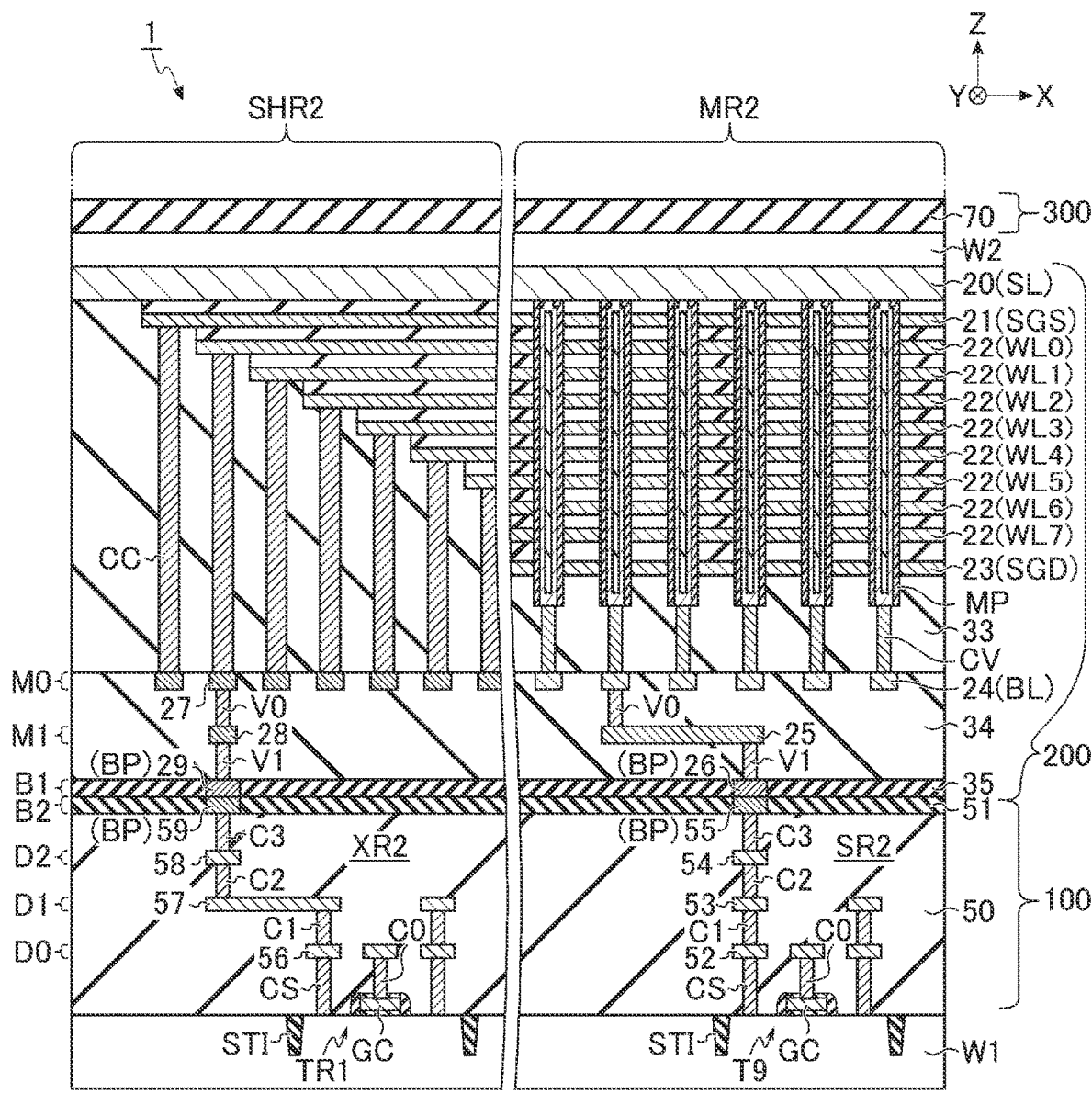
FIG. 14 is a cross-sectional view showing an example of the cross-sectional structure of the memory device according to the first embodiment.

FIG. 14 is a cross-sectional view showing an example of the cross-sectional structure of the memory device 1 according to the first embodiment. FIG. 14 shows a cross section including the memory region MR2 and the sub hookup region SHR2 of the memory device 1, and shows coordinate axes using the first substrate W1 as a reference. In FIG. 14, a configuration corresponding to the transistor T9 of the sense amplifier region SR and a configuration corresponding to the transistor TR1 of the transfer region XR2 are extracted and shown. As shown in FIG. 14, the memory device 1 includes a structure obtained by inverting the structure of the memory layer 200 shown in FIG. 10 upside down in accordance with the memory layer 200, and includes a structure obtained by inverting the structure of the sub hookup region SHR2 shown in FIG. 13 upside down. The first substrate W1 includes a plurality of well regions (not shown). For example, a transistor is formed in each of the plurality of well regions. The plurality of well regions are separated by STI (Shallow Trench Isolation), for example. The CMOS layer 100 includes, for example, insulating layers 50 and 51, conductive layers GC and 52 to 59, and contacts CS and C0 to C3.

The insulating layer 50 is provided on the first substrate W1. The insulating layer 50 covers circuits formed on the first substrate W1. The insulating layer 50 may be composed of a plurality of insulating layers. The insulating layer 50 includes wiring layers D0, D1 and D2 in this order from below. Wirings of the CMOS layer 100 are provided in each of the wiring layers D0, D1 and D2. The insulating layer 51 is provided on the insulating layer 50. The insulating layer 51 is in contact with the insulating layer 35. The boundary portion between the insulating layers 51 and 35 corresponds to a bonding surface between the first substrate W1 and the second substrate W2. The insulating layer 51 is, for example, a silicon oxide film. In the descriptions below, the layer having the height where the insulating layer 51 is provided will be referred to as a "bonding layer B2."

The conductive layer GC is provided on the gate insulating film formed on the first substrate W1. The conductive layer GC in the sense amplifier region SR is used, for example, as the gate electrode of the transistor T9. The conductive layer GC in the transfer region XR2 is used, for example, as the gate electrode of the transistor TR1. The contact C0 is provided on each conductive layer GC. Two contacts CS included in the sense amplifier region SR are coupled to two impurity diffusion regions (not shown) provided in the first substrate W1. For example, the two impurity diffusion regions of the illustrated sense amplifier region SR2 correspond to the source and drain of the transistor T8, respectively. Similarly, two contacts CS included in the transfer region XR2 are coupled to two impurity diffusion regions (not shown) provided in the first substrate W1. For example, the two impurity diffusion regions of the illustrated transfer region XR2 correspond to the source and drain of the transistor TR1, respectively.

A conductive layer 52 is provided on each of the contacts CS and C0 in the sense amplifier region SR2. The conductive layer 52 is included in the wiring layer D0. A conductive layer 53 is provided on the conductive layer 52, with a contact C1 interposed. The conductive layer 53 is included in the wiring layer D1. A conductive layer 54 is provided on the conductive layer 53, with a contact C2 interposed. The conductive layer 54 is included in the wiring layer D2. A conductive layer 55 is provided on the conductive layer 54, with a contact C3 interposed. The conductive layer 55 is included in the bonding layer B2 and corresponds to the bonding pad BP used for bonding the first substrate W1 and the second substrate W2. The conductive layer 55 contains, for example, copper. A conductive layer 26 is in contact with the conductive layer 55. Thus, the conductive layer 24 (bit line BL) is electrically coupled to the transistor T9 provided on the first substrate W1. Other conductive layers 24 are similarly coupled to the transistors provided on the first substrate W1 via conductive layers 52 to 55 and contacts CS and C1 to C3. Each conductive layer 25 in the wiring layer M1 can have a portion extending in the X direction, in accordance with the positional relationship between the associated bit line BL and the transistor T9. In the descriptions below, the conductive layer 25 will be referred to as a "crossed bit line CBL."

A conductive layer 56 is provided on each of the contacts CS and C0 in the transfer region XR2. The conductive layer 56 is included in the wiring layer D0. A conductive layer 57 is provided on the conductive layer 56, with a contact C1 interposed. The conductive layer 57 is included in the wiring layer D1. A conductive layer 58 is provided on the conductive layer 57, with a contact C2 interposed. The conductive layer 58 is included in the wiring layer D2. A conductive layer 59 is provided on the conductive layer 58, with a contact C3 interposed. The conductive layer 59 is included in the bonding layer B2 and corresponds to the bonding pad BP used for bonding the first substrate W1 and the second substrate W2. The conductive layer 59 contains, for example, copper. A conductive layer 29 is in contact with the conductive layer 59. Thus, the conductive layer 23 (word line WL0) is electrically coupled to the transistor TR1 provided on the first substrate W1. Other conductive layers 21 to 23 are similarly coupled to transistors provided on the first substrate W1 via the conductive layers 56 to 59 and contacts CS and C1 to C3. Further, for example, each conductive layer 57 in the wiring layer D1 can include a portion extending in the X direction, in accordance with the positional relationship between the corresponding stacked wiring (e.g., word line WL) and the transistor TR.

An insulating layer 70 is provided on the second substrate W2. The insulating layer 70 is included in the wiring layer 300. The wiring layer 300 includes conductive layers coupled to circuits included in either the CMOS layer 100 or the memory layer 200. The conductive layers are coupled to, for example, a pad PD provided through the insulating layer 70 (not shown).

<1-3-5> Wiring Layout for Coupling Memory Cell Array 10 and CMOS Circuit

Figure 15:
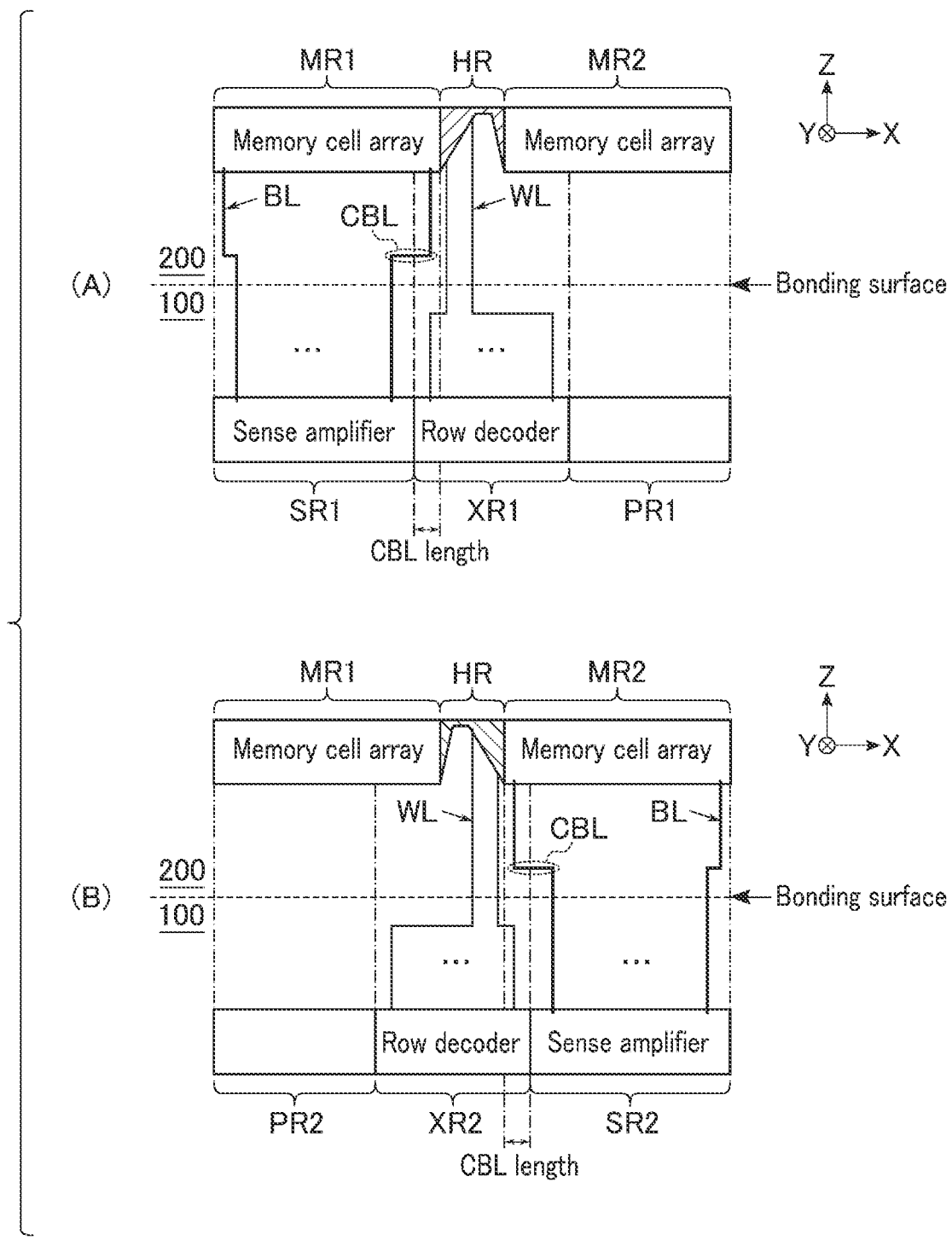
FIG. 15 is a schematic diagram showing an example of a layout in which a wiring used for coupling the memory layer and a CMOS layer is provided in the memory device according to the first embodiment.

FIG. 15 is a schematic diagram showing an example of a layout in which a wiring used for coupling the memory cell array 10 and the CMOS circuit is provided in the memory device 1 according to the first embodiment. FIG. 15A shows how a wiring layout is in a cross section which includes the sense amplifier region SR1 and the transfer region XR1 and which is along the XZ plane. FIG. 15B shows how a wiring layout is in a cross section which includes the sense amplifier region SR2 and the transfer region XR2 and which is along the XZ plane.

As shown in FIG. 15A, the width of the sense amplifier region SR1 as viewed in the X direction is narrower than the width of the memory region MR1 as viewed in the X direction. In a cross section including the sense amplifier region SR1 and the transfer region XR1, the bit line BL coupled to the memory pillar MP above the sense amplifier region SR1 is coupled to the sense amplifier unit SAU of the sense amplifier region SR1 via a wiring (crossed bit line CBL) extending in the X direction. The length of the crossed bit line CBL in the memory region MR1 is designed in accordance with the positional relationship between the associated sense amplifier unit SAU and the memory pillar MP. Also, the portion of the crossed bit line CBL that extends in the X direction in the memory region MR1 is designed to be long in accordance with the width of overlap with the transfer region XR1 in the Z direction. In the descriptions below, the X-direction length of the portion used for the layout of the crossed bit lines CBL and overlapping the memory region MR and the transfer region XR will be also referred to as "CBL length."

The X-direction width of the transfer region XR1 is wider than the X-direction width of the hookup region HR. In a cross section including the sense amplifier region SR1 and the transfer region XR1, the word lines WL etc. coupled to the contacts CC of the hookup region HR are coupled to the associated row decoder RD via a wiring (e.g., a conductive layer 37) extending in the X direction. The length of the conductive layer 37 in the memory region MR1 is designed in accordance with the positional relationship between the associated contact CC and the row decoder RD.

As shown in FIG. 15B, the width of the sense amplifier region SR2 as viewed in the X direction is narrower than the width of the memory region MR2 as viewed in the X direction. In a cross section including the sense amplifier region SR2 and the transfer region XR2, the bit line BL coupled to the memory pillar MP located above the sense amplifier region SR2 is coupled to the sense amplifier unit SAU of the sense amplifier region SR2 via the crossed bit line CBL. The length of the crossed bit line CBL in the memory region MR2 is designed in accordance with the positional relationship between the associated sense amplifier unit SAU and the memory pillar MP. Also, portions of some crossed bit lines CBL that extend in the X direction in the memory region MR2 are designed to be long in accordance with the Z-direction width of overlap with the transfer region XR2. The CBL length in the memory region MR2 is, for example, equal to the CBL length in the memory region MR1.

The X-direction width of the transfer region XR2 is wider than the X-direction width of the hookup region HR. In a cross section including the sense amplifier region SR2 and the transfer region XR2, the word lines WL etc. coupled to the contacts CC of the hookup region HR are coupled to the associated row decoder RD via wirings (e.g., conductive layers 37) extending in the X direction. The length of the conductive layer 37 in the memory region MR2 is designed in accordance with the positional relationship between associated contact CC and row decoder RD.

The numbers of wiring layers and contacts provided in the CMOS layer 100 can be designed to be any number. The above-mentioned paths for coupling the bit lines BL and the row decoders RD and the paths for coupling the word lines WL and the sense amplifier units SAU are merely examples. The crossed bit line CBL may be provided on the CMOS layer 100 side of the bonding surface. The crossed bit line CBL may be a conductive layer other than the conductive layer 25. A wiring (e.g., the conductive layer 37) used for coupling between the word line WL and one of the select gate lines SGD and SGS and the row decoder RD and extending in the X direction may be located on the side of the memory layer 200 with respect to the bonding surface. The wiring layout used for coupling the circuits in the memory layer 200 and the circuits in the CMOS layer 100 can be changed as appropriate.

(1: Wiring Layout Used for Coupling of Row Decoder Module 16)

FIG. 16 is a plan view showing an example of how a layout of the row decoder module 16 is in the memory device 1 according to the first embodiment. FIG. 16 illustrates a case where the row decoder module 16 includes eight row decoders RD associated with eight blocks BLK0 to BLK7, respectively. As shown in FIG. 16, in this example, row decoders RD0 to RD3 are arranged in the transfer region XR1, and row decoders RD4 to RD7 are arranged in the transfer region XR2.

Each row decoder RD is provided in a region extending along the X direction. In the transfer region XR1, the row decoders RD0 to RD3 are arranged in the Y direction. In the transfer region XR2, the row decoders RD4 to RD7 are arranged in the Y direction. The width of each block BLK as viewed in the Y direction is, for example, substantially equal to the width of the row decoder RD as viewed in the Y direction. In each transfer region XR, a set of row decoders RD may be arranged in the Y direction instead of being arranged in the X direction. In this case, the Y-direction width of each block BLK is designed such that it is substantially equal to the Y-direction width of a set of row decoders RD arranged in the X direction.

FIG. 17 is a plan view showing an example of how bonding pads BP used for coupling the stacked wirings and the row decoder module 16 are arranged in the memory device 1 according to the first embodiment. FIG. 17 shows how the contacts CC, the conductive layers 28 and the bonding pads BP of the bonding layer B1 are arranged in the region where the blocks BLK0 to BLK3 and the hookup region HR overlap. As shown in FIG. 17, the plurality of bonding pads BP are arranged such that they overlap respective blocks BLK in each of the sub hookup regions SHR1 and SHR2. Each contact CC is coupled to a bonding pad BP arranged above the associated block BLK or overlapping the block BLK adjacent to the associated block BLK. Each conductive layer 28 includes a portion extending in the Y direction in accordance with how the associated contact CC and bonding pad BP are arranged.

Specifically, each contact CC coupled to the block BLK0 in the sub hookup region SHR1 is coupled to a bonding pad BP located in either a region where the sub hookup region SHR1 and the block BLK0 overlap or a region where the sub hookup region SHR1 and the block BLK1 overlap. Each contact CC coupled to the block BLK1 in the sub hookup region SHR2 is coupled to a bonding pad BP located in either a region where the sub hookup region SHR2 and the block BLK0 overlap or a region where the sub hookup region SHR2 and the block BLK1 overlap. Each contact CC coupled to the block BLK2 in the sub hookup region SHR2 is coupled to a bonding pad BP located in either a region where the sub hookup region SHR2 and the block BLK2 overlap or a region where the sub hookup region SHR2 and the block BLK3 overlap. Each contact CC coupled to the block BLK3 in the sub hookup region SHR1 is coupled to a bonding pad BP located in either a region where the sub hookup region SHR1 and the block BLK2 overlap or a region where the sub hookup region SHR1 and the block BLK3 overlap.

(2: Wiring Layout Used for Coupling of Sense Amplifier Module 18)

Figure 18:
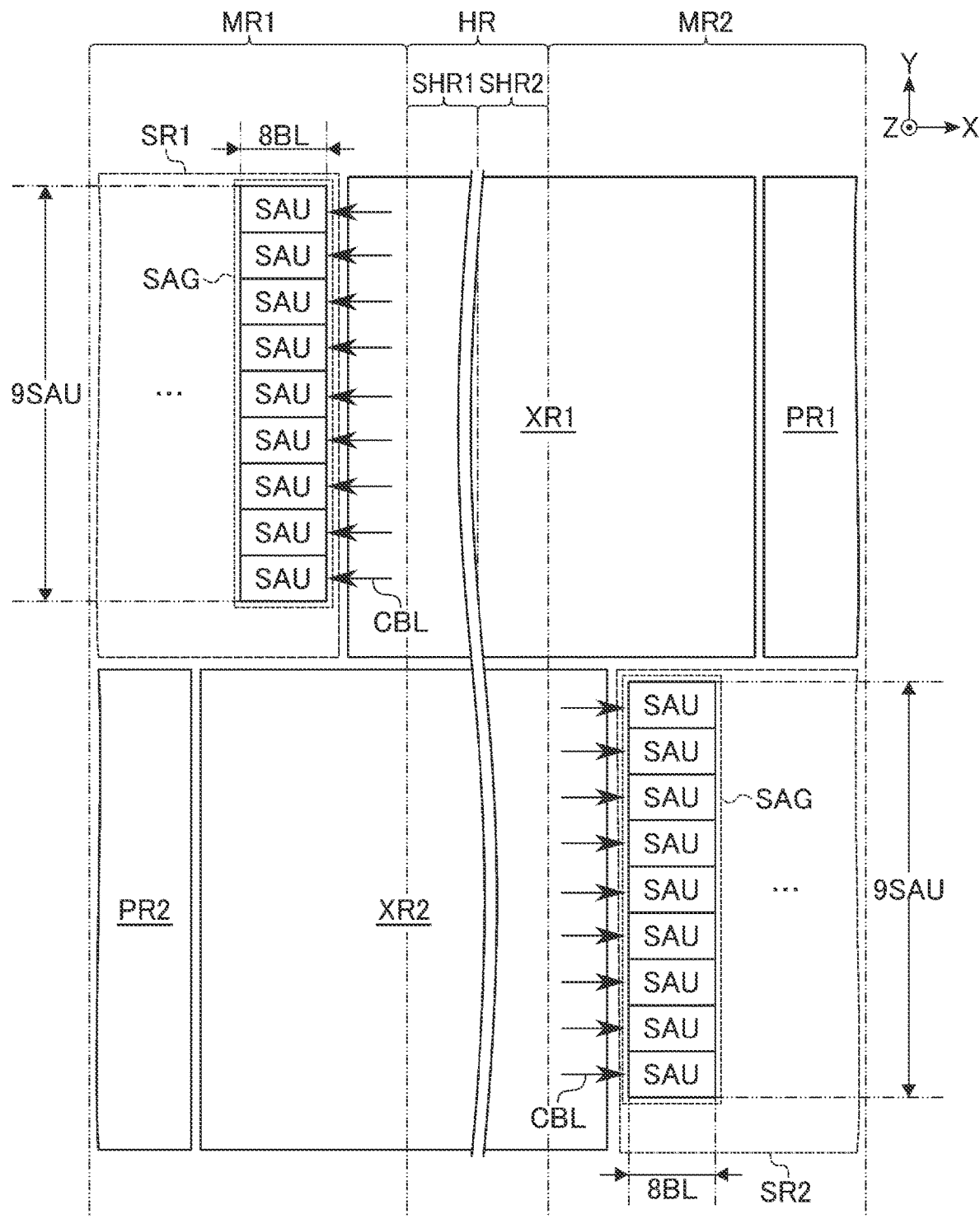
FIG. 18 is a plan view showing an example of a layout of a sense amplifier module included in the memory device according to the first embodiment.

FIG. 18 is a plan view showing an example of a layout of the sense amplifier module 18 included in the memory device 1 according to the first embodiment. As shown in FIG. 18, in each of the sense amplifier regions SR1 and SR2, a set of nine sense amplifier units SAU is arranged in the Y direction. A plurality of the set of nine sense amplifier units are arranged in the X direction. In the descriptions below, the set of sense amplifier units SAU arranged in the Y direction in the sense amplifier region SR will be referred to as a "sense amplifier group SAG."

The X-direction length of the region where each sense amplifier group SAG is formed is designed such that it is approximately equal to the length of the region including e.g., eight bit lines BL (which length is indicated as "8BL" in FIG. 18). In the sense amplifier region SR1, the Y-direction length of the region where each sense amplifier group SAG is formed (which length is indicated as "9SAU" in FIG. 18) is less than the Y-direction length of the transfer region XR1. In the sense amplifier region SR2, the Y-direction length of the region where each sense amplifier group SAG is formed is less than the Y-direction length of the transfer region XR2.

The sense amplifier group SAG closest to the transfer region XR1 in the sense amplifier region SR1 is coupled to bit lines BL formed in a region overlapping the transfer region XR1 in the Z direction, via crossed bit lines CBL extending in the X direction. The sense amplifier group SAG closest to the transfer region XR2 in the sense amplifier region SR2 is coupled to bit lines BL formed in a region overlapping the transfer region XR2 in the Z direction, via crossed bit lines CBL extending in the X direction.

The number of sense amplifier units SAU included in each sense amplifier group SAG can be changed to any number. In the memory device 1, it suffices that the Y-direction length of the sense amplifier group SAG is designed to be less than the Y-direction length of each transfer region XR. In addition, it suffices that the X-direction length of the region where each sense amplifier group SAG is formed is designed to be less than the X-direction length of bit lines BL which are arranged in the X direction and which are smaller in number than the sense amplifier units SAU included in the sense amplifier group SAG.

In other words, the number of sense amplifier units SAU included in one sense amplifier group SAG is designed based on the pitch of bit lines BL. In the memory device 1, the number of bit lines BL, which is used as a reference for the X-direction length of the sense amplifier unit SAU, is smaller than the number of bit lines BL coupled to one sense amplifier group SAG. That is, in the memory device 1, it suffices that the X-direction length of the sense amplifier unit SAU is designed based on the pitch of bit lines BL which are smaller in number than the sense amplifier units SAU included in the sense amplifier group SAG.

Figure 19:
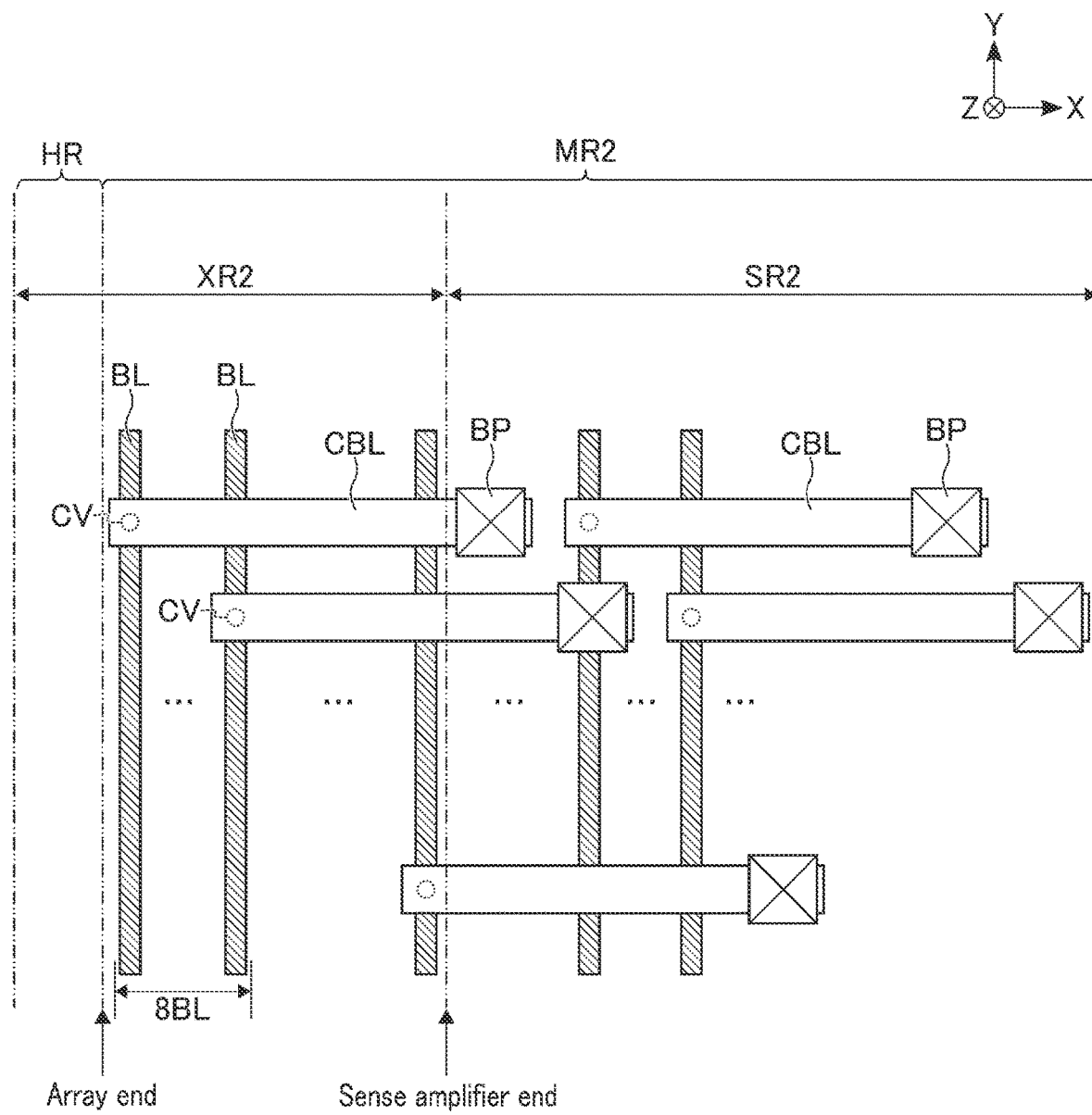
FIG. 19 is a plan view showing an example of how a bonding pad used for coupling a bit line and a sense amplifier module is arranged in the memory device according to the first embodiment.

FIG. 19 is a plan view showing an example of how a bonding pad BP used for coupling a bit line BL and a sense amplifier module 18 is arranged in the memory device 1 according to the first embodiment. In FIG. 19, the arrangement of part of the bit lines BL, the crossed bit lines CBL and the bonding pads BP, and the positional relationships among the hookup region HR, the memory region MR2, the sense amplifier region SR2 and the transfer region XR2 are not illustrated as appropriate. As shown in FIG. 19, a plurality of bit lines BL are arranged in the X direction. A predetermined number of crossed bit lines CBL are arranged in the Y direction. The predetermined number of crossed bit lines CBL arranged in the Y direction are shifted in the X direction. Each crossed bit line CBL is electrically coupled to the associated bit line BL via a contact CV, for example. A plurality of sets each consisting of a predetermined number of crossed bit lines CBL are arranged in the X direction.

The bit line BL arranged closest to the boundary (the "array end" indicated in FIG. 19) between the memory region MR2 and the hookup region HR is coupled to the associated bonding pad BP, via a crossed bit line CBL extending from at least the array end into the sense amplifier region SR2. To the bit lines BL overlapping the transfer region XR2, crossed bit lines CBL crossing at least the boundary between the transfer region XR2 and the sense amplifier region SR2 ("sense amplifier end" indicated in FIG. 19) are coupled. The arrangement of the plurality of crossed bit lines CBL associated with the memory region MR1 is similar to, for example, the arrangement of the plurality of crossed bit lines CBL associated with the memory region MR2, except that the arrangement is inverted with respect to the X direction.

The predetermined number of crossed bit lines CBL arranged in the Y direction is designed, for example, such that it is larger than the number of bit lines BL (in this example, "8BL") corresponding to the X-direction length of the region in which the sense amplifier group SAG is formed. The Y-direction pitch of the crossed bit lines CBL is designed, for example, by dividing (1) the Y-direction length of the region in which the sense amplifier group SAG is formed by (2) the number of crossed bit lines CBL included in the region in which the sense amplifier group SAG is formed. The calculation result of (1)/(2) becomes larger in accordance with a decrease in the CBL length, and becomes smaller in accordance with a increase in the CBL length.

<1-4> Advantages of First Embodiment

The memory device 1 of the first embodiment described above is advantageous in that the manufacturing cost of the memory device 1 can be suppressed. Details of the advantages of the first embodiment will be described below using comparative examples.

Broadly speaking, a memory device is divided into a memory cell array 10 and a CMOS circuit. In order to suppress the bit cost of the memory device, it is preferable to increase the ratio (cell occupancy) of the area corresponding to the memory cell array 10 to the chip area of the memory device. On the other hand, a memory device having a bonding structure is known. The bonding structure is a structure in which the substrate on which the memory cell array 10 is formed and the substrate on which the CMOS circuit is formed are separate and in which these substrates are bonded to each other. Since the bonding structure enables the memory cell array 10 and the CMOS circuit to overlap each other, the cell occupancy can be increased.

Thus, a memory device having a bonding structure and utilizing crossed bit lines CBL (CBL architecture) is considered. In the CBL architecture, crossed bit lines CBL orthogonal to the bit lines BL are used to couple the bit lines BL and the sense amplifier units SAU. Thus, the sense amplifier module 18 and part of the row decoder module 16 can be arranged in such a manner as to overlap the memory cell array 10. As a result, the CBL architecture enables the sense amplifier unit SAU and the row decoder RD to be efficiently arranged under the memory cell array 10 and the staircase structure.

On the other hand, in a memory device having a structure in which memory cells are stacked, the number of row decoders RD required increases in accordance with an increase in the number of stacked memory cells. There may be a case where the increase in the area of the transfer region XR accompanying the increase in the number of row decoders RD is larger than the increase in the area of the hookup region HR in which the staircase structure is formed. Furthermore, as the design rule reduction progresses, the height of the sense amplifier group SAG (the X-direction length of the region in which the sense amplifier group SAG is formed) tends to decrease (shorten). In other words, the increase in the number of stacked memory cells and the design rule reduction can be factors for reducing the wiring pitch of the crossed bit lines CBL.

Figure 20:
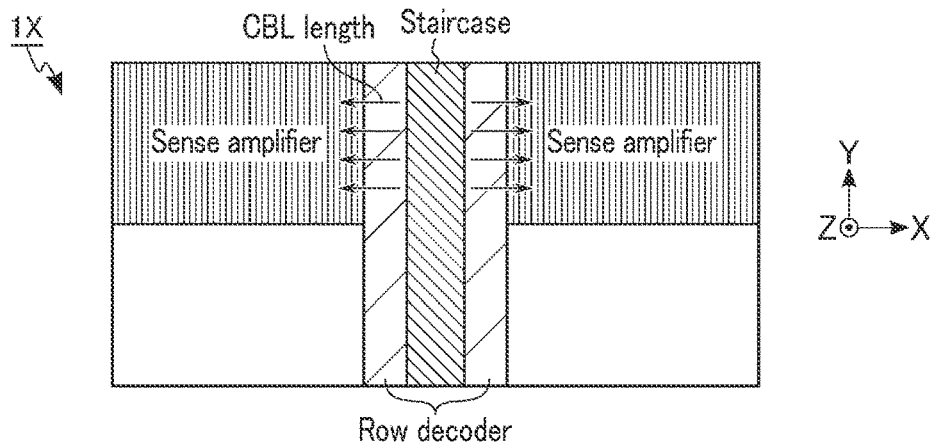
FIG. 20 is a schematic diagram showing an example of a circuit arrangement of a memory device according to a first comparative example.

FIG. 20 is a schematic diagram showing an example of a circuit arrangement of a memory device 1X according to a first comparative example. The memory device 1X has a configuration different from that of the memory device 1 only in terms of the circuit arrangement. As shown in FIG. 20, the memory device 1X is similar to the memory device 1 in that sense amplifiers divided into two in the X direction are arranged to sandwich a row decoder provided in a rectangular region. A staircase structure is provided on the row decoder with a minimum pitch. In this case, the area of the staircase structure is smaller than the area of the row decoder, resulting in an increased CBL length. In this case, the wiring pitch of crossed bit lines CBL has to be reduced. For reduction of the wiring pitch, high-cost semiconductor manufacturing processes are used, such as the use of liquid immersion exposure equipment and the use of multi-patterning technology. The manufacturing cost of the memory device 1X may increase, accordingly.

Figure 21:
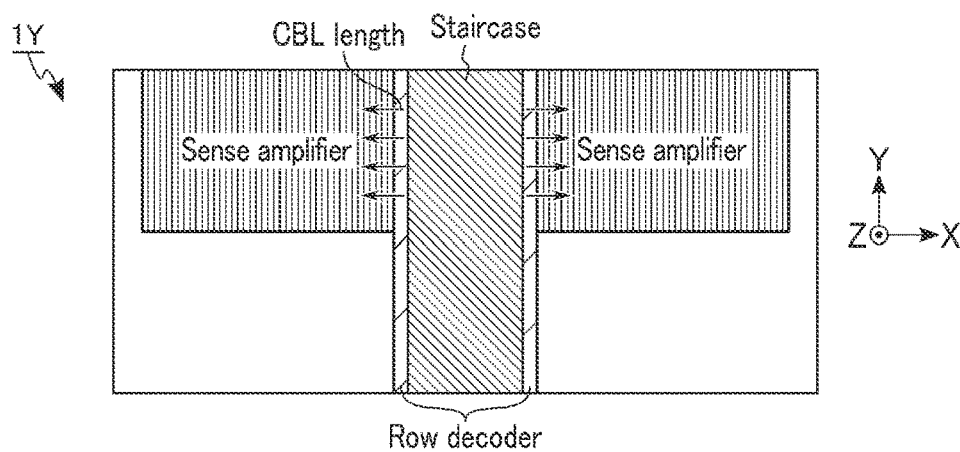
FIG. 21 is a schematic diagram showing an example of a circuit arrangement of a memory device according to a second comparative example.

FIG. 21 is a schematic diagram showing an example of a circuit arrangement of a memory device 1Y according to a second comparative example. The memory device 1Y corresponds to an example of a circuit layout in which the area of the staircase structure is increased in the memory device 1X. As shown in FIG. 21, it is conceivable to increase the area of the staircase in order to decrease the CBL length and to reduce the wiring pitch of the crossed bit lines CBL. However, if the area of the staircase is increased in the memory device 1Y, the chip area will increase and the manufacturing cost may increase.

Figure 22:
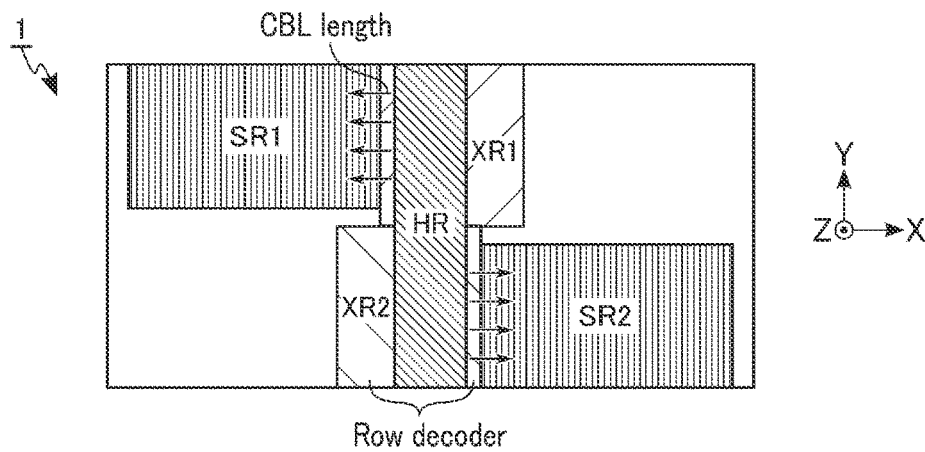
FIG. 22 is a schematic diagram showing an example of a circuit arrangement of the memory device according to the first embodiment.

On the other hand, the memory device 1 according to the first embodiment has a configuration in which a staircase structure is arranged in the X-direction center of one plane PL, and in which the sense amplifier module 18 divided into two and the row decoder module 16 are arranged point-symmetrically. FIG. 22 is a schematic diagram showing an example of a circuit arrangement of the memory device 1 according to the first embodiment. As shown in FIG. 22, in the memory device 1, the CBL length is reduced by shifting the boundary portion between the sense amplifier region SR1 and the transfer region XR1 and shifting the boundary portion between the sense amplifier region SR2 and the transfer region XR2.

As a result, in the memory device 1 according to the first embodiment, the CBL length can be designed to be short. That is, in the memory device 1, the wiring pitch of the crossed bit lines CBL can be relaxed. Furthermore, in the memory device 1, a staircase structure can be provided at a minimum pitch as in the first comparative example. That is, high-cost semiconductor manufacturing processes can be reduced in the manufacture of the memory device 1, and an increase in chip area can be suppressed. Therefore, the memory device 1 according to the first embodiment enables suppression of the manufacturing cost of the memory device 1.

<2> Second Embodiment

A memory device 1A according to the second embodiment has a configuration in which the structure of stacked memory cell arrays 10 is combined with the architecture described in connection with the first embodiment. Details of the second embodiment will be described below, focusing mainly on the differences from the first embodiment.

<2-1> Overall Configuration of Memory Device 1A

Figure 23:
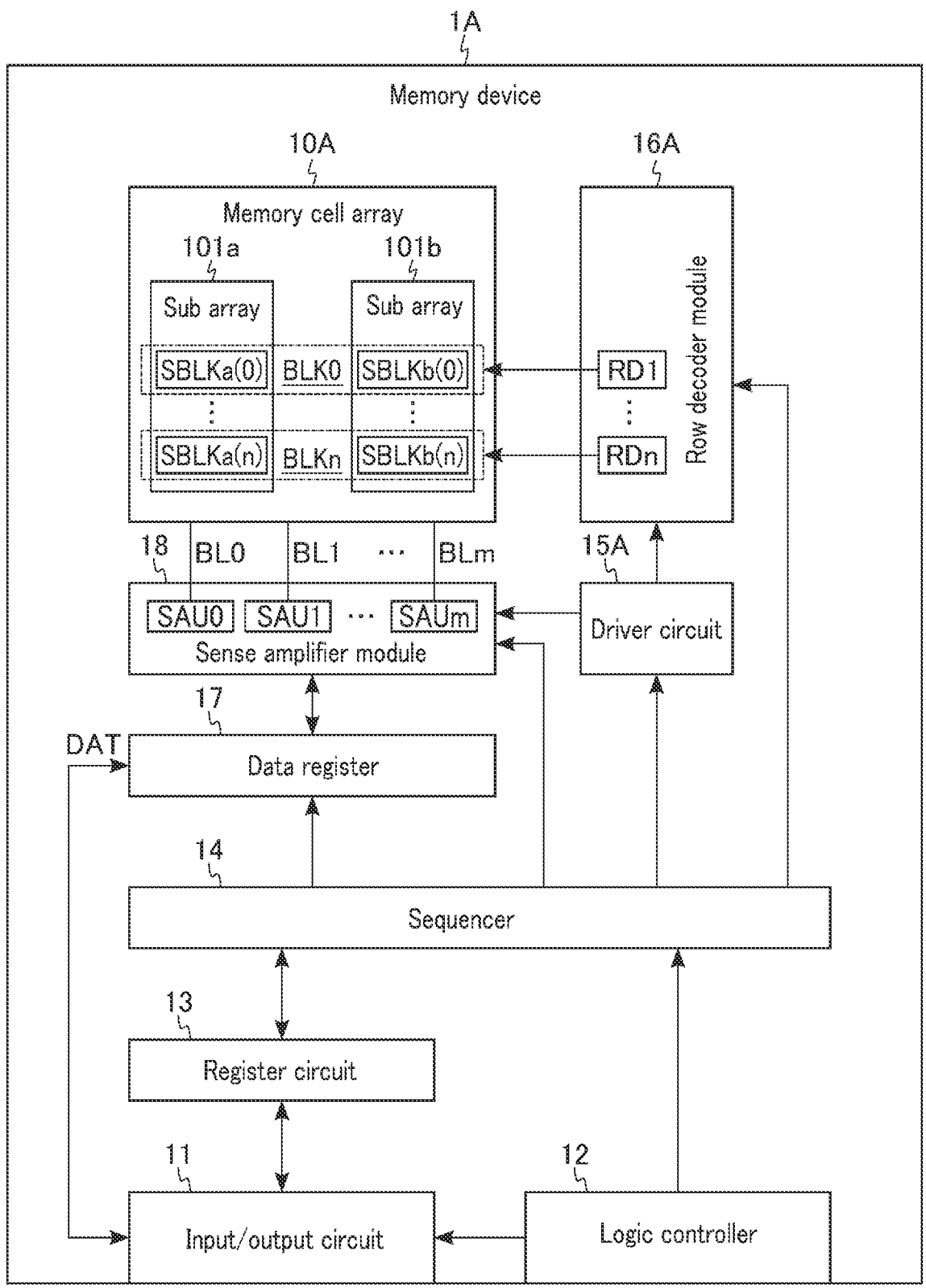
FIG. 23 is a block diagram showing an example of the overall configuration of a memory device according to a second embodiment.

FIG. 23 is a block diagram showing an example of the overall configuration of a memory device 1A according to the second embodiment. As shown in FIG. 23, the memory device 1A includes, for example, a memory cell array 10A, an input/output circuit 11, a logic controller 12, a register circuit 13, a sequencer 14, a driver circuit 15A, a row decoder module 16A, a data register 17, and a sense amplifier module 18. Details of the input/output circuit 11, logic controller 12, register circuit 13, sequencer 14, data register 17 and sense amplifier module 18 of the memory device 1A are similar to those of the first embodiment.

The memory cell array 10A includes sub arrays 101a and 101b. The sub arrays 101a and 101b are formed using different substrates. The sub array 101a includes a plurality of sub blocks SBLKa(0) to SBLKa(n) ("n" is an integer equal to or larger than 1). The sub array 101b includes a plurality of sub blocks SBLKb(0) to SBLKb(n). In the memory cell array 10A, a set consisting of the sub blocks SBLKa(k) and SBLKb(k) ("k" is an integer from 0 to n) constitutes one block BLKk. In other words, the memory cell array 10A includes a plurality of blocks BLK0 to BLKn each composed of a set consisting of one sub block SBLKa included in the sub array 101a and one sub block SBLKb included in the sub array 101b. It should be noted that the memory cell array 10A may include three or more sub arrays 101. In this case, a block BLK is composed of a set of sub blocks SBLK of each of the plurality of sub arrays 101.

Each of the driver circuit 15A and the row decoder module 16A is configured to match the circuit configuration of the memory cell array 10A. The driver circuit 15A generates voltages to be applied to various wirings provided in the sub array 101a and the sub array 101b. The row decoder module 16A includes a plurality of row decoders RD0 to RDn respectively associated with the blocks BLK0 to BLKn. The row decoder module 16A transfers voltages generated by the driver circuit 15A to various wirings provided in the sub array 101a and the sub array 101b.

<2-2> Circuit Configuration of Memory Device 1A

Next, a description will be given of the circuit configuration of the memory device 1A according to the second embodiment.

<2-2-1> Circuit Configuration of Memory Cell Array 10A

Figure 24:
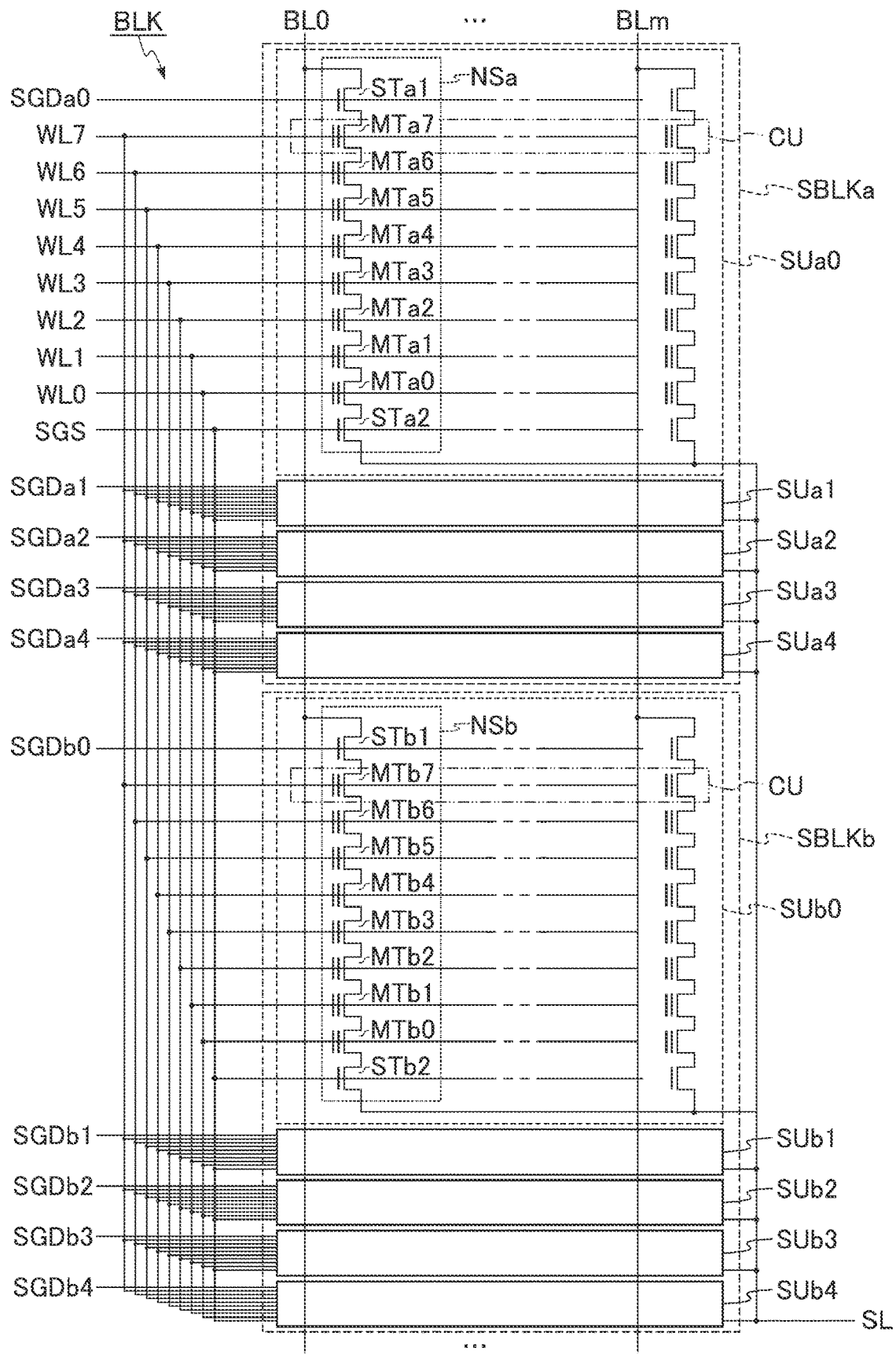
FIG. 24 is a circuit diagram showing an example of the circuit configuration of a memory cell array included in a memory device according to the second embodiment.

FIG. 24 is a circuit diagram showing an example of the circuit configuration of the memory cell array 10A included in the memory device 1A according to the second embodiment. FIG. 24 shows one block BLK that is among a plurality of blocks BLK included in the memory cell array 10A. As shown in FIG. 24, select gate lines SGDa0 to SGDa4, select gate lines SGDb0 to SGDb4, a select gate line SGS, word lines WL0 to WL7, bit lines BL0 to BLm and a source line SL are coupled to the block BLK of the second embodiment. The select gate lines SGDa0 to SGDa4, the select gate lines SGDb0 to SGDb4, the select gate line SGS, and the word lines WL0 to WL7 are provided for each block BLK. Each of the bit lines BL0 to BLm and the source line SL are shared by a plurality of blocks BLK.

The block BLK of the second embodiment includes, for example, five string units SUa0 to SUa4 included in the sub block SBLKa and five string units SUb0 to SUb4 included in the sub block SBLKb. Each string unit SUa includes a plurality of NAND strings NSa. Each string unit SUb includes a plurality of NAND strings NSb. The plurality of NAND strings NSa are associated with the bit lines BL0 to BLm, respectively. The plurality of NAND strings NSb are associated with the bit lines BL0 to BLm, respectively. Each of the NAND strings NSa and NSb is coupled between the associated bit line BL and the source line SL.

Each NAND string NSa includes, for example, memory cell transistors MTa0 to MTa7 and select transistors STa1 and STa2. Each of the select transistors STa1 and STa2 is used to select the string unit SUa. In each NAND string NSa, the select transistor STa1, the memory cell transistors MTa7 to MTa0, and the select transistor STa2 are coupled in series in this order from the bit line BL toward the source line SL. Each NAND string NSb includes, for example, memory cell transistors MTb0 to MTb7 and select transistors STb1 and STb2. Each of the select transistors STb1 and STb2 is used to select the string unit Sub. In each NAND string NSb, the select transistor STb1, the memory cell transistors MTb7 to MTb0, and the select transistor STb2 are coupled in series in this order from the bit line BL toward the source line SL.

The select gate lines SGDa0 to SGDa4 are associated with the string units SUa0 to SUa4, respectively. Each select gate line SGDa is coupled to respective gates of a plurality of select transistors STa1 included in the associated string unit SUa. The select gate lines SGDb0 to SGDb4 are associated with the string units Sub0 to Sub4, respectively. Each select gate line SGDb is coupled to respective gates of a plurality of select transistors STb1 included in the associated string unit SUb. The select gate line SGS is coupled to the gates of a plurality of select transistors STa2 and the gates of a plurality of select transistors STb2 included in the associated block BLK. The word line WL(K) ("K" is an integer from 0 to 7, for example) is coupled to the control gates of the plurality of memory cell transistors MTa(K) included in the associated block BLK and to the control gates of the plurality of memory cell transistors MTb(K).

As described above, in the memory cell array 10A, the word lines WL are shared by the combination of the blocks BLKa and BLKb. A select gate line SGD is provided for each string unit SU. The select gate line SGS may be shared within the block BLK, or may be provided for each string unit SU.

It should be noted that the memory cell array 10A may have other circuit configurations. For example, the numbers of string units SUa and SUb included in the block BLK, the numbers of memory cell transistors MTa and select transistors STa1 and STa2 included in the NAND string NSa, and the numbers of memory cell transistors MTb and select gate transistors STb1 and STb2 included in the NAND string NSb can be designed to be any number. Where the memory cell array 10A includes three or more sub arrays 101, for example, word lines WL are shared by a plurality of sub blocks SBLK within the same block BLK, and select gate lines SGD are so coupled as to be independently controllable.

<2-2-2> Circuit Configuration of Row Decoder Module 16A

Figure 25:
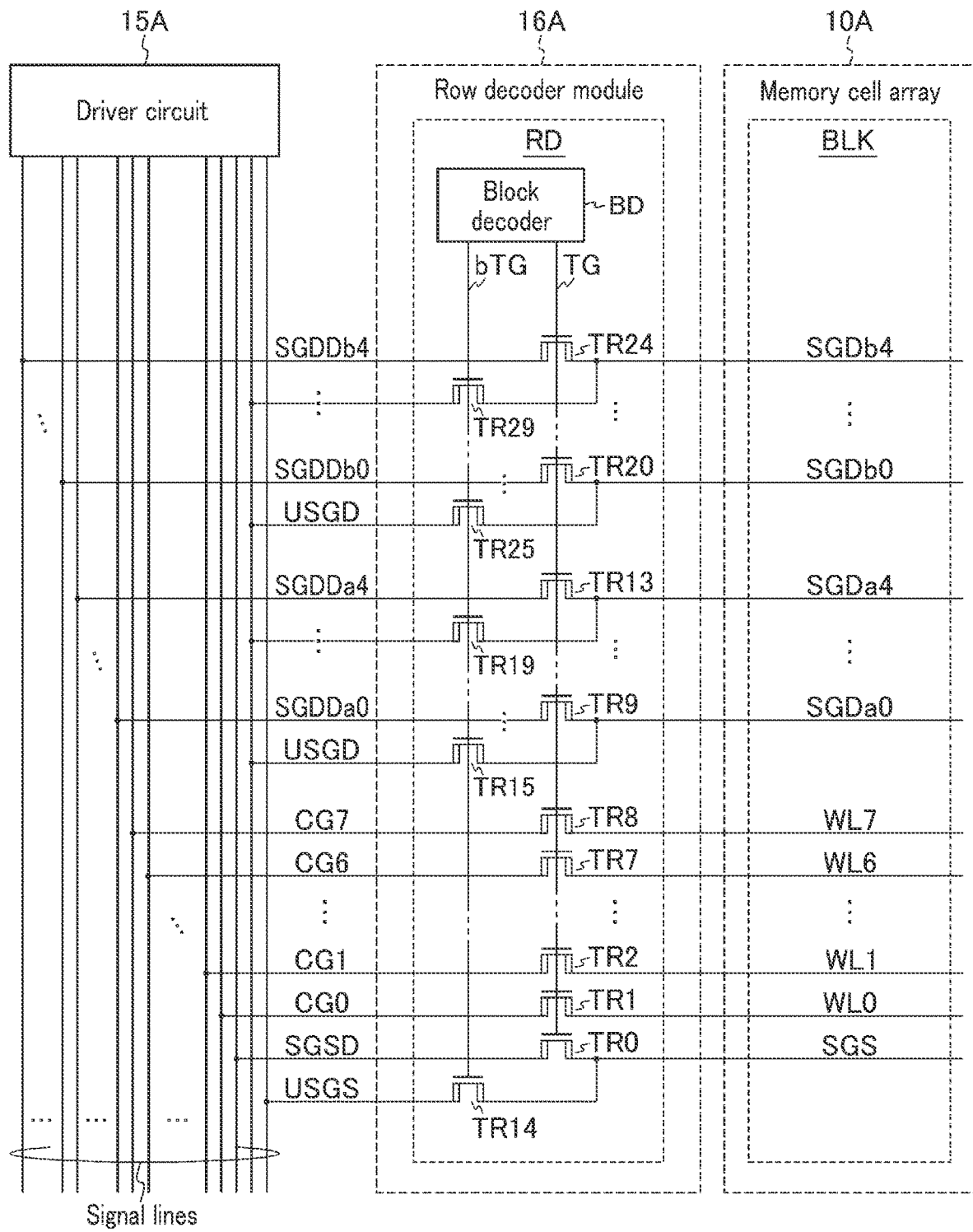
FIG. 25 is a circuit diagram showing an example of the circuit configuration of a row decoder module included in the memory device according to the second embodiment.

FIG. 25 is a circuit diagram showing an example of the circuit configuration of a row decoder module 16A included in the memory device 1A according to the second embodiment. FIG. 25 shows how the driver circuit 15A and the memory cell array 10A are coupled to the row decoder module 16A, and also shows a detailed circuit configuration of one row decoder RD. As shown in FIG. 25, the row decoder RD of the second embodiment is coupled to signal lines CG0 to CG7, SGDDa0 to SGDDa4, SGDDb0 to SGDDb4, SGSD, USGD, and USGS, which are coupled to the driver circuit 15A. In addition, the row decoder RD of the second embodiment is coupled to the word lines WL0 to WL7 of the associated block BLK of the memory cell array 10A, and to the select gate lines SGS, SGDa0 to SGDa4 and SGDb0 to SGDb4.

The row decoder RD of the second embodiment includes, for example, transistors TR0 to TR29, transfer gate lines TG and bTG and a block decoder BD. Details of the transistors TR0 to TR8 and TR14 and the block decoder BD are similar to those of the row decoder RD of the first embodiment.

Each of the transistors TR20 to TR29 is an n-type HV transistor. The drains of the transistors TR9 to TR13 and TR20 to TR24 are coupled to signal lines SGDDa0 to SGDDa4 and SGDDb0 to SGDDb4. The sources of the transistors TR9 to TR13 and TR20 to TR24 are coupled to the select gate lines SGDa0 to SGDa4 and SGDb0 to SGDb4 of the associated block BLK, respectively. The drains of the transistors TR15 to TR19 and TR25 to TR29 are coupled to the signal line USGD. The sources of the transistors TR15 to TR19 and TR25 to TR29 are coupled to the select gate lines SGDa0 to SGDa4 and SGDb0 to SGDb4 of the associated block BLK, respectively. The gates of the transistors TR9 to TR13 and TR20 to TR24 are coupled to the transfer gate line TG. The gates of the transistors TR15 to TR19 and TR25 to TR29 are coupled to the transfer gate line bTG.

It should be noted that the row decoder module 16A may have other circuit configurations. The number of transistors TR included in the row decoder module 16A can be changed in accordance with the number of wirings provided in each block BLK. Where the memory cell array 10A is provided with three or more sub arrays 101, the transistors TR are provided such that the select gate lines SGD in the block BLK are independently controllable.

<2-3> Structure of Memory Device 1A

Next, a description will be given of the structure of the memory device 1A according to the second embodiment.

<2-3-1> Appearance of Memory Device 1A

Figure 26:
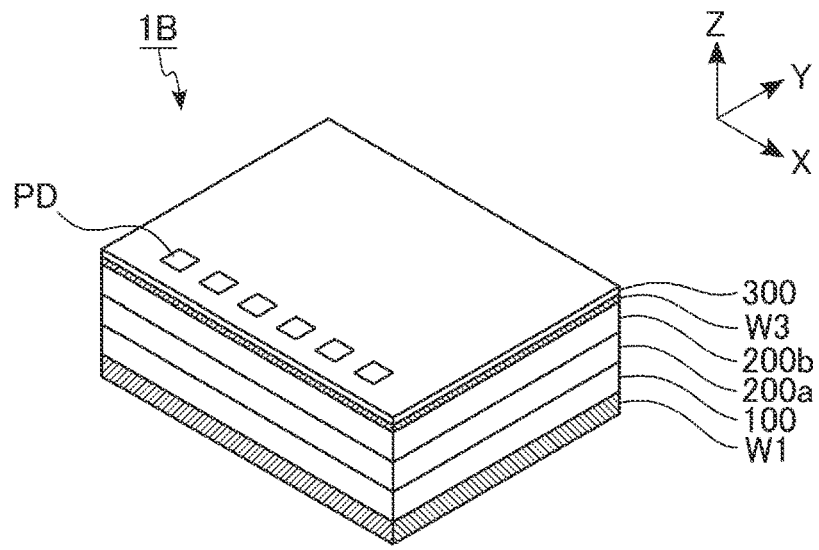
FIG. 26 is a perspective view showing an example of the appearance of the memory device according to the second embodiment.

FIG. 26 is a perspective view showing an example of the appearance of the memory device 1A according to the second embodiment. As shown in FIG. 26, the memory device 1A has a structure in which, for example, a first substrate W1, a CMOS layer 100, a memory layer 200a, a memory layer 200b, a third substrate W3, and a wiring layer 300 are stacked in this order from below.

The CMOS layer 100 of the second embodiment includes, for example, an input/output circuit 11, a logic controller 12, a register circuit 13, a sequencer 14, a driver circuit 15A, a row decoder module 16A, a data register 17, and a sense amplifier module 18. The memory layer 200a includes a sub array 101a formed using the second substrate W2. In this example, the second substrate W2 is removed after the first substrate W1 and the second substrate W2 are bonded. The memory layer 200b includes a sub array 101b formed using the third substrate W3.

The third substrate W3 is a silicon substrate. The memory device 1A has a bonding surface between the CMOS layer 100 and the memory layer 200a and between the memory layers 200a and 200b. In this example, the surface of the CMOS layer 100 on the first substrate W1 and the surface of the memory layer 200a on the second substrate W2 are bonded by the bonding process of the first substrate W1 and the second substrate W2. Alternatively, the first substrate W1 and the second substrate W2 are bonded, and the resultant substrate (bonded substrate) is bonded to the third substrate W3. By doing so, the surface of the memory layer 200a on the bonded substrate and the surface of the memory layer 200b on the third substrate W3 are bonded. It should be noted that the third substrate W3 may be removed after the bonded substrate and the third substrate W3 are bonded. In this case, the memory device 1A does not have the third substrate W3.

<2-3-2> Planar Layout of Bonding Surface

Figure 27:
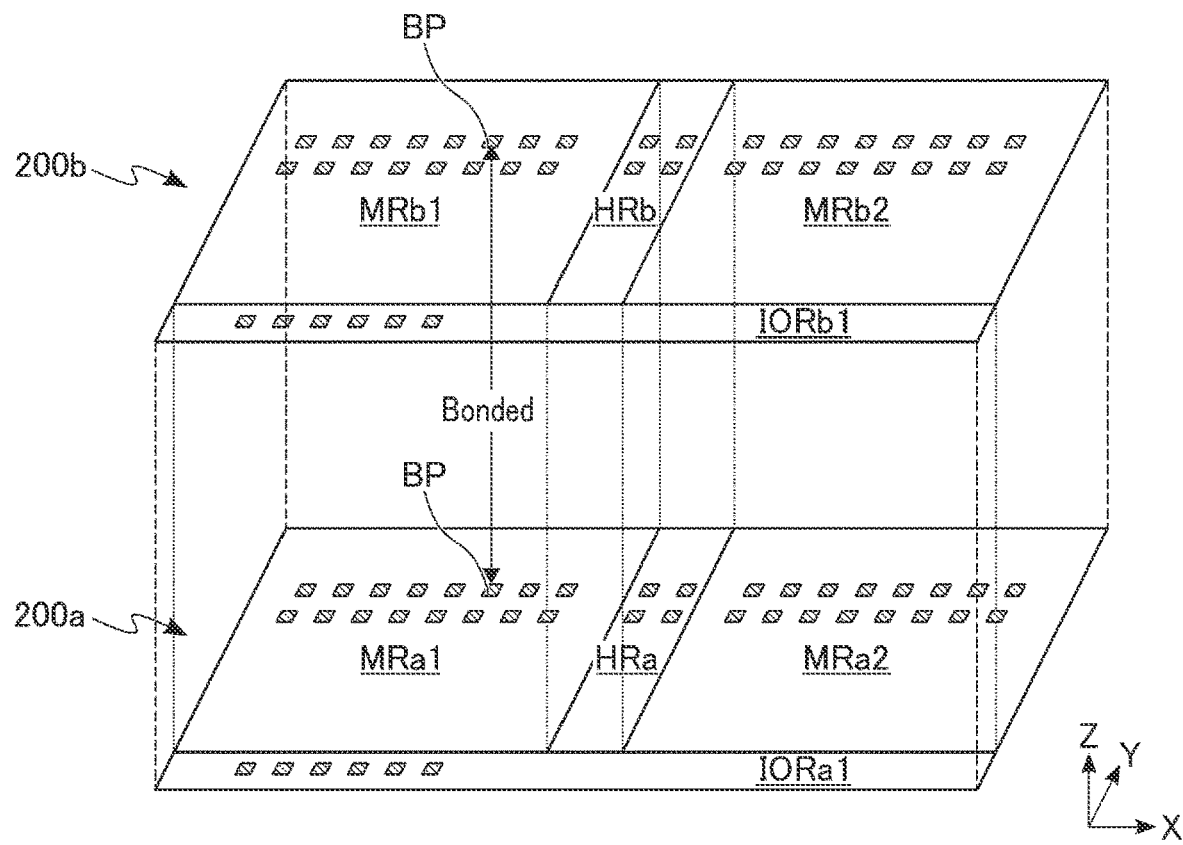
FIG. 27 is a schematic diagram showing an example of a planar layout of bonding surfaces included in the memory device according to the second embodiment.

FIG. 27 is a schematic diagram showing an example of a planar layout of the bonding surface provided in the memory device 1A according to the second embodiment. FIG. 27 shows a layout of the bonding surface between the memory layers 200a and 200b, and shows coordinate axes using the first substrate W1 as a reference. How the configuration of the bonding surface between the CMOS layer 100 and the memory layer 200a is in the memory device 1A is similar to how the configuration of the bonding surface between the CMOS layer 100 and the memory layer 200 is in the first embodiment. As shown in FIG. 27, the memory layer 200a includes, for example, memory regions MRa1 and MRa2, a hookup region HR and an input/output region IORa1. The memory layer 200b includes, for example, memory regions MRb1 and MRb2, a hookup region HR, and an input/output region IORb1.

Each of the memory regions MRa1, MRa2, MRb1 and MRb2 is used for storage of data and includes a plurality of NAND strings NS. The hookup region HRa is a region used for coupling between the stacked wirings provided in the memory regions MRa1 and MRa2 and the transistors provided in the transfer regions XR1 and XR2. The hookup region HRb is a region used for coupling between the stacked wirings provided in the memory regions MRb1 and MRb2 and the wirings provided in the hookup region HRa. Each of the input/output regions IORa1 and IORb1 includes circuits related to the input/output circuit 11, etc.

How the memory regions MRa1 and MRa2, the hookup region HRa, and the input/output region IORa1 are arranged in the memory layer 200a is similar to how the memory regions MR1 and MR2, the hookup region HR, and the input/output region IOR1 are arranged in the memory layer 200 of the first embodiment. How the memory regions MRb1 and MRb2, the hookup region HRb and the input/output region IORb1 are arranged in the memory layer 200b is similar to how the memory regions MR1 and MR2, the hookup region HR, and the input/output region IOR1 are arranged in the memory layer 200 of the first embodiment. The memory regions MRa1 and MRa2 respectively overlap the memory regions MRb1 and MRb2 in the Z direction. The hookup region HRa overlaps the hookup region HRb in the Z direction. The input/output region IORa1 overlaps the input/output region IORb1 in the Z direction.

The memory layer 200a includes a plurality of bonding pads BP on its bonding surface with the memory layer 200b. Each of the memory regions MRa1 and MRa2, the hookup region HRa and the input/output region IORa1 includes at least one bonding pad BP. The bonding pads BP of the memory regions MRa1 and MRa2 are coupled to bit lines BL, for example. The bonding pads BP of the hookup region HRa are coupled to, for example, the stacked wirings (e.g., word lines WL) provided in the memory regions MRa1 and MRa2. The bonding pads BP of the input/output region IORa1 are electrically coupled to the transistors of the input/output circuit 11 via the CMOS layer 100, for example.

The memory layer 200b includes a plurality of bonding pads BP on its bonding surface with the memory layer 200a. Each of the memory regions MRb1 and MRb2, the hookup region HRb, and the input/output region IORb1 includes at least one bonding pad BP. The bonding pads BP of the memory regions MRb1 and MRb2 are coupled to bit lines BL, for example. The bonding pads BP of the hookup region HRb are coupled to, for example, the stacked wirings (e.g., word lines WL) provided in the memory regions MRb1 and MRb2. The bonding pads BP of the input/output region IORb1 are electrically coupled to pads PD via the wiring layer 300, for example.

On the bonding surfaces of the memory layers 200a and 200b, the plurality of bonding pads BP provided on the memory layer 200a are arranged opposite to the plurality of bonding pads BP provided on the memory layer 200b. In the memory device 1A, a pair consisting of two bonding pads BP arranged opposite to each other are bonded ("bonded" indicated in FIG. 27). Thus, the two bonding pads BP arranged opposite to each other are electrically coupled, and the circuits between the memory layers 200a and 200b are electrically coupled thereby.

<2-3-3> Cross-Sectional Structure of Memory Device 1A

Next, a description will be given of the cross-sectional structure of the memory device 1A according to the second embodiment.

In the memory device 1A, the cross-sectional structure of the CMOS layer 100 is similar to that of the first embodiment. Each of the memory layers 200a and 200b has, for example, a configuration similar to that of the memory layer 200 of the first embodiment. In the descriptions below, with respect to components similar to those of the memory layer 200, "a" is added to the end of the reference numerals where they are components of the memory layer 200a, and "b" is added to the end of the reference numerals where they are components of the memory layer 200b.

(Cross Section Along Extending Direction of Word Line WL)

Figure 28:
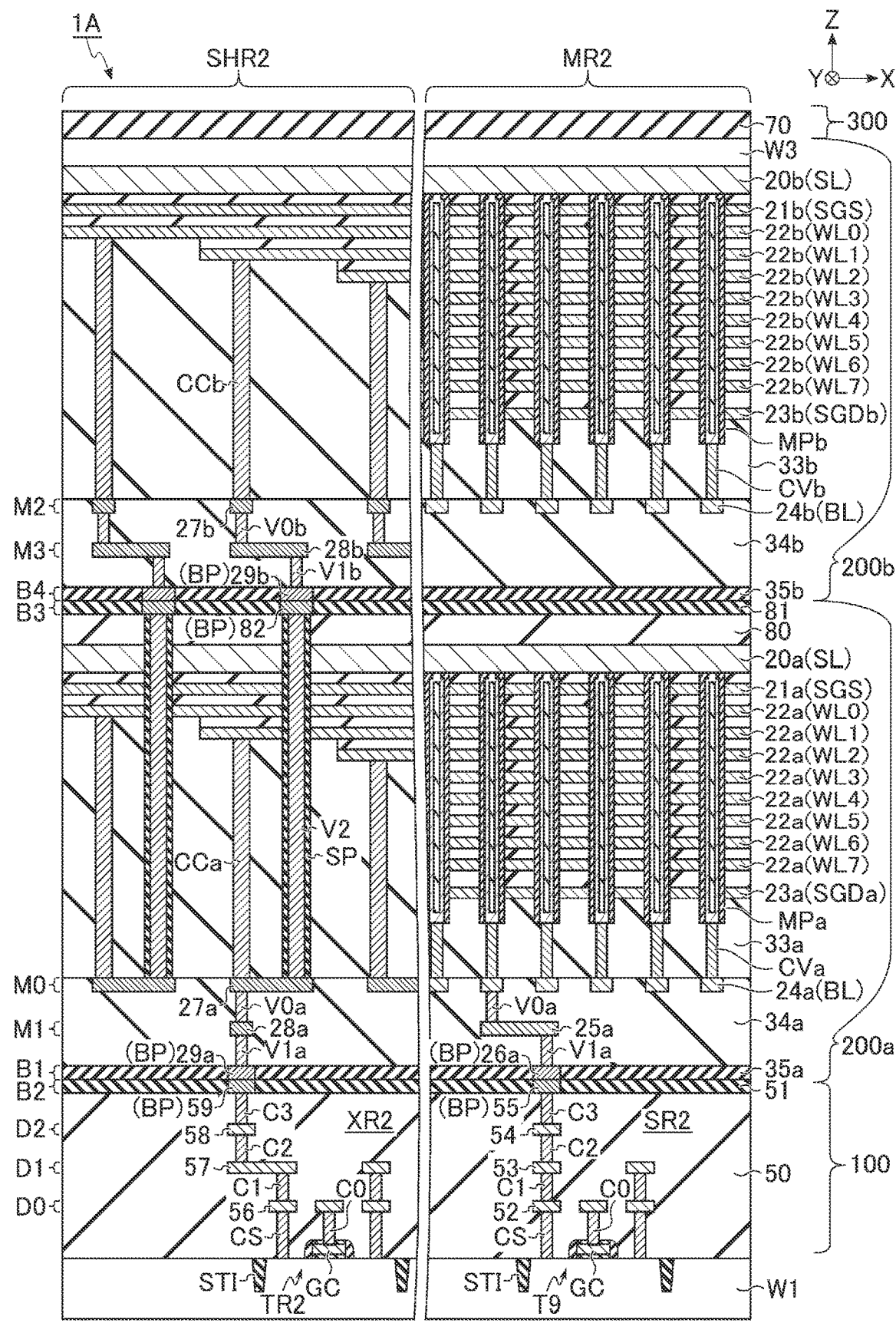
FIG. 28 is a cross-sectional view taken along the extending direction of word lines and showing an example of the cross-sectional structure of the memory device according to the second embodiment.

FIG. 28 is a cross-sectional view taken along the extending direction (X direction) of the word lines WL and shows an example of the cross-sectional structure of the memory device 1A according to the second embodiment. FIG. 28 shows a cross section including the memory region MR2 and sub hookup region SHR2 of the memory device 1A, and shows coordinate axes using the first substrate W1 as a reference. As shown in FIG. 28, the memory layer 200a differs from the memory layer 200 of the first embodiment, for example, in that the second substrate W2 is omitted and insulating layers 80 and 81, a conductive layer 82 and a contact V2 are added. The memory layer 200b differs from the memory layer 200 of the first embodiment, for example, in that the second substrate W2 is replaced with a third substrate W3. An insulating layer 70 (wiring layer 300) is provided on the third substrate W3, similarly to the memory layer 200 of the first embodiment.

In the memory layer 200a, the conductive layer 24a (bit line BL) is coupled to the sense amplifier unit SA (transistor T9) provided on the first substrate W1, via conductive layers 25a, 26a, 52 to 55 and contacts V0a, V1a, C1 to C3 and CS, as in the memory layer 200 of the first embodiment. Similarly, the conductive layer 22a (e.g., word line WL1) is coupled to the row decoder RD (e.g., transistor TR2) on the first substrate W1, via conductive layers 27a to 29a and 56 to 59 and contacts V0a, V1a, C1 to C3 and CS, etc. Like the conductive layer 22a, the conductive layers 21a and 23a are also coupled to the row decoder RD on the first substrate W1.

In the memory layer 200a, the insulating layer 80 is provided on the conductive layer 20a. The insulating layer 81 is provided on the insulating layer 80. The insulating layer 81 is in contact with the bonding surfaces of the memory layers 200a and 200b. In the descriptions below, the layer having the height where the insulating layer 81 is provided will be referred to as a "bonding layer B3." The conductive layer 82 is included in the bonding layer B3 and corresponds to the bonding pad BP. The number of conductive layers 82 included in the bonding layer B3 corresponds, at least, to the number of contacts CC included in the memory layer 200a. The contact V2 is included in the sub hookup region SHR2. The contact V2 is provided through the terrace portions of the stacked wirings of the memory layer 200a and couples the associated conductive layer 27a and conductive layer 82 to each other. A side surface of the contact V2 is covered with a spacer SP. This spacer SP insulates the contact V2 from the stacked wirings of the memory layer 200a.

In the memory layer 200b, the insulating layer 35b is in contact with the bonding surfaces of the memory layers 200a and 200b. In the descriptions below, the layer having the height where the insulating layer 35b is provided will be referred to as a "bonding layer B3." In the memory layer 200b, layers corresponding to the wiring layers M0 and M1 of the memory layer 200 of the first embodiment will be referred to as wiring layers M2 and M3, respectively. Each conductive layer 29b is arranged opposite to the conductive layer 82 of the memory layer 200a and is bonded thereto. Thus, the conductive layer 22b (e.g., the word line WL1) is electrically coupled to the associated conductive layer 82 in the memory layer 200a, via the conductive layers 27b to 29b and the contacts V0b and V1b. As a result, the conductive layers 22a and 22b associated with the same word line WL1 are electrically coupled via the contact V2. Like the conductive layer 22b, the conductive layers 21b and 23b are electrically coupled to the associated conductive layers 21a and 23a, respectively, through the contact V2.

(Cross Section Along Extending Direction of Bit Line BL)

Figure 29:
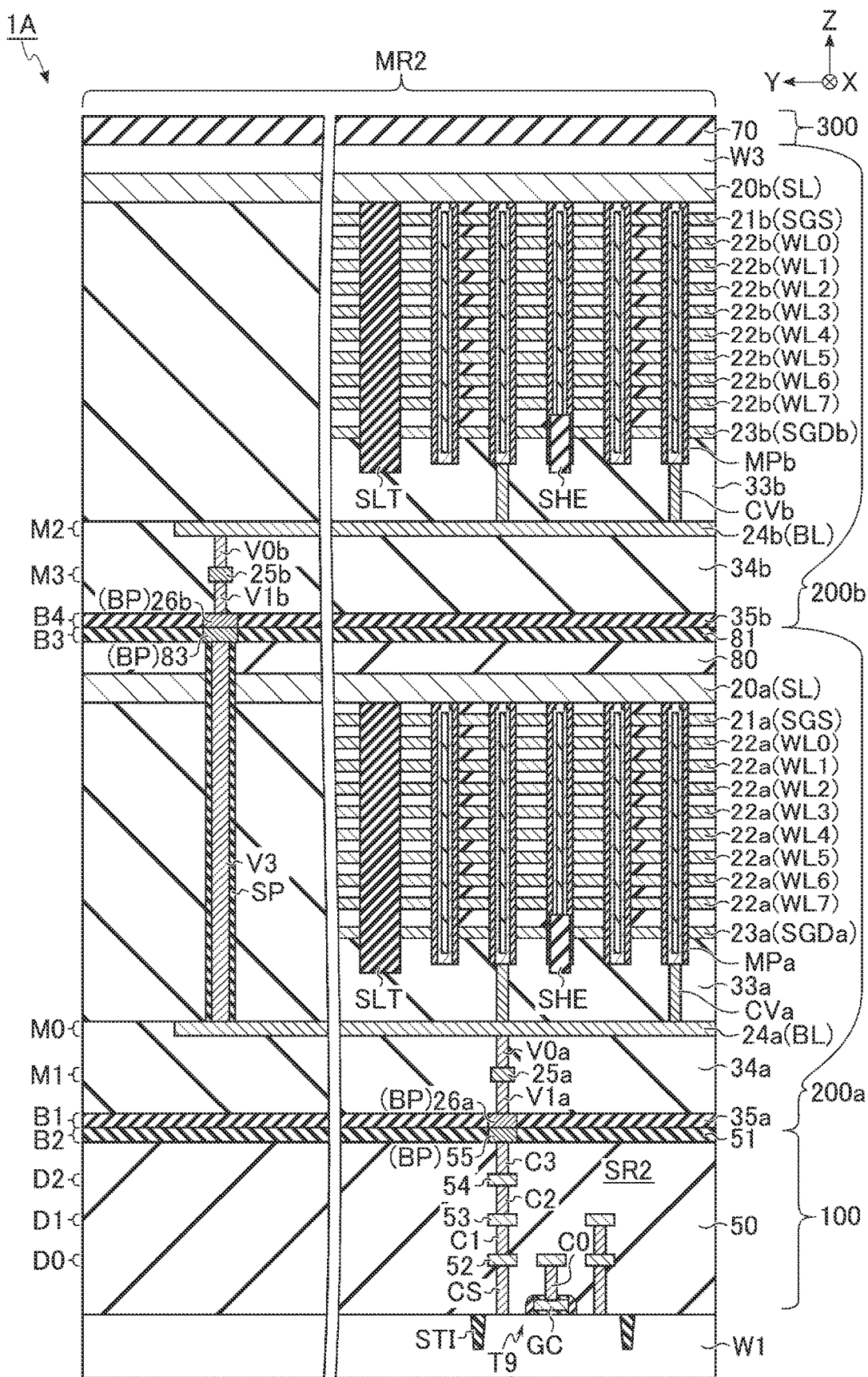
FIG. 29 is a cross-sectional view taken along the extending direction of bit lines and showing an example of the cross-sectional structure of the memory device according to the second embodiment.

FIG. 29 is a cross-sectional view taken along the extending direction (Y direction) of the bit line BL, and shows an example of the cross-sectional structure of the memory device according to the second embodiment. FIG. 29 shows a cross section including the memory region MR2 of the memory device 1A, and shows coordinate axes using the first substrate W1 as a reference. As shown in FIG. 29, the memory layer 200a further includes, for example, a conductive layer 83 and a contact V3.

The conductive layer 83 is included in the bonding layer B3 and corresponds to the bonding pad BP. The number of conductive layers 83 included in the bonding layer B3 corresponds at least to the number of bit lines BL included in the memory layer 200a. The contact V3 is included in the memory region MR2. The contact V3 is provided through the insulating layer 33a and couples the associated conductive layer 24a and the conductive layer 83 to each other. A spacer SP is provided to cover the side surface of the contact V3. The contact V3 may be provided through the stacked wirings of the memory layer 200a. The contact V3 is formed together with a contact V2, for example.

Each conductive layer 26b is arranged opposite to the conductive layer 83 of the memory layer 200a and is bonded thereto. Thus, the conductive layer 24b (bit line BL) is electrically coupled to the associated conductive layer 24a in the memory layer 200a, via the conductive layers 25b and 26b and the contacts V0b and V1b. As a result, the conductive layers 24a and 24b associated with the same bit line BL are electrically coupled via the contact V3.

<2-3-4> Detailed Layout of Bonding Pad BP

FIG. 30 is a plan view showing an example of how bonding pads BP used for coupling between the stacked wirings and the row decoder module 16A are arranged in the memory device 1A according to the second embodiment. FIG. 30 shows how the contacts CC and V2, the conductive layer 28a and the bonding pads BP of the bonding layer B1 are arranged in the region where the blocks BLK0 to BLK3 and the hookup region HR overlap. As shown in FIG. 30, how the contacts CC and bonding pads BP are arranged in the hookup region HR of the second embodiment is similar to how they are arranged in the row decoder module 16 of the first embodiment. In the hookup region HR of the second embodiment, the contacts V2 are arranged in the block BLK adjacent to the block BLK to which associated contacts CC are coupled.

Specifically, each contact CC coupled to the block BLK0 in the sub hookup region SHR1 is coupled to the contact V2 arranged in a region where the sub hookup region SHR1 overlaps a block BLK1. Each contact CC coupled to the block BLK1 in the sub hookup region SHR2 is coupled to a contact V2 arranged in a region where the sub hookup region SHR2 overlaps a block BLK0. Each contact CC coupled to the block BLK2 in the sub hookup region SHR2 is coupled to a contact V2 arranged in a region where the sub hookup region SHR2 overlaps a block BLK3. Each contact CC coupled to the block BLK3 in the sub hookup region SHR1 is coupled to a contact V2 arranged in a region where the sub hookup region SHR1 overlaps the block BLK2.

In the structure of the memory device 1A described above, the contact V2 may be coupled to the bonding pad BP of the bonding layer B3 via another wiring or contact. In the hookup region HR, the bonding pads BP on the bonding layer B1 may be arranged in a manner similar to that of the bonding pads BP on the bonding layer B3 or may be arranged in a different manner. Other configurations of the memory device 1A according to the second embodiment are similar to those of the memory device 1 according to the first embodiment.

<2-4> Advantages of Second Embodiment

The memory device 1A according to the second embodiment includes a plurality of memory layers 200a and 200b and can therefore have a larger storage capacity than the memory device 1 according to the first embodiment. Also, the memory device 1A according to the second embodiment enables suppression of the manufacturing cost of the memory device 1A, as in the first embodiment.

<3> Third Embodiment

A memory device 1B according to the third embodiment has a configuration in which the structure including a plurality of planes PL and the architecture described in connection with the first and second embodiments are combined. Details of the third embodiment will be described below, focusing mainly on the differences from the first and second embodiments.

<3-1> Overall Configuration of Memory Device 1B

FIG. 31 is a block diagram showing an example of the overall configuration of a memory device 1B according to the third embodiment. As shown in FIG. 31, the memory device 1B includes a plurality of planes PL and a sequencer 14A. FIG. 31 shows the case where the memory device 1B includes two planes PL1 and PL2. Each plane PL includes at least a memory cell array 10, a row decoder module 16 and a sense amplifier module 18. Each plane PL may share a driver circuit 15 or the like, or may have its own driver circuit individually. The sequencer 14A is configured such that a plurality of planes PL can be controlled independently. Other configurations of the memory device 1B according to the third embodiment are similar to those of the memory device 1 according to the first embodiment or to those of the memory device 1A according to the second embodiment.

<3-2> Planar Layout of Memory Device 1B

Examples of the planar layout of the memory device 1B will be described below, referring to how circuit arrangements can be in the case where the memory device 1B includes two planes PL (two-plane structure), four planes PL (four-plane structure), and six planes PL (six-plane structure).

(1: Two-Plane Structure)

Figure 32:
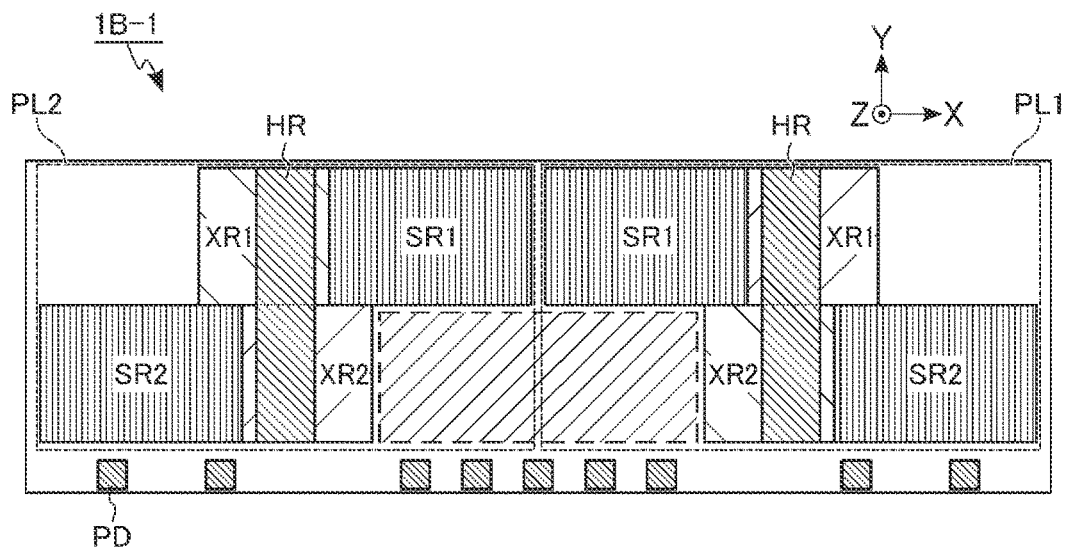
FIG. 32 is a plan view showing an example of a circuit layout of how a memory device having a two-plane structure is according to the third embodiment.

FIG. 32 is a plan view showing an example of a circuit arrangement of a memory device 1B-1 that has a two-plane structure according to the third embodiment. As shown in FIG. 32, the memory device 1B-1 includes two planes PL1 and PL2. The planes PL1 and PL2 are adjacent to each other in the X direction. The arrangement in which the sense amplifier regions SR1 and SR2 and the transfer regions XR1 and XR2 are arranged in the plane PL2 is similar to the arrangement in which the sense amplifier regions SR1 and SR2 and the transfer regions XR1 and XR2 are arranged in the plane PL1, except that the arrangement is inverted with respect to the X direction.

The sense amplifier region SR1 of the plane PL1 is adjacent to the sense amplifier region SR1 of the plane PL2 in the X direction. The sense amplifier region SR2 of the plane PL1 is away from the sense amplifier region SR2 of the plane PL2 in the X direction, with the hookup regions HR of the planes PL1 and PL2 being interposed. In the memory device 1B-1, for example, a region whose periphery is in contact with the sense amplifier regions SR1 and the transfer regions XR2 of the planes PL1 and PL2 can be shared by the planes PL1 and PL2.

(2: Four-Plane Structure)

Figure 33:
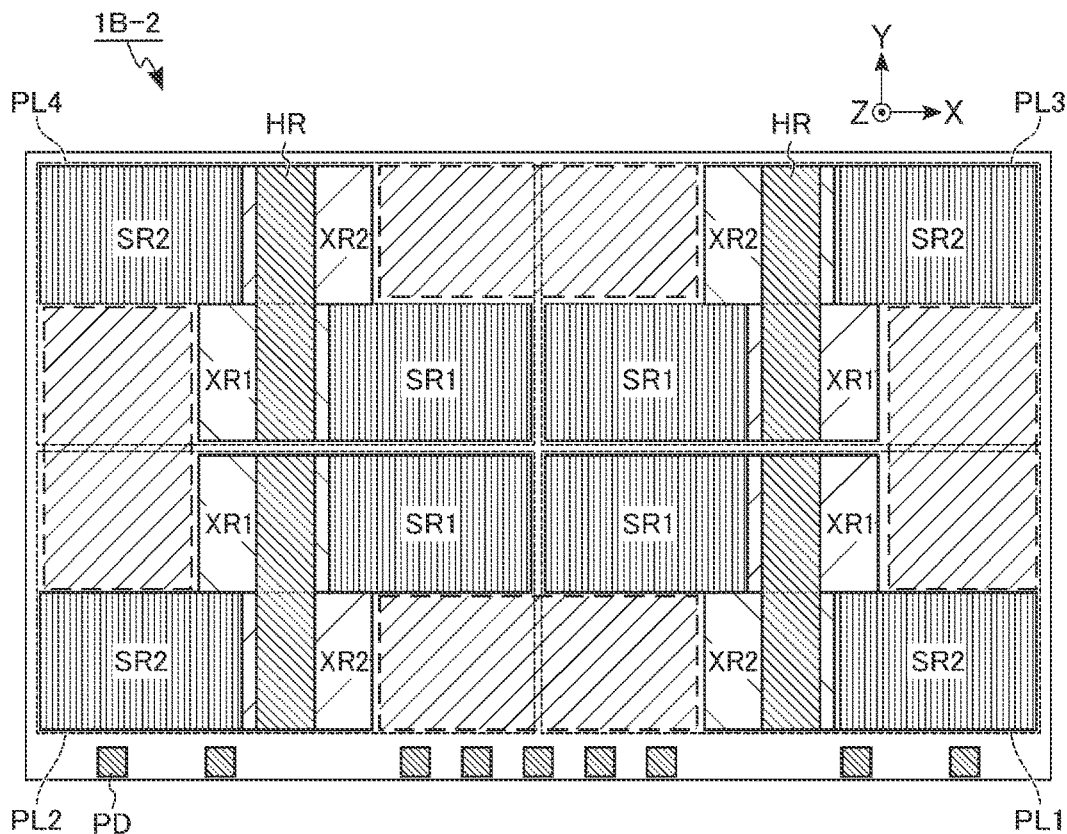
FIG. 33 is a plan view showing an example of a circuit layout of how a memory device having a four-plane structure is according to the third embodiment.

FIG. 33 is a plan view showing an example of a circuit arrangement of a memory device 1B-2 that has a four-plane structure according to the third embodiment. As shown in FIG. 33, the memory device 1B-2 includes four planes PL1-PL4. How the sense amplifier regions SR1 and SR2 and the transfer regions XR1 and XR2 are arranged in each of the planes PL1 and PL2 of the memory device 1B-2 is similar to how they are arranged in the memory device 1B-1 having two-plane structure. Planes PL3 and PL4 are adjacent to planes PL1 and PL2, respectively, in the Y direction. How the sense amplifier regions SR1 and SR2 and the transfer regions XR1 and XR2 are arranged in the plane PL3 is similar to how the sense amplifier regions SR1 and SR2 and the transfer regions XR1 and XR2 are arranged in the plane PL1, except that they are inverted with respect to the Y direction. How the sense amplifier regions SR1 and SR2 and the transfer regions XR1 and XR2 are arranged in the plane PL4 is similar to how the sense amplifier regions SR1 and SR2 and the transfer regions XR1 and XR2 are arranged in the plane PL2, except that they are inverted with respect to the Y direction.

The sense amplifier regions SR1 of the planes PL3 and PL4 are adjacent to each other in the X direction. The sense amplifier region SR1 and the transfer region XR1 of the plane PL3 are respectively adjacent to the sense amplifier region SR1 and the transfer region XR1 of the plane PL1 in the Y direction. The sense amplifier region SR1 and the transfer region XR1 of the plane PL4 are respectively adjacent to the sense amplifier region SR1 and the transfer region XR1 of the plane PL2 in the Y direction. In the memory device 1B-2, the sense amplifier region SR1 of each plane PL is arranged near the center of the memory device 1B-2. In the memory device 1B-2, for example, a region whose periphery is in contact with the sense amplifier regions SR2 and the transfer regions XR1 of the planes PL1 and PL3 can be shared by the planes PL1 and PL3. In the memory device 1B-2, for example, a region whose periphery is in contact with the sense amplifier regions SR2 and the transfer regions XR1 of the planes PL2 and PL4 can be shared by the planes PL1 and PL3. Other configurations of the memory device 1B-2 are similar to those of the memory device 1B-1.

(3: Six-Plane Structure)

Figure 34:
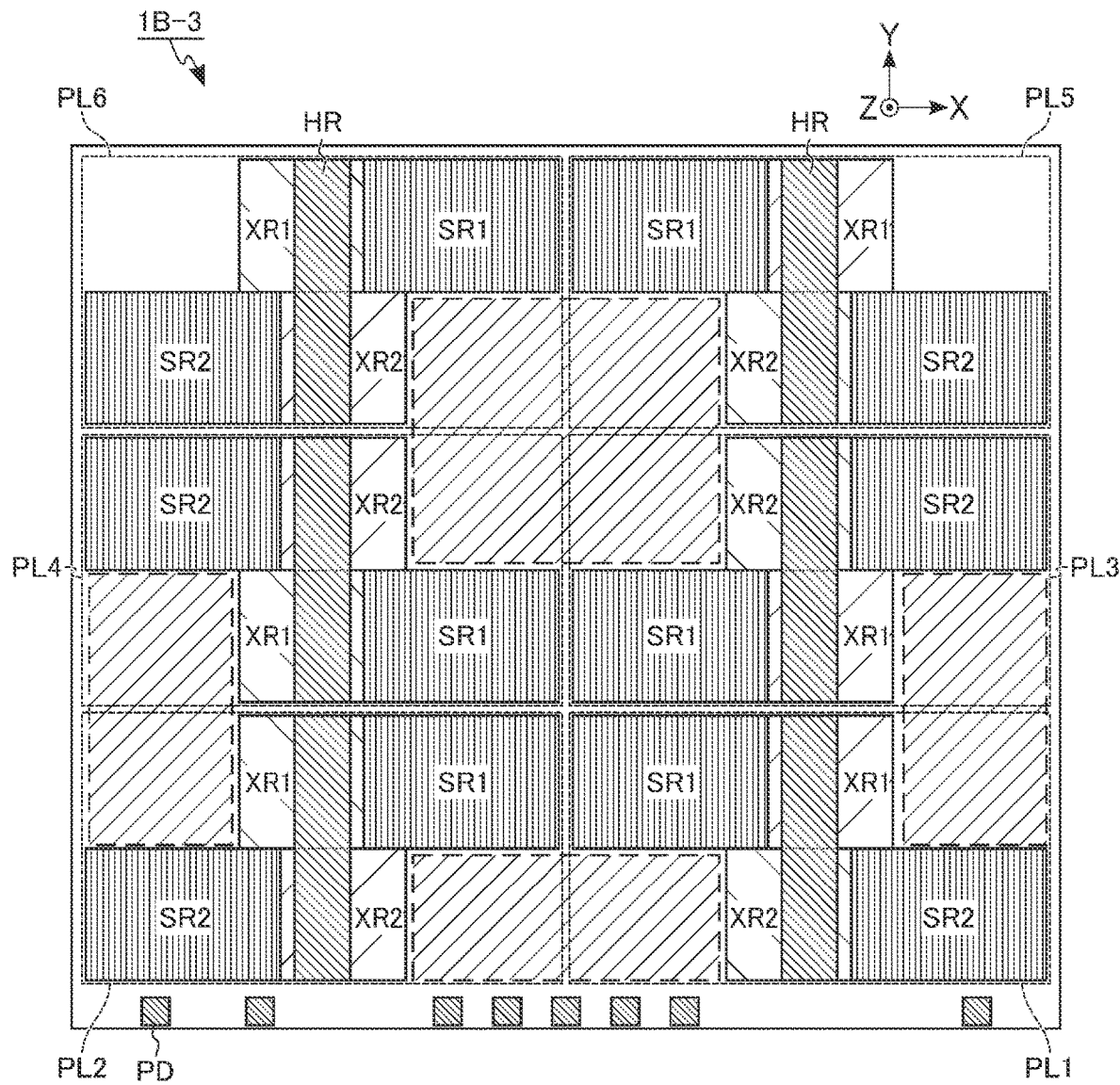
FIG. 34 is a plan view showing an example of a circuit layout of how a memory device having a six-plane structure is according to the third embodiment.

FIG. 34 is a plan view showing an example of a circuit arrangement of a memory device 1B-3 that has a six-plane structure according to the third embodiment. As shown in FIG. 34, the memory device 1B-3 includes six planes PL1 to PL6. How the sense amplifier regions SR1 and SR2 and the transfer regions XR1 and XR2 are arranged in each of the planes PL1 to PL4 of the memory device 1B-3 is similar to how they are arranged in the memory device 1B-2 having the four-plane structure. The planes PL5 and PL6 are respectively adjacent to planes PL3 and PL4 in the Y direction. How the sense amplifier regions SR1 and SR2 and the transfer regions XR1 and XR2 are arranged in the plane PL5 is similar to how the sense amplifier regions SR1 and SR2 and the transfer regions XR1 and XR2 are arranged in the plane PL1. How the sense amplifier regions SR1 and SR2 and the transfer regions XR1 and XR2 are arranged in the plane PL6 is similar to how the sense amplifier regions SR1 and SR2 and the transfer regions XR1 and XR2 are arranged in the plane PL2.

The sense amplifier regions SR1 of the planes PL5 and PL6 are adjacent to each other in the X direction. The sense amplifier region SR2 and the transfer region XR2 of the plane PL5 are respectively adjacent to the sense amplifier region SR2 and the transfer region XR2 of the plane PL3 in the Y direction. The sense amplifier region SR2 and the transfer region XR2 of the plane PL6 are respectively adjacent to the sense amplifier region SR2 and the transfer region XR2 of the plane PL4 in the Y direction. In the memory device 1B-3, an area whose periphery is in contact with the sense amplifier region SR1 and the transfer region XR2 of the planes PL3 to PL6 can be shared by the planes PL3 to PL6. Other configurations of the memory device 1B-3 are similar to those of the memory device 1B-2.

<3-3> Advantages of Third Embodiment

The memory device 1B according to the third embodiment is advantageous in that a plurality of planes PL can share CMOS circuits and well regions in accordance with how the plurality of planes PL are arranged. For example, in the memory device 1B, adjacent peripheral circuit regions PR in adjacent planes PL can share well regions used for forming HV transistors. As a result, the CMOS circuits can be arranged efficiently, and the area of the CMOS circuits can be reduced. Therefore, the memory device 1B according to the third embodiment can enjoy not only advantages similar to those of the first embodiment but also the advantage wherein the manufacturing cost of the memory device 1B including a plurality of planes PL can be suppressed.

<4> Modifications Etc.

Modifications etc. of the memory device 1 described in connection with the above embodiments will be described below.

In connection with the embodiments described above, an example was given in which contacts CC are coupled to the terrace portions formed in the hookup region HR, but this is not restrictive. Even if a hookup region HR is not provided with terrace portions, it suffices that the memory device 1 is designed to have a structure in which a set of wirings associated with certain contacts CC are electrically coupled to proper stacked windings without being short-circuited to irrelevant ones. In the descriptions below, the case where terrace portions are not formed in the first embodiment will be described as a first modification, and the case where terrace portions are not formed in the second embodiment will be described as a second modification.

Figure 35:
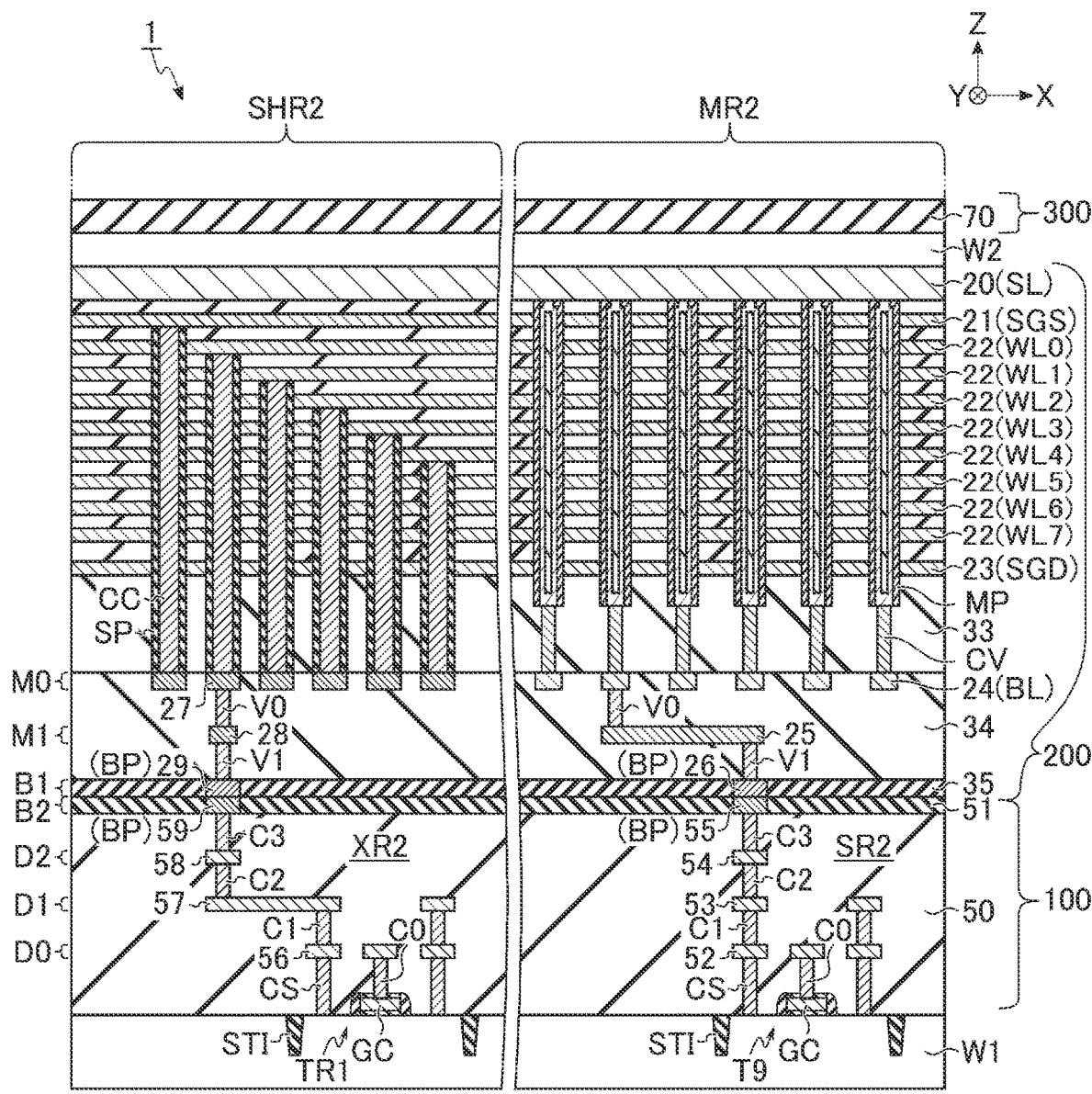
FIG. 35 is a cross-sectional view showing an example of the cross-sectional structure of the memory device according to a first modification.

FIG. 35 is a cross-sectional view showing an example of the cross-sectional structure of the memory device 1 according to the first modification. FIG. 35 shows a region similar to that shown in FIG. 14 described in connection with the first embodiment. As shown in FIG. 35, in the memory device 1 according to the first modification, each of the conductive layers 21 to 23 does not include a terrace portion. In this case, although illustration is omitted, each of the conductive layers 21 to 23 is provided as a plate extending from the memory region MR1 to the memory region MR2. Each contact CC in the first modification penetrates the conductive layer between the wiring layer M0 and the conductive layer to which it is coupled. A spacer SP is provided on the side surface of each contact CC in the first modification. Thus, each contact CC of the first modification can function in the same manner as the contact CC of the first embodiment.

Figure 36:
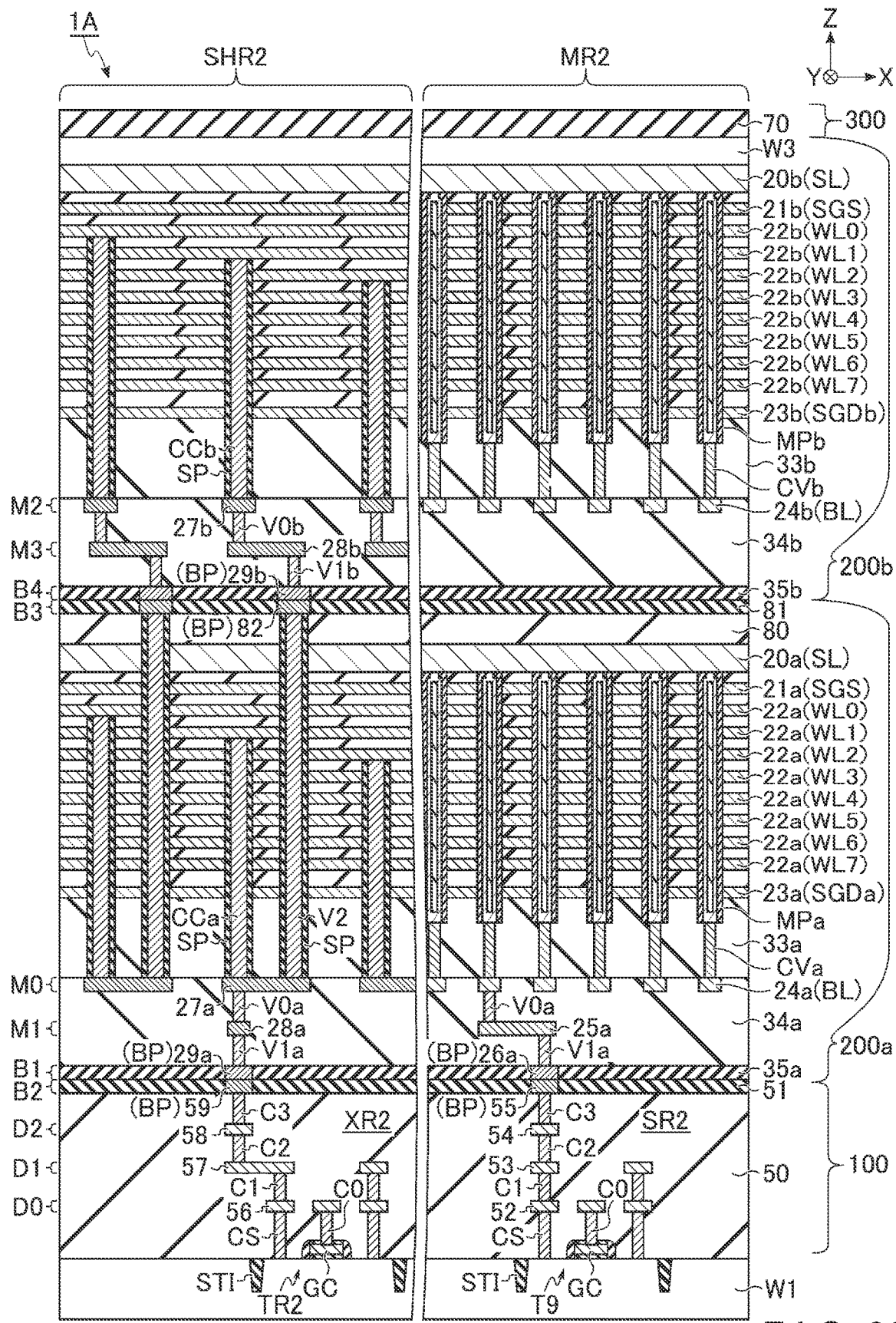
FIG. 36 is a cross-sectional view showing an example of the cross-sectional structure of a memory device according to a second modification.

FIG. 36 is a cross-sectional view showing an example of the cross-sectional structure of a memory device according to the second modification. FIG. 36 shows a region similar to that shown in FIG. 28 described in connection with the second embodiment. As shown in FIG. 36, in the memory device 1A according to the second modification, each of the conductive layers 21*a* to 23*a* and 21*b* to 23*b* does not include a terrace portion. In this case, although illustration is omitted, each of the conductive layers 21*a* to 23*a* and 21*b* to 23*b* is provided as a plate extending from the memory region MR1 to the memory region MR2. Each contact CC of the memory layer 200*a* of the second modification penetrates the conductive layer between the wiring layer M0 and the conductive layer to which it is coupled. A spacer SP is provided on the side surface of each contact CC of the memory layer 200*a* of the second modification. Similarly, each contact CC of the memory layer 200*b* of the second modification penetrates the conductive layer between the wiring layer M2 and the conductive layer to which it is coupled. A spacer SP is provided on the side surface of each contact CC of the memory layer 200*b* of the second modification. Thus, each contact CC of the second modification can function in the same manner as the contact CC in the second embodiment.

FIG. 37 is a cross-sectional view showing an example of a detailed cross-sectional structure of the bonding portion of bonding pads BP. FIG. 37 shows a conductive layer 55 (bonding pad BP) of the CMOS layer 100, a conductive layer 26 (bonding pad BP) of the memory layer 200, and some contacts and wirings coupled to these bonding pads BP. As shown in FIG. 37, two bonding pads BP arranged opposite to each other can have different tapered shapes, based on the etching directions at the time of formation. Specifically, the conductive layer 55 (bonding pad BP) formed using the first substrate W1 has, for example, a reverse tapered shape. The conductive layer 26 (bonding pad BP) formed using the second substrate W2 has, for example, a tapered shape. The bonding pad BP having a reverse tapered shape can be regarded as having a tapered shape where the first substrate W1 is regarded as a reference, because the bonding pads BP can be turned upside down when they are bonded in the bonding process. The shape of the two bonding pads BP that are opposed to each other at other portions can also be formed in the same manner as the conductive layers 55 and 26.

The pair of bonding pads BP opposed to each other may be shifted when they are bonded, depending on the alignment during the bonding process. Therefore, a step may be formed between the upper surface of the conductive layer 55 and the lower surface of the conductive layer 26. The pair of bonding pads BP opposed to each other may have a boundary therebetween or may be integrated as one piece. The bonding pad BP and the contact coupled to the bonding pad BP may be integrally formed as one piece. A plurality of contacts may be coupled to the bonding pad BP. For example, the conductive layer 55 (bonding pad BP) may be coupled to the conductive layer 54 via a plurality of contacts C3. Similarly, the conductive layer 26 (bonding pad BP) may be coupled to the conductive layer 25 via a plurality of contacts V1.

In the above embodiments, the circuit configuration, planar layout, and cross-sectional structure of the memory device 1 can be changed as appropriate. For example, the semiconductor layer 41 of the memory pillar MP and the source line SL may be coupled via the side surface of the memory pillar MP. The memory pillar MP may have a structure in which two or more pillars are coupled in the Z direction. The memory pillar MP may have a structure in which a pillar corresponding to the select gate line SGD and a pillar corresponding to the word line WL are coupled to each other. Each contact may be coupled using a plurality of contacts linked in the Z direction. A conductive layer may be inserted between the coupling portions of the plurality of contacts. The number of wiring layers and contacts included in the memory device 1 can be changed as appropriate.

The drawings referred to in connection with the above embodiments show a case where the memory pillars MP have the same diameter as viewed in the Z direction, but this is not restrictive. The memory pillars MP may have a tapered shape, a reverse tapered shape, or a bowing shape. Similarly, each of the slits SLT and SHE may have a tapered shape, a reverse tapered shape, or a bowing shape. Further, each contact may have a tapered shape, a reverse tapered shape, or a bowing shape. The cross-sectional structure of each of the memory pillars MP and the contacts V0 to V3, CC and C3 may be circular or elliptical.

In connection with the above embodiments, an example was given of the case where the memory layer 200 is provided above the CMOS layer 100, but the CMOS layer 100 may be provided above the memory layer 200. In this case, for example, a wiring layer 300 (pad PD) is provided on the CMOS layer 100.

In the present specification, the term "coupling" means that elements are electrically coupled, and does not exclude the case where another element is interposed in between. In addition, "electrically coupling" may use an insulator as long as the insulator does not interfere with the intended functionality achieved by the electrical coupling. The "tapered shape" indicates a shape whose thickness decreases as the distance from the reference substrate increases. The "reverse tapered shape" indicates a shape whose thickness increases as the distance from the reference substrate increases. The "columnar" indicates that the related structure is provided in a hole formed in the manufacturing process of the memory device 1. The "diameter" indicates the inner diameter of a hole or the like in a cross section parallel to the surface of the substrate. The "width" indicates, for example, a dimension of a component as viewed in the X or Y direction. The "semiconductor layer" may be referred to as a "conductive layer."

A "region" used in the present specification may be considered a feature provided by a reference substrate. For example, where the first substrate W1 is defined to include the memory region MR and the hookup region HR, the memory region MR and the hookup region HR are associated with different regions above the first substrate W1. The "height" corresponds to, for example, the Z-direction distance between a component of measurement target and the first substrate W1. A component other than the first substrate W1 may be used as a reference for the "height." The "plane position" indicates the position at which a component is located in the plane layout. The "top (planar) view" corresponds to, for example, viewing the first substrate W1 from the side of the second substrate W2.

While certain embodiments of the present invention have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
a substrate;
a memory layer; and
a circuit layer including a sense amplifier module provided between the substrate and the memory layer, wherein:
the memory layer includes a first region, a second region, and a third region arranged in a first direction, the third region being located between the first region and the second region,
each of the first region and the second region includes a plurality of memory cells,
the circuit layer includes a first transfer region, a second transfer region, a first sense amplifier region, and a second sense amplifier region,
the first transfer region includes a first row decoder coupled to part of the plurality of memory cells via contacts provided in the third region, and the first row decoder is configured to apply a voltage to part of the plurality of memory cells,
the second transfer region includes a second row decoder coupled to another part of the plurality of memory cells via the contacts, and the second row decoder is configured to apply a voltage to said another part of the plurality of memory cells,
the sense amplifier module is configured to read data from the plurality of memory cells, and the sense amplifier module includes a first sense amplifier unit and a second sense amplifier unit,
the first sense amplifier region includes the first sense amplifier unit, and the second sense amplifier region includes the second sense amplifier unit,
the first transfer region and the second transfer region are shifted in the first direction and arranged in a second direction intersecting the first direction, in a third direction intersecting both the first direction and the second direction, the first sense amplifier region overlaps the first region, and the second sense amplifier region overlaps the second region,
the first sense amplifier region and the first transfer region are arranged in the first direction, and the second sense amplifier region and the second transfer region are arranged in the first direction,
the first transfer region includes a first overlap region that overlaps the second region in the third direction, and the first transfer region overlaps with the second sense amplifier region in the second direction, and
the second transfer region includes a second overlap region that overlaps the first region in the third direction, and the second transfer region overlaps with the first sense amplifier region in the second direction.

2. The memory device of claim 1, wherein:
a width of the first sense amplifier region as viewed in the first direction is narrower than a width of the first region as viewed in the first direction, and
a width of the second sense amplifier region as viewed in the first direction is narrower than a width of the second region as viewed in the first direction.

3. The memory device of claim 1, wherein;
the first transfer region further includes a third overlap region that overlaps the first region in the third direction,
the second transfer region further includes a fourth overlap region that overlaps the second region in the third direction,
a width of the third overlap region as viewed in the first direction is narrower than a width of the first overlap region as viewed in the first direction, and
a width of the fourth overlap region as viewed in the first direction is narrower than a width of the second overlap region as viewed in the first direction.

4. The memory device of claim 1, wherein:
the memory layer further includes a plurality of bit lines and a plurality of wirings,
each of the plurality of bit lines includes a portion extending in the second direction and is coupled to part of the plurality of memory cells,
each of the plurality of wirings includes a portion extending in the first direction, and couples the plurality of bit lines and the sense amplifier module, and
the plurality of wirings include a first wiring that overlaps both the first sense amplifier region and the first transfer region in the third direction, and a second wiring that overlaps both the second sense amplifier region and the second transfer region in the third direction.

5. The memory device of claim 4, wherein:
the sense amplifier module includes a plurality of sense amplifier groups each including a first number of sense amplifier units arranged in the second direction, and
a number of the bit lines overlapping with one sense amplifier group is smaller than the first number.

6. The memory device of claim 4, wherein:
a boundary is provided between the circuit layer and the memory layer, the circuit layer includes a first bonding metal, and the memory layer includes a second bonding metal, and
the plurality of bit lines and the sense amplifier module are bonded together at the boundary via the first bonding metal and the second bonding metal.

7. The memory device of claim 6, wherein in a cross section including the first direction and the third direction, the first bonding metal includes a first portion having a reverse tapered shape, and the second bonding metal includes a second portion having a tapered shape.

8. The memory device of claim 6, wherein the wirings are coupled to an associated second bonding metal and an associated bit line.

9. The memory device of claim 6, wherein:
the memory layer further includes a plurality of word lines coupled to the memory cells and arranged in the third direction, and
the contacts are in contact with associated word lines from a side thereof facing the substrate.

10. The memory device of claim 6, wherein:
the memory layer further includes a plurality of word lines coupled to the memory cell and arranged in the third direction, and an insulating film provided on a side surface of each of the contacts, and
each of the contacts is in contact with one word line from a side thereof facing the substrate and penetrates part of the plurality of word lines, and the insulating film is provided between said part of the plurality of word lines and each of the contacts.

11. The memory device of claim 1, further comprising:
a plurality of first bit lines;
a plurality of second bit lines; and
a plurality of wirings,
wherein:
the memory cells include a first sub memory cell, and a second sub memory cell provided above the first sub memory cell,
each of the plurality of first bit lines includes a portion extending in the second direction, is provided between the substrate and the first sub memory cell, and is coupled to the first sub memory cell,
each of the plurality of second bit lines includes a portion extending in the second direction, and is provided between the first sub memory cell and the second sub memory cell, and the plurality of second bit lines are electrically coupled to the plurality of first bit lines, respectively,
each of the plurality of wirings includes a portion extending in the first direction, and couples the plurality of first bit lines and the sense amplifier module, and
the plurality of wirings include a wiring that overlaps both the first sense amplifier region and the first transfer region in the third direction, and a wiring that overlaps both the second sense amplifier region and the second transfer region in the third direction.

12. The memory device of claim 11, further comprising:
a plurality of first word lines coupled to the first sub memory cell and arranged in the third direction; and
a plurality of second word lines coupled to the second sub memory cell and arranged in the third direction,
wherein the plurality of first word lines are respectively coupled to the plurality of second word lines.

13. The memory device of claim 12, wherein;
the contacts further include a plurality of first contacts respectively associated with the plurality of first word lines and a plurality of second contacts respectively associated with the plurality of second word lines,
the first contacts are in contact with associated first word lines from thereof facing the substrate, and
the second contacts are in contact with associated second word lines from sides thereof facing the substrate.

14. The memory device of claim 13, wherein:
the contacts further include a plurality of third contacts respectively associated with the plurality of first word lines, and each of the plurality of third contacts penetrates at least one first word line included in the plurality of first word lines, and
the plurality of first word lines are electrically coupled to the plurality of second word lines via associated first contacts, third contacts, and second contacts.

15. The memory device of claim 12, wherein:
the contacts further include a plurality of first contacts respectively associated with the plurality of first word lines, a plurality of second contacts respectively associated with the plurality of second word lines, and an insulating film provided on a side surface of each of the plurality of first contacts and the plurality of second contacts,
at least one of the first contacts is in contact with an associated one of the first word lines from a substrate side thereof and penetrates another one of the first word lines that is provided between the associated one of the first word lines and the substrate, and the insulating film provided on the at least one of the first contacts is provided between the at least one of the first contacts and the another one of the first word lines, and
at least one of the second contacts is in contact with an associated one of the second word lines from a substrate side thereof an penetrates another one of the second word lines that is provided between the associated one of the second word lines and the substrate, and the insulating film provided on the at least one of the second contacts is provided between the at least one of the second contacts and the another one of the second word lines.

16. The memory device of claim 15, wherein:
the contacts further include a plurality of third contacts respectively associated with the plurality of first word lines, and each of the plurality of third contacts penetrates at least one of the plurality of first word lines, and
the plurality of first word lines are electrically coupled to the plurality of second word lines via associated first contacts, associated third contacts, and associated second contacts.

17. The memory device of claim 1, further comprising:
a plurality of planes including a first plane and a second plane, each of the plurality of planes including the memory cells, the first and second row decoders, and the sense amplifier module,
wherein an arrangement in which the first sense amplifier region, the second sense amplifier region, the first transfer region, and the second transfer region are arranged in the second plane is similar to an arrangement in which the first sense amplifier region, the second sense amplifier region, the first transfer region, and the second transfer region are arranged in the first plane, except that the arrangement is inverted with respect to the first direction.

18. The memory device of claim 17, wherein:
the plurality of planes further include a third plane and a fourth plane adjacent to each other in the first direction,
an arrangement in which the first sense amplifier region, the second sense amplifier region, the first transfer region, and the second transfer region are arranged in the third plane is similar to an arrangement in which the first sense amplifier region, the second sense amplifier region, the first transfer region, and the second transfer region are arranged in the first plane, except that the arrangement is inverted with respect to the second direction, and an arrangement in which the first sense amplifier region, the second sense amplifier region, the first transfer region, and the second transfer region are arranged in the fourth plane is similar to an arrangement in which the first sense amplifier region, the second sense amplifier region, the first transfer region, and the second transfer region are arranged in the second plane, except that the arrangement is inverted with respect to the second direction.

19. The memory device of claim 18, wherein:
the plurality of planes further include a fifth plane and a sixth plane adjacent to each other in the first direction,
an arrangement in which the first sense amplifier region, the second sense amplifier region, the first transfer region, and the second transfer region are arranged in the fifth plane is similar to an arrangement in which the first sense amplifier region, the second sense amplifier region, the first transfer region, and the second transfer region are arranged in the third plane, except that the arrangement is inverted with respect to the second direction, and
an arrangement in which the first sense amplifier region, the second sense amplifier region, the first transfer region, and the second transfer region are arranged in the sixth plane is similar to an arrangement in which the first sense amplifier region, the second sense amplifier region, the first transfer region, and the second transfer region are arranged in the fourth plane, except that the arrangement is inverted with respect to the second direction.

20. The memory device of claim 17, wherein two adjacent planes included among the plurality of planes share a well region in which a high voltage transistor is formed.

* * * * *